(12) United States Patent
Niyikiza et al.

(10) Patent No.: US 12,458,597 B2
(45) Date of Patent: Nov. 4, 2025

(54) CAROTENOID COMPOSITIONS AND USES THEREOF

(71) Applicant: L.E.A.F. HOLDINGS GROUP LLC, Gulph Mills, PA (US)

(72) Inventors: Clet Niyikiza, Gulph Mills, PA (US); Victor Mandla Moyo, Ringoes, NJ (US); Bolin Geng, Gulph Mills, PA (US); Zhenghong Xu, Gulph Mills, PA (US); Kaniz Khalifa, Gulph Mills, PA (US); Gwangseong Kim, Gulph Mills, PA (US)

(73) Assignee: L.E.A.F. HOLDINGS GROUP LLC, Gulph Mills, PA (US)

(*) Notice: Subject to any disclaimer, the term of this patent is extended or adjusted under 35 U.S.C. 154(b) by 0 days.

(21) Appl. No.: 17/052,412

(22) PCT Filed: May 3, 2019

(86) PCT No.: PCT/US2019/030625
§ 371 (c)(1),
(2) Date: Nov. 2, 2020

(87) PCT Pub. No.: WO2019/213538
PCT Pub. Date: Nov. 7, 2019

(65) Prior Publication Data
US 2021/0283055 A1 Sep. 16, 2021

Related U.S. Application Data

(60) Provisional application No. 62/809,123, filed on Feb. 22, 2019, provisional application No. 62/666,699, filed on May 3, 2018.

(51) Int. Cl.
A61K 9/1271 (2025.01)
A61K 31/202 (2006.01)

(52) U.S. Cl.
CPC .......... *A61K 9/1271* (2013.01); *A61K 31/202* (2013.01)

(58) Field of Classification Search
CPC .. A61K 9/1271; A61K 31/202; A61K 9/0019; A61K 9/127; A61K 9/1278;
(Continued)

(56) References Cited

U.S. PATENT DOCUMENTS 6,060,511 A 5/2000 Gainer
6,656,498 B1 12/2003 Gao
(Continued)

FOREIGN PATENT DOCUMENTS

CN 101811956 * 4/2013
CN 103183603 A 7/2013
(Continued)

OTHER PUBLICATIONS

JP2008273939A (Year: 2008).*
(Continued)

*Primary Examiner* — Benjamin J Packard
(74) *Attorney, Agent, or Firm* — Nixon & Vanderhye, PC

(57) ABSTRACT

Provided herein are pharmaceutical compositions comprising carotenoids, including liposomes that encapsulate carotenoids including ionizable carotenoids such as trans-crocetin. The provided compositions have uses in treating diseases, disorders and conditions associated with, but not limited to, infection, endotoxemia, inflammation, sepsis, ischemia, hypoxia, shock, stroke, lung injury, wound healing, traumatic injury, reperfusion injury, cardiovascular disease, kidney disease, liver disease, inflammatory disease, metabolic disease, pulmonary disorders, blood related disorders and hyperproliferative diseases such as cancer. Methods of making, delivering, and using the pharmaceutical compositions are also provided.

39 Claims, 7 Drawing Sheets

Figure 1B:
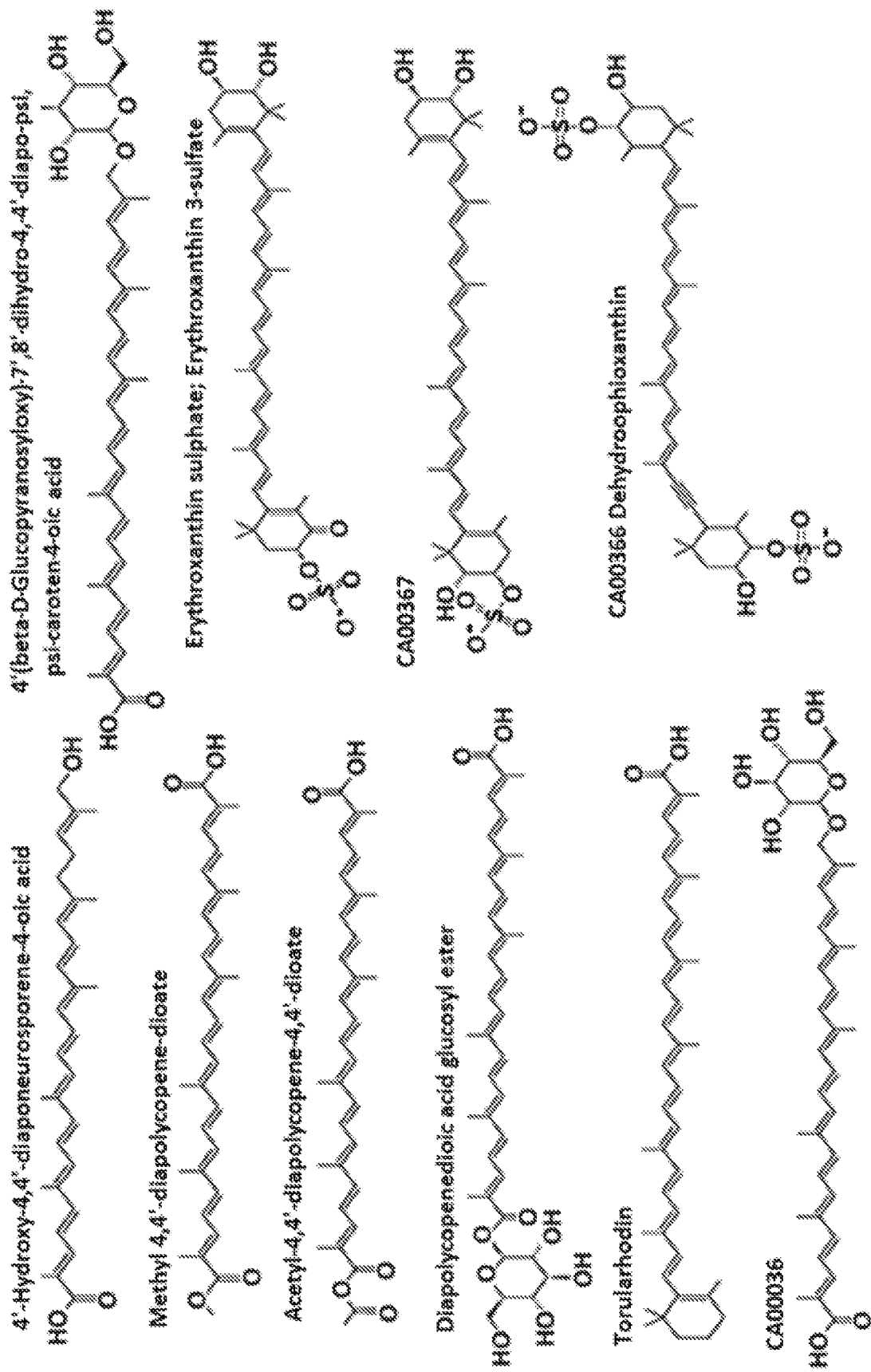
Figure 1D:
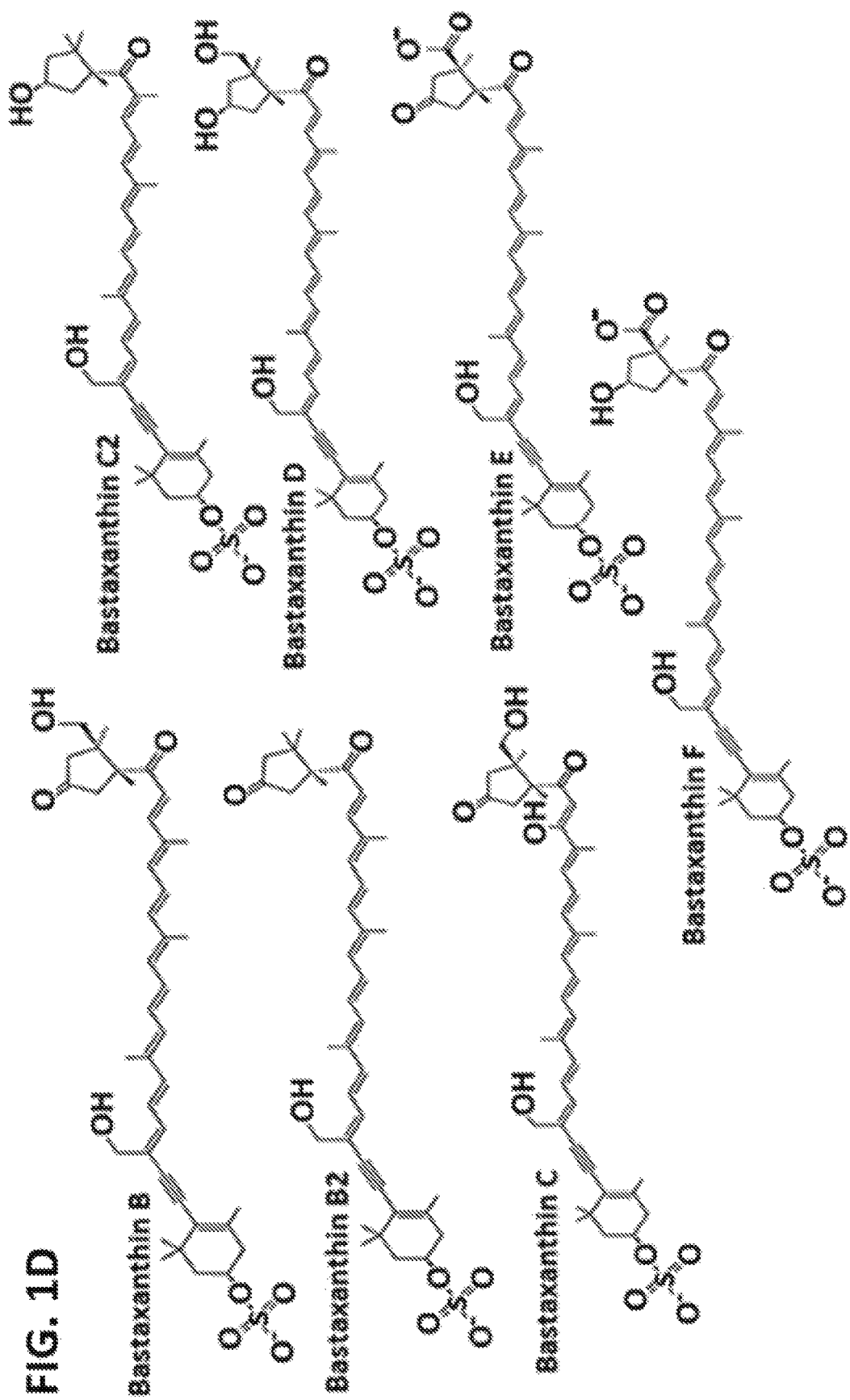

(58) Field of Classification Search
CPC ...... A61K 31/015; A61K 45/06; A61K 47/10; A61K 47/32; A61K 47/34; A61K 47/24; A61K 47/26; A61K 31/01; A61K 47/02; A61K 47/12; A61P 1/16; A61P 17/02; A61P 31/00

See application file for complete search history.

(56) References Cited

U.S. PATENT DOCUMENTS

| | | | |
|---|---|---|---|
| 7,048,943 B2* | 5/2006 | Barenholz | A61P 17/00 264/4.1 |
| 7,351,844 B2 | 4/2008 | Gainer et al. | |
| 7,759,506 B2* | 7/2010 | Gainer | A61P 13/12 554/124 |
| 8,017,653 B2* | 9/2011 | Gainer | A61P 9/10 514/560 |
| 8,591,555 B2* | 11/2013 | Foley | A61B 17/7059 606/289 |
| 8,632,832 B2* | 1/2014 | Leigh | A23L 33/105 426/601 |
| 10,842,805 B2 | 11/2020 | Gao | |
| 10,851,129 B2* | 12/2020 | Yao | A61K 36/744 |
| 2003/0059462 A1* | 3/2003 | Barenholz | A61Q 17/04 514/762 |
| 2004/0076683 A1* | 4/2004 | Hoarau | A61K 9/5192 424/490 |
| 2004/0162329 A1* | 8/2004 | Lockwood | A61P 35/04 548/530 |
| 2006/0160751 A1 | 7/2006 | McGuire | |
| 2007/0015735 A1* | 1/2007 | Lockwood | C07D 295/205 549/218 |
| 2008/0025929 A1* | 1/2008 | Burton | A61K 8/37 424/59 |
| 2008/0213324 A1* | 9/2008 | Zhou | A61Q 9/00 514/121 |
| 2008/0221377 A1 | 9/2008 | Lockwood et al. | |
| 2010/0291053 A1* | 11/2010 | Clayton | A61K 31/66 514/474 |
| 2013/0337068 A1 | 12/2013 | Petyaev | |
| 2014/0141082 A1 | 5/2014 | Gao | |
| 2015/0147276 A1* | 5/2015 | Ingber | A61K 38/482 424/9.5 |
| 2016/0199490 A1 | 7/2016 | Gainer et al. | |
| 2017/0049893 A1 | 2/2017 | Petyaev | |
| 2018/0289651 A1 | 10/2018 | Lafont et al. | |
| 2019/0015379 A1 | 1/2019 | Bacha et al. | |
| 2019/0083439 A1* | 3/2019 | Gainer | A61N 5/1077 |
| 2021/0283086 A1* | 9/2021 | Xu | A61K 47/38 |
| 2022/0409565 A1* | 12/2022 | Niyikiza | A61K 9/1278 |

FOREIGN PATENT DOCUMENTS

| | | |
|---|---|---|
| CN | 107753427 A | 3/2018 |
| FR | 2840532 * | 5/2005 |
| JP | 2004518707 * | 6/2004 |
| JP | 2008273939 A * | 11/2008 |
| JP | 2009179628 A | 8/2009 |
| WO | WO2002064110 A2 | 8/2002 |
| WO | WO2002064110 A3 | 8/2002 |
| WO | WO 2003/101184 A2 | 12/2003 |
| WO | WO 2003101164 A1 | 12/2003 |
| WO | WO 2005/028411 A1 | 3/2005 |
| WO | WO 2006102576 A1 | 9/2006 |
| WO | WO 2011152869 A1 | 12/2011 |
| WO | WO 2019/213538 A1 | 11/2019 |
| WO | WO 2021/091862 A1 | 5/2021 |
| WO | WO 2021/207650 A1 | 10/2021 |
| WO | WO 2021/207676 A1 | 10/2021 |
| WO | WO 2021/207690 A1 | 10/2021 |
| WO | WO 2021207566 A1 | 10/2021 |
| WO | WO 2022025997 A1 | 2/2022 |
| WO | WO 2022025998 A1 | 2/2022 |

OTHER PUBLICATIONS

Hada et al., "Hydrophilic carotenoids; recent progress": Molecules, 17:5003-5012 (2012).

Wiesyaw et al., "Carotenoids as modulators of lipid membrane physical properties" Biochimica et Biophysica Acta, 1740:108-115 (2005).

Mertes et al., "Liposomal encapsulation of trans-crocetin enhances oxygenation in patients with COVID-19-related ARDS receiving mechanical ventilation" J. Controlled Release 336:252-261 (2021).

International Search Report for PCT/US2019/030625 dated Aug. 15, 2019, 3 pages.

Written Opinion of the ISA for PCT/US2019/030625 dated Aug. 15, 2019, 6 pages.

Fontaine et al., "Norbixin Protects Retinal Pigmented Epithelium Cells and Photoreceptors against A2E-Mediated Phototoxicity In Vitro and In Vivo." PLoS ONE 11(12): e0167793 (2016). https://doi.org/10.1371/journal.pone.0167793.

Rostamabadi et al., "Nanoencapsulation of carotenoids within lipid-based nanocarriers", Journal of Controlled Release, vol. 298, Mar. 1, 2019 (Mar. 1, 2019), pp. 38-67, XP093096469.

Kopec et al., "Recent advances in the bioaccessibility and bioavailability of carotenoids and effects of other dietary lipophiles", Journal of Food Composition and Analysis, Elsevier, Amsterdam, NL, vol. 68, Jul. 1, 2017 (Jul. 1, 2017), pp. 16-30, XP085382150.

Nco4378920: "A Study of Liposomal Trans Crocetin, LEAF-4L6715, in Patients With Acute Respiratory Distress Syndrome Due to COVID-19, Sepsis, and Other Causes", Dec. 16, 2021 (Dec. 16, 2021), XP093144684, Retrieved from the Internet: URL:https://clinicaltrials.gov/study/NCT04 378920?tab=history&a=2 [retrieved on Mar. 22, 2024].

Puglia et al., "Nanotechnology approach to increase the antioxidant and cytotoxic efficacy of crocin and crocetin," Planta Med 85:258-265 (2019).

Abdullaev et al., Biomedical properties of saffron and its potential use in cancer therapy and chemoprevention trials Cancer Detection and Prevention 28:426-432 (2004).

Krishnaswamy et al., "Effect of short-term oral supplementation of crocin on age-related oxidative stress, cholinergic, and mitochondrial dysfunction in rat cerebral cortex," Life Sciences, 263:118545 1-10 (2020). Doi.org/10.1016/j.lfs.2020.118545.

Rastgoo et al., "Antitumor activity of PEGylated nanoliposomes containing crocin in mice bearing C26 colon carcinoma," Planta Medica 79:447-451 (2013).

Focsan et al., "Photo Protection of *Haematococcus pluvialis* Algae by Astaxanthin: Unique Properties of Astaxanthin Deduced by EPR, Optical and Electrochemical Studies," Antioxidants 6, 80; (2017).

Gainer, "Trans-sodium crocetinate for treating hypoxia/ischemia," Expert Opinion on Investigational Drugs 17(6): 917-924 (2008).

Gainer, "Effect of increasing the plasma oxygen diffusivity on experimental cryogenic edema," J. Neurosurg. 45(5): 535-538 (1976); Doi.org/10.3171/jns.1976.45.5.0535.

Giassi et al., "Trans-Sodium Crocetinate Restores Blood Pressure, Heart Rate, and Plasma Lactate after Hemorrhagic Shock," The Journal of Trauma Injury, Infection, and Critical Care, 51(5): 932-938 (2001).

* cited by examiner

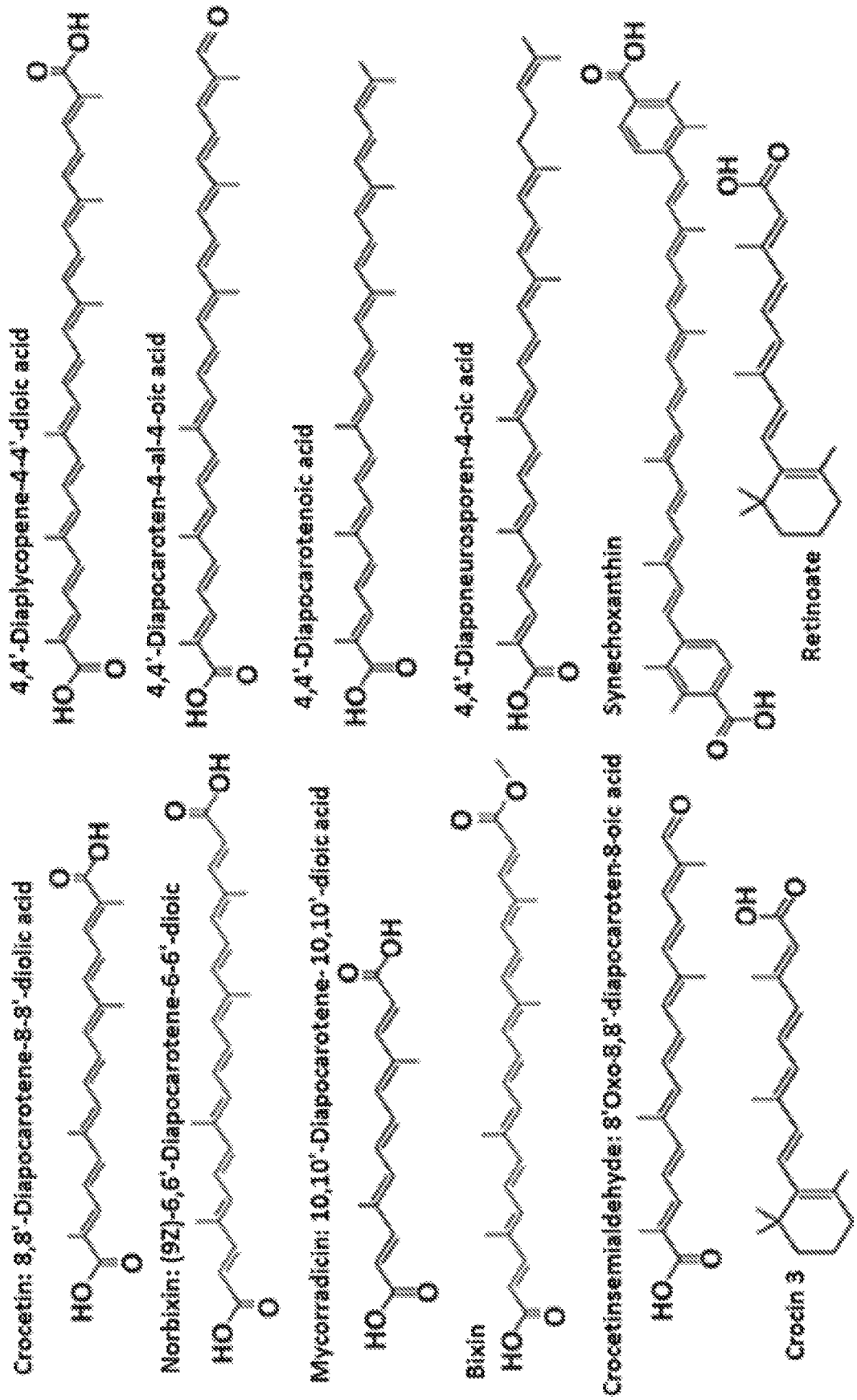
FIG. 1A Exemplary Ionizable Carotenoids

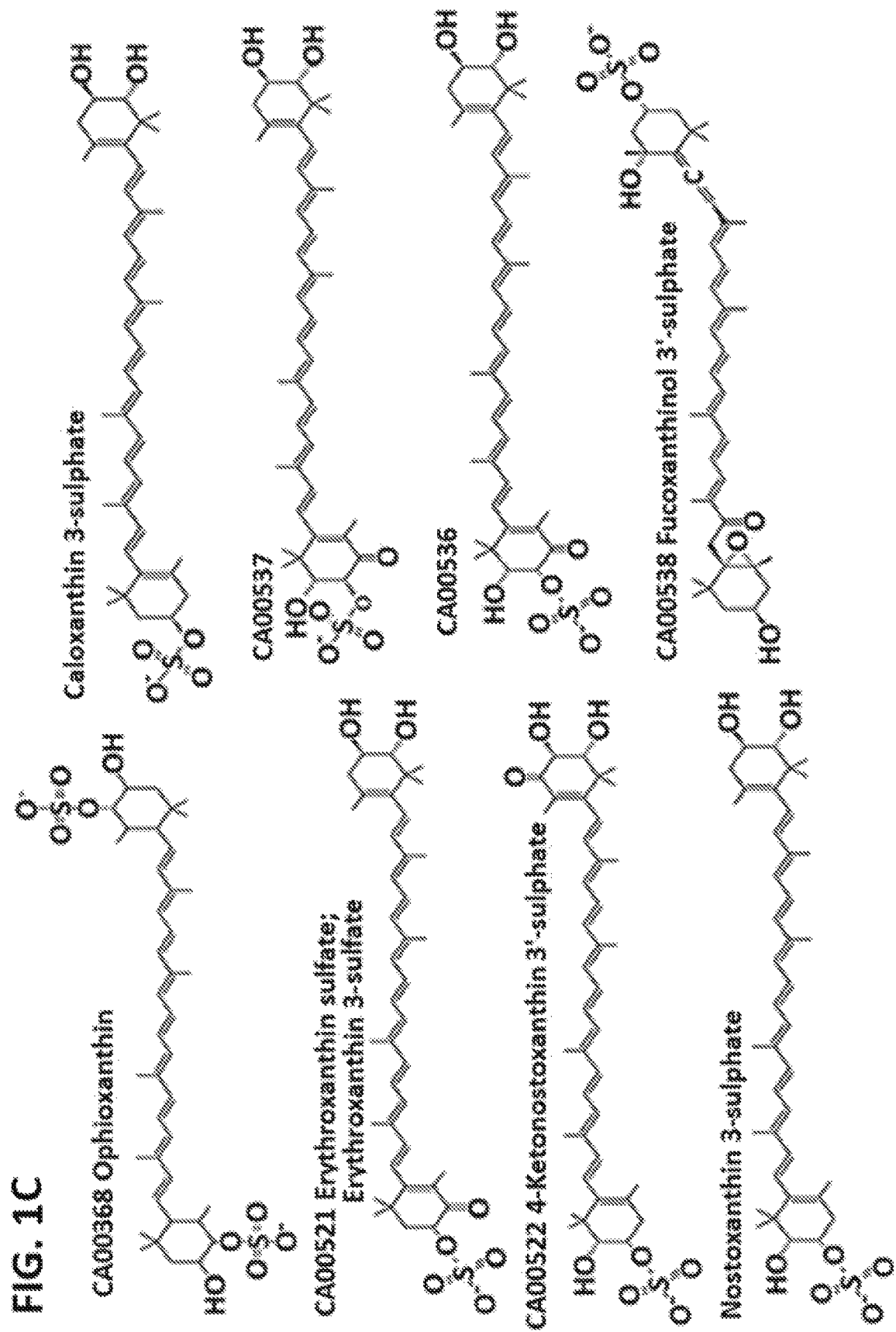

FIG. 2 CTC Liposome Stability
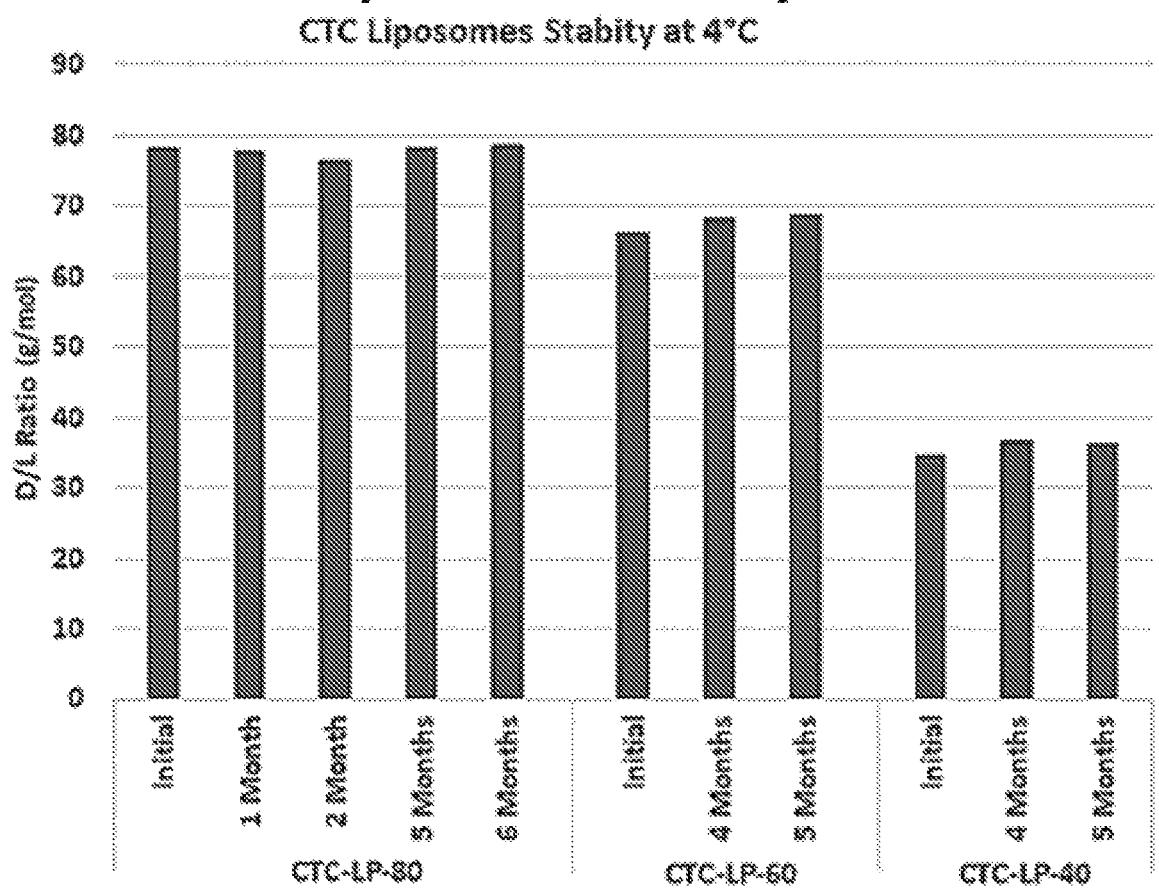
FIG. 3 Liposomal CTC Batch Reproducibility
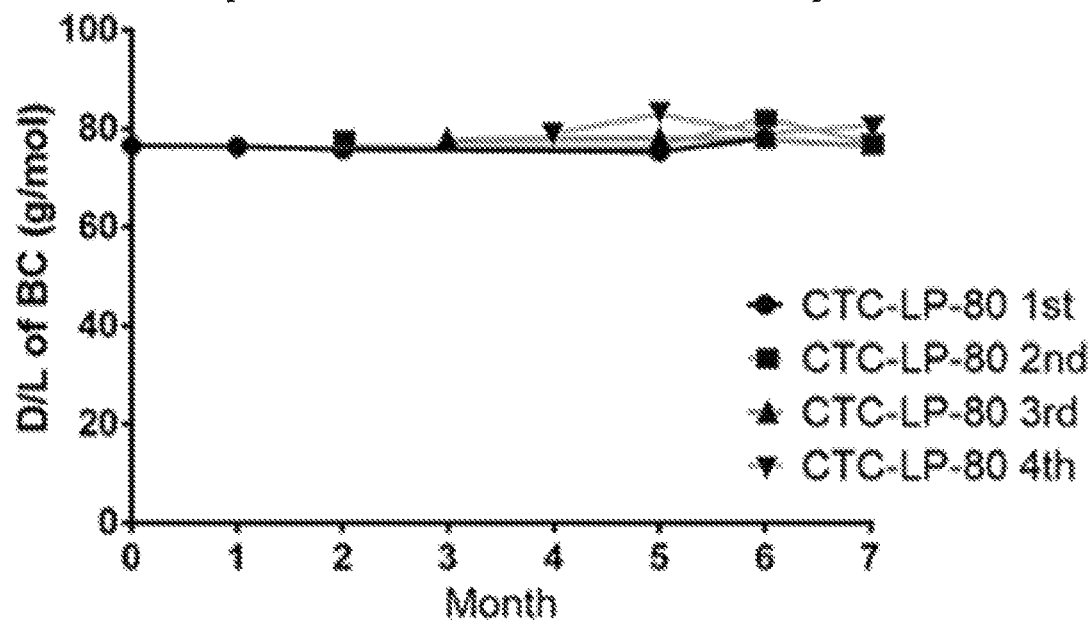

FIG. 4 MTC Liposome Stability
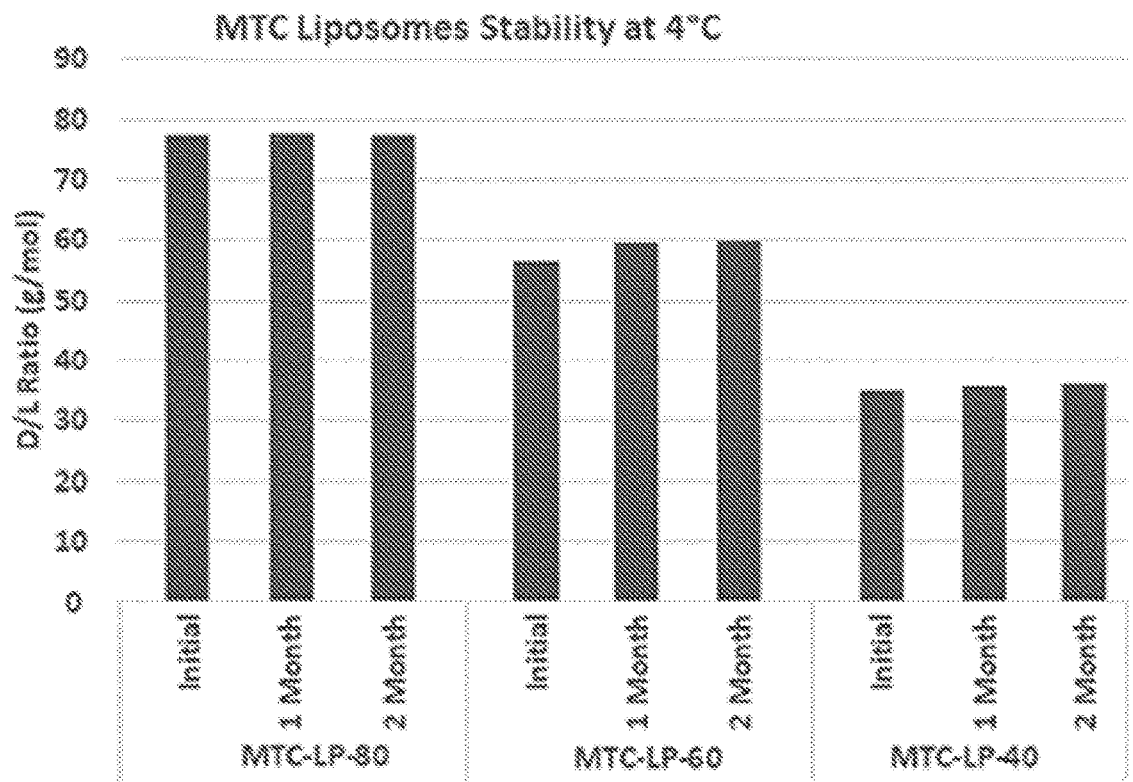
FIG. 5 Survival Study 1 (Study Number: TP-936)
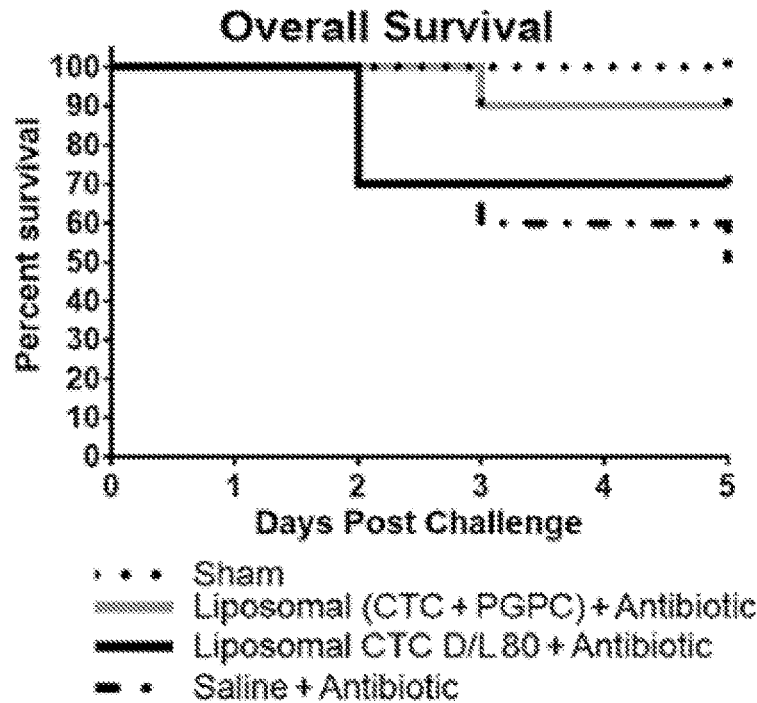

Survival Study 2(Study Number:TP-967)

Survival Study 3(Study Number:TP-986)

CAROTENOID COMPOSITIONS AND USES THEREOF

CROSS-REFERENCE TO RELATED APPLICATIONS

This application is the U.S. national phase of International Application No. PCT/US2019/030625 filed May 3, 2019 which designated the U.S. and claims priority to U.S. Provisional Application Nos. 62/666,699 filed May 3, 2018, and 62/809,123 filed Feb. 22, 2019, the entire contents of each of which are hereby incorporated by reference.

BACKGROUND

Under normal conditions, bacteria and related toxins (endotoxemia) should not routinely be found in the blood of healthy human beings. There is, however, an increasing recognition that bacteria do enter the bloodstream, under certain conditions from sources such as the gut (leaky gut syndrome) or the tooth gum interface (mainly in patients with poor gum health). The consequences of this process known as bacterial translocation are a state of chronic bacteremia (bacteria) in the blood stream. Bacterial translocation leads to chronic bacteremia that sheds endotoxins such as bacterial lipopolysaccharides, LPS that gives rise to chronic low grade chronic endotoxemia and the resulting chronic inflammatory state. This chronic low-grade inflammation associated with bacterial translocation has been linked to the pathogenesis of many diseases.

A more severe form of endotoxemia is associated with sepsis, a life-threatening medical condition caused by dysregulated host inflammatory response to infection. Sepsis is a global healthcare problem that strikes an estimated 30 million people worldwide every year. The mortality rate from sepsis is approximately 40% in adults. Sepsis arises when the body's attempt to fight an infection results in the immune system damaging tissues and organs. This uncontrolled response, normally designed to protect the body, causes widespread inflammation, leaky blood vessels, and abnormal blood clotting resulting in organ damage. In severe cases, blood pressure drops, multiple organ failures ensue, and the patient can die rapidly from septic shock.

Management of sepsis is a complicated and unmet clinical challenge requiring early recognition and management of infection, hemodynamic issues, and other organ dysfunctions. The sepsis underlying infection is treated with antimicrobials, most commonly broad spectrum anti-bacterial, anti-viral and anti-fungal agents. Current treatment guidelines for management of the hemodynamic issues associated with sepsis and septic shock, recommend use of vasopressors, with norepinephrine as first-line therapy.

Despite these measures discussed above, sepsis remains a major killer and there remains a great need for new treatments for sepsis and its associated medical conditions. One observation is that most treatments geared towards sepsis tend to address treating infection and individual failing organ systems, and not the treatment of the key underlying pathophysiological drivers of sepsis. An alternative approach would be to address the underlying mechanisms of sepsis, in addition to treating the concomitant infection.

Sepsis, along with many other medical conditions, is associated with oxygen deprivation (hypoxia). The major causes of death globally are related to some extent to hypoxia. Examples include, but are not limited to, coronary artery disease, stroke, chronic and acute respiratory diseases. In addition, hypoxia is a common feature of many cancers, and leads to resistance to radiation therapy, chemotherapy and potentially immunotherapy. Preclinically, reversal of hypoxia in cancer has been associated with an improved response to treatment. This suggests that strategies in the clinic to reverse hypoxia could result in improved outcomes in cancer.

Carotenoids are a class of natural lipid-soluble pigments found principally in plants where they function as accessory pigments and impart protection of tissue through their ability to quench singlet oxygen and free radical species. Carotenoids are known to have antioxidant properties and consequently, provide numerous beneficial health effects including reducing the potential risks of cardiovascular diseases, cancers, and slowing and/or reversing the degenerative effects of aging on various human physiological activities. However, carotenoids are typically very lipophilic compounds and the clinical use of many carotenoids is limited by their instability and low bioavailability.

Crocetin is a carotenoid with antioxidative properties that is sparingly soluble in water. Chemically, crocetin is a 20-carbon apocarotenoid molecule containing seven double bonds and a carboxylic acid group at each end. The administration of trans crocetin (free acid), and its salt sodium trans crocetinate in free form (e.g., unencapsulated) pharmaceutical formulations has been reported to offer promise in treatment for conditions caused by hypoxia, ischemia, and other medical conditions. However, neither has demonstrated clinical therapeutic efficacy. This is partly due to the fact that formulations of trans crocetin and its sodium salt, sodium trans crocetinate, have been to date limited by instability, low bioavailability and short half-life.

In view of the health benefits conferred by carotenoids and the low bioavailability and instability outlined above, there is a need for providing pharmaceutical compositions comprising carotenoids with improved bioavailability and stability. The provided compositions and methods address the shortcomings of carotenoids described above. These compositions and methods will further help overcome the limitations of current therapeutic approaches to disease states linked to endotoxemia and hypoxia as well as other unmet medical needs. The compositions have applications as single agents and in combination with other therapies.

BRIEF SUMMARY

The disclosure provides pharmaceutical compositions comprising carotenoids, including liposomes that encapsulate carotenoids such as trans crocetin, trans norbixin, and salts thereof. The provided compositions have uses in treating diseases and disorders and conditions associated with, but not limited to, infection, inflammation, sepsis, ischemia, hypoxia, shock, stroke, injury, cardiovascular disease, renal disease, liver disease, inflammatory disease, metabolic disease, pulmonary disease, neurodegenerative disease, disease of the immune system, and hyperproliferative diseases such as cancer. Methods of making, delivering, and using the pharmaceutical compositions are also provided, as are kits containing the compositions.

The disclosed pharmaceutical compositions provide for the enhanced delivery of carotenoids including ionizable Polyene Carotenoids such as trans-crocetin, with poor pharmacokinetics and biodistribution. The disclosure also provides liposome compositions that display high encapsulation efficiencies (>98%), high drug-to-lipid ratios, and/or enhanced drug retention. The provided pharmaceutical compositions have uses in treating diseases and disorders and conditions associated with, but not limited to, infection, inflammation, sepsis, ischemia, hypoxia, anemia, trauma, injury, stroke, shock, diabetes, wound healing, injury (e.g., reperfusion injury, neural injury, renal injury, livery injury and lung injury), and hyperproliferative diseases such as cancer, as well as conditions associated with the treatment of these diseases and disorders (e.g., anemia, neutropenia and immunosuppression). Methods of making, delivering, and using the compositions are also provided.

In some embodiments, the disclosure provides:

[1] a pharmaceutical composition comprising an ionizable carotenoid salt having the formula: Polyene Carotenoid-Q, wherein, the Polyene Carotenoid comprises
(a) 3, 4, 5, 6, 7, 8, 9, 10, 3-5, 6-8, 9-10, or more than 9, conjugated double bonds,
(b) methyl or low alkyl (C2-C3) substitutions, and
(c) 1, 2, 3, or more than 3, ionizable groups; and
Q is a multivalent counterion;

[2] a pharmaceutical composition comprising an ionizable carotenoid salt having the formula:

Q-$R_1$-Polyene Carotenoid-$R_2$-Q, wherein, the Polyene Carotenoid comprises
(a) 3, 4, 5, 6, 7, 8, 9, 10, 3-5, 6-8, 9-10, or more than 9, conjugated double bonds,
(b) methyl or low alkyl (C2-C3) substitutions, and
(c) 1, 2, 3, or more than 3, ionizable groups;
$R_1$ and $R_2$ are ionizable groups e.g., the same ionizable group or different ionizable groups; and
Q is a multivalent counterion;

[3] the pharmaceutical composition of [1] or [2], wherein the Polyene Carotenoid comprises 1, 2, 3, or more than 3, anionic ionizable groups;

[4] the pharmaceutical composition according to [3], wherein the Polyene Carotenoid comprises at least one anionic ionizable group selected from: a carboxylic group, a sulfonate group, a sulfate group, a phosphonate, a phosphate group, and a hydroxamate group;

[5] the pharmaceutical composition of [1] or [2], wherein the Polyene Carotenoid comprises 1, 2, 3, or more than 3, cationic ionizable groups (e.g., a primary, secondary, or tertiary amine group, a quaternary ammonium group, a choline group, a guanidine group, or an imidazole group);

[6] a pharmaceutical composition comprising an ionizable carotenoid salt having the formula: Q-trans-crocetin-Q, wherein,
Q is a multivalent cation counterion;

[7] a pharmaceutical composition comprising an ionizable carotenoid salt having the formula: Q-norbixin-Q, wherein,
Q is a multivalent cation counterion;

[8] the pharmaceutical composition according to any of [1]-[7], wherein the multivalent counterion (Q) is a multivalent cation (e.g., a divalent cation such as a divalent metal cation or a divalent organic cation, or a trivalent cation such as $Fe^{3+}$);

[9] the pharmaceutical composition of [8], wherein the multivalent cation is at least one divalent cation selected from $Ca^{2+}$, $Mg^{2+}$, $Zn^{2+}$, $Cu^{2+}$, $Co^{2+}$, and $Fe^{2+}$, a divalent organic cation such as protonated diamine, or a trivalent cation such as $Fe^{3+}$;

[10] the pharmaceutical composition according to [6], which comprises magnesium trans-crocetinate (MTC) or calcium trans-crocetinate (CTC);

[11] the pharmaceutical composition according to [7], which comprises magnesium trans-norbixinate (MTN) or calcium trans-norbixinate (CTN);

[12] a delivery vehicle comprising the pharmaceutical composition according to any of [1]-[11];

[13] the delivery vehicle according to [12], which is a liposome;

[14] a pharmaceutical composition comprising a liposome encapsulating an ionizable carotenoid salt, having the formula:

Polyene Carotenoid-Q, wherein, the Polyene Carotenoid comprises
(a) 3, 4, 5, 6, 7, 8, 9, 10, 3-5, 6-8, 9-10, or more than 9, conjugated double bonds,
(b) methyl or low alkyl (C2-C3) substitutions, and
(c) 1, 2, 3, or more than 3, ionizable groups; and
Q is (i) a multivalent counterion or (ii) a monovalent counterion;

[15] a pharmaceutical composition comprising a liposome encapsulating an ionizable carotenoid salt having the formula:

Q-$R_1$-Polyene Carotenoid-$R_2$-Q, wherein the Polyene Carotenoid comprises
(a) 3, 4, 5, 6, 7, 8, 9, 10, 3-5, 6-8, 9-10, or more than 9, conjugated double bonds,
(b) methyl or low alkyl (C2-C3) substitutions, and
(c) 1, 2, 3, or more than 3, ionizable groups;
$R_1$ and $R_2$ are ionizable groups e.g., the same ionizable group or different ionizable groups; and
Q is (i) a multivalent counterion or (ii) a monovalent counterion;

[16] the pharmaceutical composition according to [14] or [15], wherein the Polyene Carotenoid comprises anionic ionizable groups;

[17] the pharmaceutical composition of [16], wherein the Polyene Carotenoid comprises at least one anionic ionizable group selected from: a carboxylic group, a sulfonate group, a sulfate group, a phosphonate, a phosphate group, and a hydroxamate group;

[18] the pharmaceutical composition a according to [14] or [15], wherein the Polyene Carotenoid comprises cationic ionizable groups (e.g., a primary, secondary, or tertiary amine group, a quaternary ammonium group, a choline group, a guanidine group, or an imidazole group),

[19] a pharmaceutical composition comprising a liposome encapsulating an ionizable carotenoid salt having the formula:

Q-trans-crocetin-Q, wherein,

Q is (i) a multivalent cation counterion or (ii) a monovalent cation;

[20] a pharmaceutical composition comprising a liposome encapsulating an ionizable carotenoid salt having the formula: Q-trans-norbixin-Q, wherein,
Q is (i) a multivalent cation counterion or (ii) a monovalent cation;

[21] a pharmaceutical composition comprising a liposome encapsulating an ionizable carotenoid salt having the formula:

Q-$R_3$-Polyene Carotenoid-$R_4$-Q, wherein, the Polyene Carotenoid comprises 3, 4, 5, 6, 7, 8, 9, 10, 3-5, 6-8, 9-10, or more than 9, conjugated double bonds, optionally substituted with 1 to n methyl or low C1-C3 alkyl substitutions, wherein n=1 to 4; and R3 and/or R4 is a monocyclic and/or polar group (e.g., the same or different monocyclic and/or polar group); and
Q is (i) a multivalent counterion or (ii) a monovalent counterion;

[22] a pharmaceutical composition comprising a liposome encapsulating a carotenoid with two attached polar groups, which can be the same or different polar group, and having the formula:

QA-Polyene Carotenoid-AQ, wherein, the Polyene Carotenoid comprises 3, 4, 5, 6, 7, 8, 9, 10, 3-5, 6-8, 9-10, or more than 9, conjugated double bonds, optionally substituted with 1 to n methyl or low C1-C3 alkyl substitutions, wherein n=1 to 4; and QA taken together and AQ taken together is a monocyclic functional group (e.g., the same or different monocyclic functional group), optionally selected from a monocyclic functional group present in astaxanthin, lutein, xanthophyll and zeaxanthin;

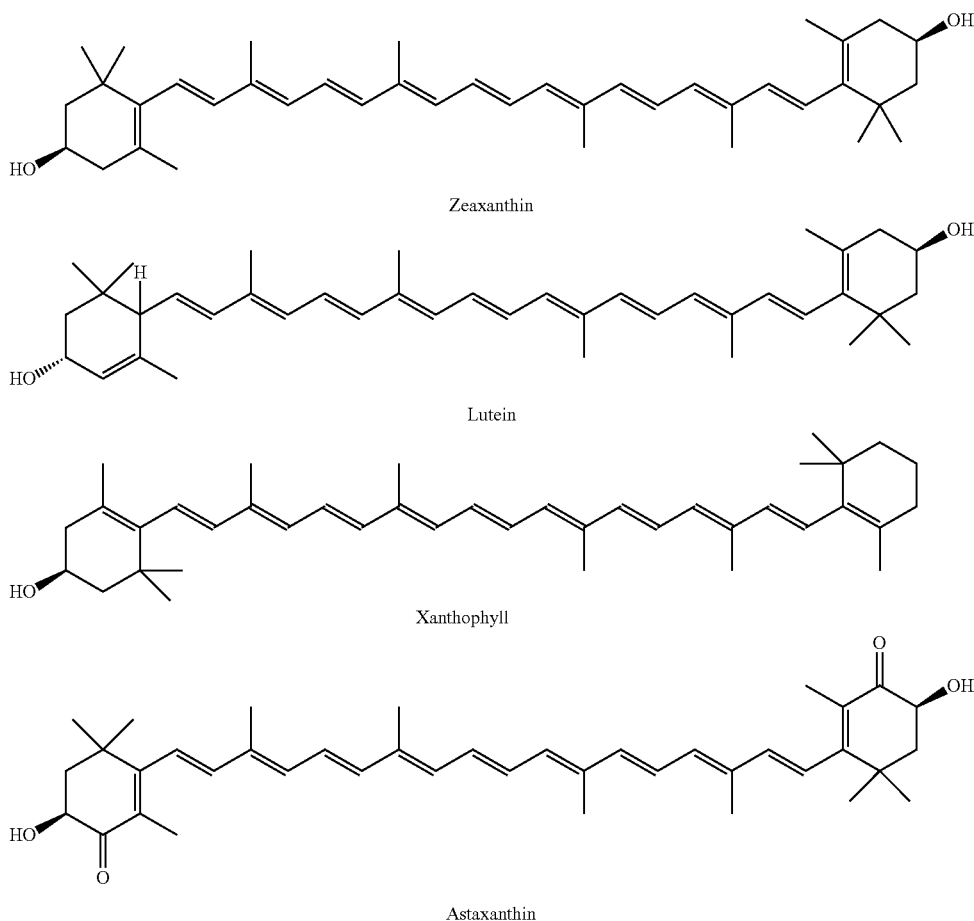

Zeaxanthin

Lutein

Xanthophyll

Astaxanthin

[23] the pharmaceutical composition according to any of [14]-[21] or wherein Q is a multivalent counterion (e.g., a multivalent cation such as a divalent metal cation or a divalent organic cation);

[24] the pharmaceutical composition of [23], wherein Q is at least one divalent cation selected from $Ca^{2+}$, $Mg^{2+}$, $Zn^{2+}$, $Cu^{2+}$, $Co^{2+}$, and $Fe^{2+}$, a divalent organic cation such as protonated diamine, or a trivalent cation such as $Fe^{3+}$;

[25] the pharmaceutical composition according to any of [14]-[21], wherein Q is a monovalent counterion (e.g., a monovalent metal cation or a monovalent organic cation);

[26] the pharmaceutical composition of [25], wherein Q is at least one monovalent counterion selected from $NH_4^+$, $Na^+$, $Li^+$, and $K^+$, or a monovalent organic cation such as protonated amine;

[27] the pharmaceutical composition according to [19], which comprises magnesium trans-crocetinate (MTC) or calcium trans-crocetinate (CTC);

[28] the pharmaceutical composition according to [20], which comprises magnesium trans-norbixinate (MTN) or calcium trans-norbixinate (CTN);

[29] the pharmaceutical composition according to any of [13]-[28], wherein the ionizable carotenoid/lipid ratio is 1 to 1000 g/M, about 10 to 150 g/mol, about 20 to 100 g/mol, or any range therein between;

[30] the pharmaceutical composition according to any of [13]-[29], wherein the liposomes comprise at least 0.1% to 97% weight by weight (w/w) ionizable carotenoid, or any range therein between;

[31] the pharmaceutical composition according to any of [13]-[30], wherein the liposome has a diameter of 20 nm to 500 nm, 20 nm to 200 nm, or 80 nm to 120 nm, or any range therein between;

[32] the pharmaceutical composition according to any of [13]-[31], wherein the liposome is formed from liposomal components;

[33] the pharmaceutical composition according to [32], wherein the liposomal components comprise at least one of an anionic lipid, a cationic lipid and a neutral lipid;

[34] the pharmaceutical composition according to [32] or [33], wherein the liposomal components comprise at least one selected from: DSPE; DSPE-PEG; DSPE-PEG-FITC; DSPE-PEG-maleimide; HSPC; HSPC-PEG; cholesterol; cholesterol-PEG; and cholesterol-maleimide;

[35] the pharmaceutical composition according to any of [13]-[34], wherein the liposome comprises an oxidized phospholipid such as an OxPAPC;

[36] the pharmaceutical composition according to [35], wherein the OxPAPC is an oxidized phospholipid containing fragmented oxygenated sn-2 residues, an oxidized phospholipid containing full length oxygenated sn-2 residues, and/or an oxidized phospholipid containing a five-carbon sn-2 residue bearing omega-aldehyde or omega-carboxyl groups;

[37] the pharmaceutical composition of [35], wherein the liposome comprises an OxPAPC selected from HOdiA-PC, KOdiA-PC, HOOA-PC and KOOA-PC, 1-palmitoyl-2-(5,6-epoxyisoprostane E2)-sn-glycero-3-phosphocholine (5,6 PEIPC), 1-palmitoyl-2-(epoxy-cyclopentenone)-sn-glycero-3-phosphorylcholine (PECPC), 1-palmitoyl-2-(epoxy-isoprostane E2)-sn-glycero-4-phosphocholine (PEIPC), 1-palmitoyl-2-glutaroyl-sn-glycero-3-phosphocholine (PGPC); 1-palmitoyl-2-(9'oxo-nonanoyl)-sn-glycero-3-phosphocholine; 1-palmitoyl-2-arachinodoyl-sn-glycero-3-phosphocholine; 1-palmitoyl-2-myristoyl-sn-glycero-3-phosphocholine; 1-palmitoyl-2-hexadecyl-sn-glycero-3-phosphocholine; 1-palmitoyl-2-azelaoyl-sn-glycero-3-phosphocholine; and 1-palmitoyl-2-acetoyl-sn-glycero-3-phospho-choline; or the OxPAPC is an epoxyisoprostane-containing phospholipid;

[38] the pharmaceutical composition according of [37], wherein the liposome comprises PGPC;

[39] the pharmaceutical composition according to any of [13]-[38], wherein the liposome comprises 0% to 100%, 0.1% to 30%, 1% to 25%, 5% to 20%, or 7% to 15% OxPAPC (e.g., about 10% OxPAPC), or any range therein between;

[40] the pharmaceutical composition according to any of [13]-[39], wherein the liposome comprises HSPE, cholesterol, PEG-DSPE-2000, and OxPAPC at a molar ratio of 2 to 5:1 to 4:0.01 to 0.3:0.05 to 1.5;

[41] the pharmaceutical composition according to any of [13]-[40], wherein the liposome is pegylated;

[42] the pharmaceutical composition according to any of [13]-[41], wherein one or more liposomal components further comprises a steric stabilizer;

[43] the pharmaceutical composition according to [42], wherein the steric stabilizer is at least one selected from consisting of polyethylene glycol (PEG); poly-L-lysine (PLL); monosialoganglioside (GM1); poly(vinyl pyrrolidone) (PVP); poly(acrylamide) (PAA); poly(2-methyl-2-oxazoline); poly(2-ethyl-2-oxazoline); phosphatidyl polyglycerol; poly[N-(2-hydroxypropyl) methacrylamide]; amphiphilic poly-N-vinylpyrrolidones; L-amino-acid-based polymer; oligoglycerol, copolymer containing polyethylene glycol and polypropylene oxide, Poloxamer 188, and polyvinyl alcohol;

[44] the pharmaceutical composition according to [43], wherein the steric stabilizer is PEG and the PEG has a number average molecular weight (Mn) of 200 to 5000 Daltons;

[45] the pharmaceutical composition according to any of [13]-[44], wherein the liposome is anionic or neutral;

[46] the pharmaceutical composition according to any of [13]-[44], wherein the liposome has a zeta potential of −150 to 150 mV, or −50 to 50 mV, or any range therein between;

[47] the pharmaceutical composition according to any of [13]-[45], wherein the liposome has a zeta potential that is less than or equal to zero (e.g., −150 to 0, or −50 to 0 mV, or any range therein between);

[48] the pharmaceutical composition according to any of [13]-[47], wherein the liposome has a zeta potential greater than 0 (e.g., 0.2 to 150 mV, or 1 to 50 mV, or any range therein between);

[49] the pharmaceutical composition according to any of [13]-[45], or [48], wherein the liposome is cationic;

[50] the pharmaceutical composition according to any of [1]-[49], which further comprises a pharmaceutically acceptable carrier;

[51] the pharmaceutical composition according to any of [1] to [50], which comprises a tonicity agent such as dextrose, mannitol, glycerin, potassium chloride, or sodium chloride, optionally at a concentration of greater than 0.1%, or a concentration of 0.3% to 2.5%, or any range therein between;

[52] the pharmaceutical composition of [51], which comprises trehalose or dextrose;

[53] the pharmaceutical composition of [52], which contains 1% to 50% trehalose;

[54] the pharmaceutical composition of [51], which contains dextrose, optionally 1% to 50% dextrose;

[55] the pharmaceutical composition according to any of [1]-[54], which contains 5% dextrose in a HEPES buffered solution;

[56] the pharmaceutical composition according to any of [1]-[55], which comprises a buffer such as HEPES Buffered Saline (HBS) or similar, at a concentration of 1 to 200 mM and a pH of 2 to 8, or any ranges therein between;

[57] the pharmaceutical composition according to any of [1]-[56], wherein the pharmaceutically acceptable carrier comprises a total concentration of multivalent metal acetate salts such as magnesium acetate or calcium acetate of 0.1 mM to 2000 mM, or 50 mM to 500 mM, or any range therein between;

[58] the pharmaceutical composition according to any of [1]-[57], which has a pH of 5-8, or a pH of 6-7, or any range therein between;

[59] the pharmaceutical composition according to any of [13]-[58], wherein the liposome comprises less than 6 million, less than 500,000, less than 200,000, less than 100,000, less than 50,000, less than 10,000, or less than 5,000, molecules of ionizable carotenoid;

[60] the pharmaceutical composition according to any of [13]-[59], wherein the liposome comprises 10 to 100, 000, 100 to 10,000, or 500 to 5,000, molecules of the ionizable carotenoid, or any range therein between;

[61] the pharmaceutical composition according to any of [13]-[60], wherein the liposome further comprises a targeting moiety and wherein the targeting moiety has a specific affinity for a surface antigen on a target cell of interest;

[62] the pharmaceutical composition of [61], wherein the targeting moiety is attached to one or both of a PEG and the exterior of the liposome, optionally wherein the targeting moiety is attached to one or both of the PEG and the exterior of the liposome by a covalent bond;

[63] the pharmaceutical composition of [61] or [62], wherein the targeting moiety is a polypeptide;

[64] the pharmaceutical composition according to any of [61]-[63], wherein the targeting moiety is an antibody or an antigen binding fragment of an antibody;

[65] the pharmaceutical composition according to any of [61]-[64], wherein the targeting moiety binds the surface antigen with an equilibrium dissociation constant (Kd) in a range of $50 \times 10^{-12}$ to $10 \times 10^{-6}$ as determined using BIACORE® analysis;

[66] the pharmaceutical composition according to any of [61]-[65], wherein the targeting moiety specifically binds one or more folate receptors selected from: folate receptor alpha (FR-α), folate receptor beta (FR-β), and folate receptor delta (FR-δ);

[67] the pharmaceutical composition according to any of [61]-[66], wherein the targeting moiety comprises one or more selected from: an antibody, a humanized antibody, an antigen binding fragment of an antibody, a single chain antibody, a single-domain antibody, a bi-specific antibody, a synthetic antibody, a pegylated antibody, and a multimeric antibody;

[68] the pharmaceutical composition according to any of [62]-[67], wherein each pegylated liposome comprises 1 to 1000, 50 to 750, 100 to 500, or 30 to 200 targeting moieties, or any range therein between;

[69] the pharmaceutical composition according to any of [13]-[67], further comprising one or more of an FABP, an immunostimulatory agent, an immunosuppressing agent, a detectable marker and a maleimide, wherein the FABP, the immunostimulatory agent, the immunosuppressing agent, the detectable marker or the maleimide is attached to said PEG or the exterior of the liposome;

[70] the pharmaceutical composition according to [69], which comprises at least one immunostimulating agent selected from: a protein immunostimulating agent; a nucleic acid immunostimulating agent; a chemical immunostimulating agent; a hapten; and an adjuvant;

[71] the pharmaceutical composition of [69] or [60], wherein the immunostimulating agent is at least one selected from: a fluorescein; a fluorescein isothiocyanate (FITC); a DNP; a beta glucan; a beta-1,3-glucan; a beta-1,6-glucan; a resolvin (e.g., a resolvin D such as Dn-6DPA or Dn-3DPA, a Resolvin E, or a T series resolvin); and a Toll-like receptor (TLR) modulating agent such as, an oxidized low-density lipoprotein (e.g., OXPAC, PGPC), or an eritoran-like lipid (e.g., E5564);

[72] the pharmaceutical composition according to any of [69]-[71], which comprises FABP;

[73] the pharmaceutical composition according to any of [69]-[72], which further comprises a hapten;

[74] the pharmaceutical composition of [73], wherein the hapten comprises one or more of fluorescein or Beta 1,6-glucan;

[75] the pharmaceutical composition according to any of [1]-[74], which further comprises at least one cryoprotectant selected from consisting of mannitol; trehalose; sorbitol; and sucrose;

[76] a targeted composition comprising the pharmaceutical composition according to any of [1]-[75];

[77] a non-targeted liposome composition comprising the pharmaceutical composition according to any of [13]-[60] or [69]-[75];

[78] the pharmaceutical composition according to any of [1]-[77], for use in the treatment of disease or a condition in a subject;

[79] use of the pharmaceutical composition according to any of [1]-[78], in the manufacture of a medicament for the treatment of disease in a subject;

[80] a method for treating or preventing a disease in a subject needing such treatment or prevention, the method comprising administering the pharmaceutical composition of any of [1]-[79] to the subject;

[81] the pharmaceutical composition of [78], use of [79], or method of [80], wherein the disease or condition is associated with endotoxemia;

[82] the pharmaceutical composition of [78], use of [79], or method of [80], wherein the disease or condition is sepsis;

[83] the pharmaceutical composition of [78], use of [79], or method of [80], wherein the subject is a burn victim;

[84] the pharmaceutical composition of [78], use of [79], or method of [80], wherein the disease or condition is an infection (e.g., a bacterial infection such as an *P. aeruginosa* infection, an *S. aureus* infection (e.g., MRSA) or a condition associated therewith, or an enterococcal infection (e.g., VRE), a fungal infection (e.g., a candidiasis infection (e.g., invasive candidiasis) or a condition associated therewith, or a parasitic infection or a condition associated therewith such as malaria (or an associated condition such as cerebral malaria, severe anemia, acidosis, acute kidney failure and ARDS), Schistosomiasis, and human African trypanosomiasis, and conditions associated therewith; a viral infection or a condition associated therewith such as Ebola, Dengue and Marburg (or an associated condition such as influenza, measles, and a viral hemorrhagic fever)

[85] the pharmaceutical composition of [78], use of [79], or method of [80], wherein the disease or condition is bacteremia;

[86] the pharmaceutical composition of [78], use of [79], or method of [80], wherein the disease or condition is a liver disease or condition (e.g., cirrhosis, nonalcoholic fatty liver disease (NAFLD), non-alcoholic steatohepatitis (NASH); alcoholic liver disease, acute liver injury, and cirrhosis of the liver);

[87] the pharmaceutical composition of [78], use of [79], or method of [80], wherein the disease or condition is a lung disease or condition (e.g., acute respiratory distress syndrome (ARDS), pulmonary fibrosis, pulmonary hemorrhage, lung injury, lung cancer, chronic obstructive pulmonary disease (COPD) and other respiratory disorders);

[88] the pharmaceutical composition of [78], use of [79], or method of [80], wherein the disease or condition is kidney disease (e.g., lipopolysaccharide medication or toxin induced acute kidney injury (AKI) and end stage kidney disease);

[89] the pharmaceutical composition of [78], use of [79], or method of [80], wherein the disease or condition is an autoimmune disorder (e.g., psoriasis, cystic fibrosis, and rheumatoid arthritis);

[90] the pharmaceutical composition of [78], use of [79], or method of [80], wherein the disease or condition is sclerosis (e.g., systemic sclerosis);

[91] the pharmaceutical composition of [78], use of [79], or method of [80], wherein the subject is a critically ill patient;

[92] the pharmaceutical composition of [78], use of [79], or method of [80], wherein the subject is at risk of developing sepsis;

[93] the pharmaceutical composition of [78], use of [79], or method of [80], wherein the disease or condition is a low grade endotoxemic disease;

[94] the pharmaceutical composition of [78], use of [79], or method of [80], wherein the disease or condition is inflammation (e.g., systemic inflammation, low-grade inflammation, acute inflammation, and chronic inflammatory disease);

[95] the pharmaceutical composition of [78], use of [79], or method of [80], wherein the disease or condition is inflammatory bowel disease (e.g., Crohn's disease and ulcerative colitis);

[96] the pharmaceutical composition of [78], use of [79], or method of [80], wherein the subject is immunocompromised;

[97] the pharmaceutical composition of [78], use of [79], or method of [80], wherein the subjects receives chemotherapy and/or is immune-suppressed (e.g., febrile neutropenic patients);

[98] the pharmaceutical composition of [78], use of [79], or method of [80], wherein the disease or condition is a metabolic disease;

[99] the pharmaceutical composition of [78], use of [79], or method of [80], wherein the disease or condition is insulin resistance;

[100] the pharmaceutical composition of [78], use of [79], or method of [80], wherein the disease or condition is diabetes or an associated conditions such as gangrene, diabetic necrosis, diabetic neuropathy, diabetic vascular disease (e.g., microvascular disease such as retinopathy and nephropathy, and diabetic ulcers);

[101] the pharmaceutical composition of [78], use of [79], or method of [80], wherein the disease or condition is type 2 diabetes;

[102] the pharmaceutical composition of [78], use of [79], or method of [80], wherein the disease or condition is a cardiovascular disease (e.g., coronary artery disease such as myocardial infarction, sudden cardiac death, cardiorespiratory arrest, hypertension, pulmonary arterial hypertension, atherosclerosis, occlusive arterial disease, Raynaud's disease, peripheral vascular disease, other vasculopathies such as Buerger's disease, Takayasu's arthritis, and post-cardiac arrest syndrome (PCAS), chronic venous insufficiency, heart disease, congestive heart failure, chronic skin ulcers);

[103] the pharmaceutical composition of [78], use of [79], or method of [80], wherein the disease or condition is characterized by ischemia or hypoxia (e.g., ischemic-reperfusion injury, transient cerebral ischemia, cerebral ischemia-reperfusion, ischemic stroke, hemorrhagic stroke, traumatic brain injury, migraine (e.g., a chronic migraine or severe migraine disorder), gastrointestinal ischemia, kidney disease, pulmonary embolism, acute respiratory failure, neonatal respiratory distress syndrome, obstetric emergencies to reduce perinatal comorbidity (such as, pre/eclampsia and conditions that lead to cerebral palsy), myocardial infarction, acute limb or mesenteric ischemia, cardiac cirrhosis, chronic peripheral vascular disease, congestive heart failure, atherosclerotic stenosis, anemia, thrombosis, embolism, macular degeneration, a neurodegenerative disease (such as Alzheimer's disease, Parkinson's disease, or Amyotrophic Lateral Sclerosis (ALS)), sleep apnea, and surgery or traumatic injury);

[104] the pharmaceutical composition of [78], use of [79], or method of [80], wherein the disease or condition is heart attack or stroke (e.g., ischemic and hemorrhagic stroke);

[105] the pharmaceutical composition of [78], use of [79], or method of [80], wherein the disease or condition is shock (e.g., cardiogenic shock, hypovolemic shock, septic shock, neurogenic shock, and anaphylactic shock);

[106] the pharmaceutical composition of [78], use of [79], or method of [80], wherein the disease or condition is associated with nitric oxide deficiency (e.g., sickle cell disease, paroxysmal nocturnal hemoglobinuria (PNH), a hemolytic anemia, a thalassemia, another red blood cell disorder, a purpura such as thrombotic thrombocytic purpura (TTP), hemolytic uremic syndrome (HUS), idiopathic thrombocytopenia (ITP), another platelet disorder, a coagulation abnormality such as disseminated intravascular coagulopathy (DIC), purpura fulminans, heparin induced thrombocytopenia (HIT), hyperleukocytosis, and hyper viscosity syndrome, or a condition associated therewith;

[107] the pharmaceutical composition of [78], use of [79], or method of [80], wherein the disease or condition is endotoxemia, such as the endotoxemia associated with conditions like periodontal disease (e.g., periodontitis or inflammation of the gums), chronic alcoholism, chronic smoking, transplantation, neonatal necrotizing enterocolitis, or neonatal ear infection;

[108] a method of reducing systemic levels of LPS, endotoxin and/or another trigger of systemic inflammation in a subject in need thereof, the method comprising administering the pharmaceutical composition of any of [1]-[78] to the subject;

[109] the method according to any of [80]-[108], wherein the pharmaceutical composition is administered in combination therapy with another therapeutic agent;

[110] a method of preparing a liposomal composition of any of [13]-[77], the method comprising: forming a mixture comprising: liposomal components in solution; homogenizing the mixture to form liposomes in the solution; and processing the mixture to form liposomes containing an ionizable carotenoid;

[111] the method according to [110], wherein the processing step includes one or more steps of: thin film hydration, extrusion, in-line mixing, ethanol injection technique, freezing-and-thawing technique, reverse-phase evaporation, dynamic high pressure microfluidization, microfluidic mixing, double emulsion, freeze-dried double emulsion, 3D printing, membrane contactor method, and stirring;

[112] the method according to [110] or [111], wherein said processing step includes one or more steps of modifying the size of the liposomes by one or more of steps of extrusion, high-pressure microfluidization, and/or sonication;

[113] a method of preparing a pharmaceutical composition comprising:
(a) preparing a liposomal solution containing liposomes in a weak acid salt of a multivalent metal;
(b) adding an ionizable carotenoid according to any of [1]-[7], [10], or [11], to the liposomal solution; and
(c) maintaining the ionizable carotenoid in the liposomal solution for sufficient time to load the carotenoid into liposomes;

[114] the method of [113], wherein the weak acid is an organic acid (e.g., an organic acid selected from acetic acid, gluconic acid, tartaric acid, glutamic acid, citric acid, formic acid, and glycinic acid);

[115] the method of [113] or [114], wherein the multivalent metal is selected is a divalent metal (e.g., a divalent metal selected from $Ca^{2+}$, $Mg^{2+}$, $Zn^{2+}$, $Cu^{2+}$, $Co^{2+}$, and $Fe^{2+}$), or a trivalent metal such as $Fe^{3+}$;

[116] the method according to any of [113]-[115], wherein the weak acid is acetic acid and the multivalent metal is $Ca^{2+}$ or $Mg^{2+}$ (i.e., the weak acid salt of the multivalent metal is calcium acetate or magnesium acetate, respectively);

[117] a pharmaceutical composition prepared according to the method of any of [109]-[115];

[118] a method of preparing pharmaceutical composition comprising a liposome encapsulating trans-crocetin, the method comprising:
(a) preparing a liposomal solution comprising liposomes and a solution containing a weak acid salt of a multivalent metal;

(b) adding trans-crocetin to the liposomal solution; and
(c) maintaining the trans-crocetin in the liposomal solution for sufficient time to load trans-crocetin into liposomes;

[119] the method of [118], wherein the weak acid is an organic acid (e.g., acetic acid, gluconic acid, tartaric acid, glutamic acid, citric acid, formic acid, and glycinic acid);

[120] the method of [118] or [119], wherein the multivalent metal is a divalent metal (e.g., a divalent metal selected from $Ca^{2+}$, $Mg^{2+}$, $Zn^{2+}$, $Cu^{2+}$, $Co^{2+}$, and $Fe^{2+}$), or a trivalent metal such as $Fe^{3+}$; and/or

[121] the method according to any of claims [118]-[120], wherein the weak acid is acetic acid and the multivalent metal is $Ca^{2+}$ or $Mg^{2+}$; and/or

[122] a pharmaceutical composition prepared according to the method according to any of [117]-[120].

Still other features Still other features and advantages of the compositions and methods described herein will become more apparent from the following detailed description when read in conjunction with the accompanying drawings.

BRIEF DESCRIPTION OF THE DRAWINGS/FIGURES

FIG. 1A, FIG. 1B, FIG. 1C, and FIG. 1D, depict the exemplary ionizable Polyene Carotenoids of the provided pharmaceutical compositions.

FIG. 2. Calcium trans-crocetinate liposome (CTC-LP) stability at 4° C. over 6 months. The CTC-LP test articles contain drug/lipid (D/L) ratios of 80, 60, and 40. Each CTC-LP test article showed negligible leaching (change in D/L ratio) over the 6-month evaluation period.

FIG. 3. Liposomal CTC batch reproducibility. Four batches of liposomal CTC were reproducible and stable at 4° C., up to at least 7 months.

FIG. 4. Magnesium trans-crocetinate liposome (MTC-LP) stability at 4° C. over 6 months. The MTC-LP test articles contain drug/lipid (D/L) ratios of 80, 60, and 40. Each MTC-LP test article showed negligible leaching (change in D/L ratio) over the 2 month evaluation period.

FIG. 5. Survival Study 1 (TP-936): study of CTC-LP efficacy in mouse CLP sepsis model. Survival curve of mice treated with test articles (a) liposomal CTC (D/L80)+antibiotic, (b) liposomal CTC (D/L80) and PGPC+antibiotic, (c) saline+antibiotic, and (d) sham. Test articles (a) and (b) (in combination with imipenem) demonstrated a trend toward reduction in mortality when compared to the imipenem-treated control (c).

Figure 6:
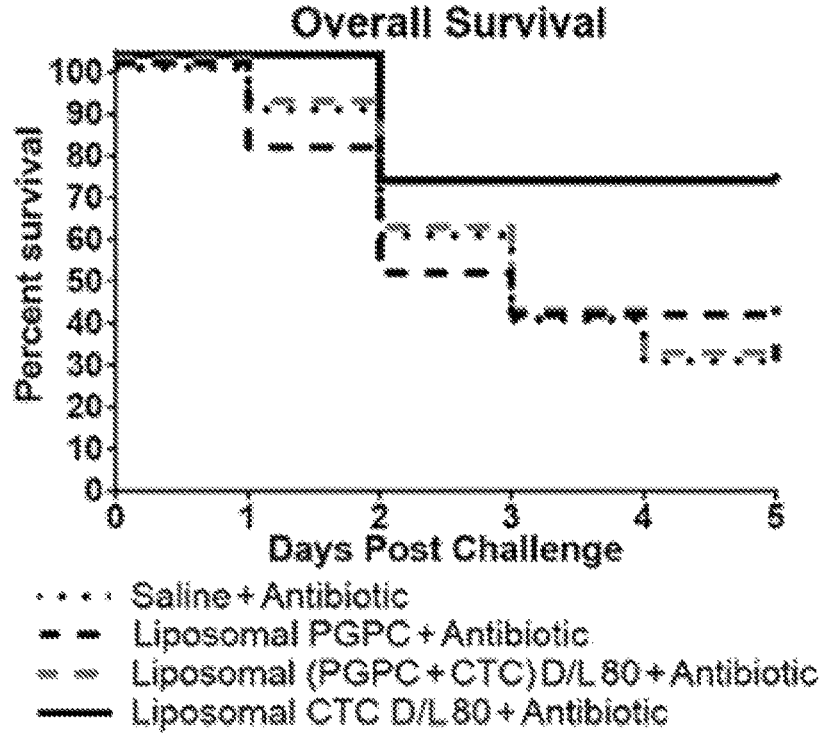

FIG. 6. Survival Study 2 (TP-967): mouse CLP sepsis study. Survival curve of mice treated with test articles (a) liposomal PGPC+antibiotic, (b) liposomal (PGPC and CTC) (D/L80)+antibiotic, (c) liposomal CTC (D/L80)+antibiotic, and (d) saline+antibiotic. Test article (c) demonstrated a trend toward reduction in mortality when compared to the imipenem-treated control (d).

Figure 7:
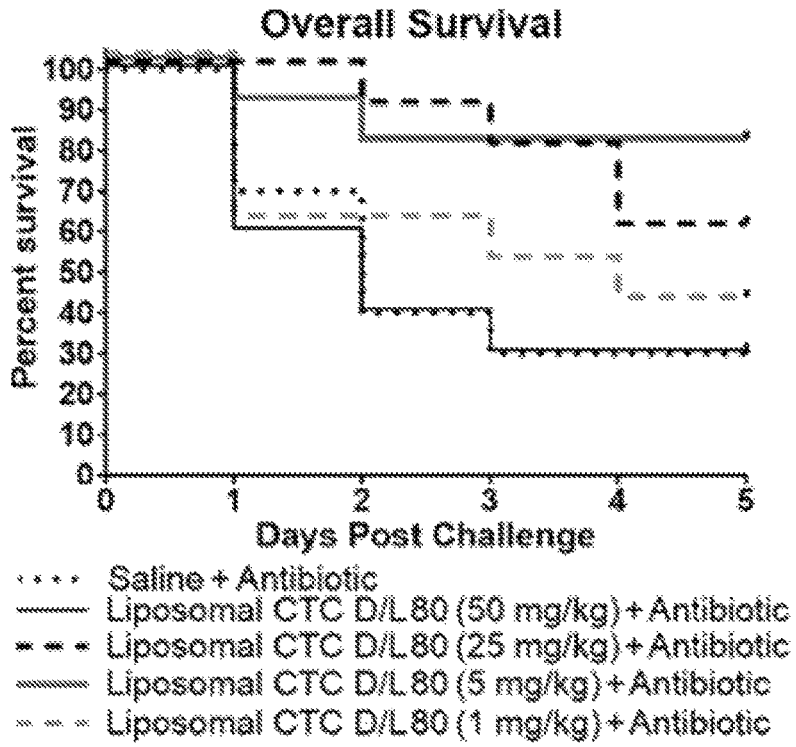

FIG. 7. Survival Study 3 (TP-986): mouse CLP sepsis study. Survival curve of mice treated with test articles (a) liposomal CTC (D/L80)(1 mg/kg)+antibiotic, (b) liposomal CTC (D/L80)(5 mg/kg)+antibiotic, (c) liposomal CTC (D/L80)(25 mg/kg)+antibiotic, (d) liposomal CTC (D/L80) (50 mg/kg)+antibiotic, and (e) saline+antibiotic. Each of test articles (a), (c), and (d) demonstrated a trend toward reduction in mortality when compared to the imipenem-treated control (d). Test article (b) (liposomal CTC (D/L80)(5 mg/kg)+antibiotic) demonstrated a statistically significant decrease in mortality when compared to the imipenem-treated control (d)(P=0.0321).

DETAILED DESCRIPTION

The Applicants have surprisingly discovered that pharmaceutical compositions such as liposomes comprising multivalent ionizable carotenoid salts containing multivalent counterions substantially improves the pharmacokinetics (e.g., half-life, stability, and bioavailability) and dramatically increases drug exposure via a sustained release of the ionizable carotenoid when compared to for example, carotenoid free acids and ionizable carotenoid salts containing monovalent counterions.

Definitions

Unless otherwise defined, all technical and scientific terms used herein have the same meaning as commonly understood by one of ordinary skill in the art to which this disclosure pertains. Although methods and materials similar or equivalent to those described herein can be used in the practice or testing of the provided compositions, suitable methods and materials are described below. Each publication, patent application, patent, and other reference mentioned herein is herein incorporated by reference in its entirety. In case of conflict, the present specification, including definitions, will control. In addition, the materials, methods, and examples are illustrative only and are not intended to be limiting.

Other features and advantages of the disclosed compositions and methods will be apparent from the following disclosure, drawings, and claims.

It is understood that wherever embodiments, are described herein with the language "comprising" otherwise analogous embodiments, described in terms of "containing" "consisting of" and/or "consisting essentially of" are also provided. However, when used in the claims as transitional phrases, each should be interpreted separately and in the appropriate legal and factual context (e.g., in claims, the transitional phrase "comprising" is considered more of an open-ended phrase while "consisting of" is more exclusive and "consisting essentially of" achieves a middle ground).

As used herein, the singular form "a", "an", and "the", include plural forms unless it is expressly stated or is unambiguously clear from the context that such is not intended. The singular form "a", "an", and "the" also includes the statistical mean composition, characteristics, or size of the particles in a population of particles (e.g., mean liposome diameter, mean liposome zeta potential, mean number of targeting moieties on liposomes in a liposomal solution, mean number of encapsulated carotenoids). The mean particle size and zeta potential of liposomes in a pharmaceutical composition can routinely be measured using methods known in the art, such as dynamic light scattering. The mean amount of a therapeutic agent in a nanoparticle composition may routinely be measured for example, using absorption spectroscopy (e.g., ultraviolet-visible spectroscopy).

As used herein, the terms "approximately" and "about," as applied to one or more values of interest, refer to a value that is similar to a stated reference value. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value). For example, when used in the context of an amount of a given compound in a lipid component of a nanoparticle composition, "about" may mean+/−10% of the recited value. For instance, a nanoparticle composition including a lipid component having about 40% of a given compound may include 30-50% of the compound.

The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

Where embodiments, of the disclosure are described in terms of a Markush group or other grouping of alternatives, the disclosed composition or method encompasses not only the entire group listed as a whole, but also each member of the group individually and all possible subgroups of the main group, and also the main group absent one or more of the group members. The disclosed compositions and methods also envisage the explicit exclusion of one or more of any of the group members in the disclosed compositions or methods.

The term "liposome" refers to a closed vesicle having an internal phase (i.e., interior space (internal solution)) enclosed by lipid bilayer. A liposome can be a small single-membrane liposome such as a small unilamellar vesicle (SUV), large single-membrane liposome such as a large unilamellar vesicle (LUV), a still larger single-membrane liposome such as a giant unilamellar vesicle (GUV), a multilayer liposome having multiple concentric membranes (e.g., 2, 3, 4, 5, 6, 7, 8, 9, or 10), such as a multilamellar vesicle (MLV), or a liposome having multiple membranes that are irregular and not concentric such as a multivesicular vesicle (MVV). Liposomes and liposome formulations are well known in the art. Lipids which are capable of forming liposomes include all substances having fatty or fat-like properties. Lipids which can make up the lipids in the liposomes include without limitation, glycerides, glycerophospholipids, glycerophosphinolipids, glycerophosphonolipids, sulfo-lipids, sphingolipids, phospholipids, isoprenolides, steroids, stearines, sterols, archeolipids, synthetic cationic lipids and carbohydrate containing lipids.

A "liposome composition" is a prepared composition comprising a liposome and the contents within the liposome, particularly including the lipids which form the liposome bilayer(s), compounds other than the lipids within the bi-layer(s) of the liposome, compounds within and associated with the aqueous interior(s) of the liposome, and compounds bound to or associated with the outer layer of the liposome. Thus, in addition to the lipids of the liposome, a liposome composition described herein suitably may include, but is not limited to, therapeutic agents, immunostimulating agents, vaccine antigens and adjuvants, excipients, carriers and buffering agents. In a preferred embodiment, such compounds are complementary to and/or are not significantly detrimental to the stability or AGP-incorporation efficiency of the liposome composition.

The terms liposome "internal phase", "interior space", and "internal core" are used interchangeably to refer to an aqueous region enclosed within (i.e., encapsulated by) the lipid bilayer of the liposome. The solution of the liposomal internal phase is referred to as the "internal solution." By contrast, the term "liposome external phase" refers to the region not enclosed by the lipid bilayer of the liposome, such as the region apart from the internal phase and the lipid bilayer in the case where the liposome is dispersed in liquid.

The term "counterion" refers to an anionic or cationic counterion. A "cationic counterion" is a positively charged atom or group associated with an anionic atom or group in order to maintain electronic neutrality. Exemplary cationic counterions include inorganic cations (e.g., metal cations (e.g., alkali metal cations, alkali earth metal cations, and transition metal cations)) and organic cations (e.g., ammonium cations, sulfonium cations, phosphonium cations, and pyridinium cations). An "anionic counterion" is a negatively charged atom or group associated with a cationic atom or group in order to maintain electronic neutrality. Exemplary anionic counterions include halide anions (e.g., $F^-$, $Cl^-$, $Br^-$, and $I^-$), $NO_3^-$, $ClO_4^-$, $OH^-$, $H_2PO_4^{-2}$, $HSO_4^-$, sulfonate anions (e.g., methansulfonate, trifluoromethanesulfonate, p-toluenesulfonate, benzenesulfonate, 10-camphor sulfonate, naphthalene-2-sulfonate, naphthalene-1-sulfonic acid-5-sulfonate, ethan-1-sulfonic acid-2-sulfonate, and the like), and carboxylate anions (e.g., acetate, ethanoate, propanoate, benzoate, glycerate, lactate, tartrate, and glycolate). A counterion may be monovalent or multivalent (e.g., divalent, trivalent, tetravalent, etc.).

The term "ionizable" refers to a compound containing at least one functional group that (a) bears a positive or negative charge (i.e., is "ionized") and is therefore associated with a counterion of opposite charge, or (b) is electronically neutral but ionized at a higher or lower pH. Thus, ionizable compounds include quaternary ammonium salts as well as uncharged amines, and carboxylate moieties as well as uncharged carboxyl groups.

The term "carotenoid", as used herein, refers to organic pigments which are structurally composed of a polyene hydrocarbon chain, and which may terminate in a ring. Carotenoids are divided into two classes, xanthophylls (which contain oxygen atoms) and carotenes (which contain no oxygen atoms). Non-limiting examples of carotenoids suitable for use in the provided compositions and methods are provided in FIGS. 1A-FIG. 1D. Carotenoids with ionizable functional groups comprise naturally occurring carotenoid sulphates, carotenoid carboxylic acids/carboxylates, synthetic phosphates, blue carotenoid oxonium ions and blue carotenoproteins.

The term "Polyene Carotenoid" as used herein, refers to a carotenoid containing 3 or more conjugated double bonds, and methyl or low alkyl (C2-C3) substitutions.

The term "naturally occurring" refers to a compound or composition that occurs in nature, regardless of whether the compound or composition has been isolated from a natural source or chemically synthesized. Examples of naturally occurring carotenoid mono- and di-carboxylic acids include crocetin, norbixin, azafrin and neurosporaxanthin.

An "apocarotenoid" is a carotenoid degradation product in which the normal structure (e., C40) has been shortened by the removal of fragments from one or both ends. Examples of naturally occurring apocarotenoids include crocetin (C20), bixin (C25), Vitamin A, abscisic acid, mycorradicin and blumenin.

The term "targeting moiety" is used herein to refer to a molecule that provides an enhanced affinity for a selected target, e.g., a cell, cell type, tissue, organ, region of the body, or a compartment, e.g., a cellular, tissue or organ compartment. The targeting moiety can comprise a wide variety of entities. Targeting moieties can include naturally occurring molecules, or recombinant or synthetic molecules. In some embodiments, the targeting moiety is an antibody, antigen-binding antibody fragment, bispecific antibody or other antibody-based molecule or compound. In some embodiments, the targeting moiety is an aptamer, avimer, a receptor-binding ligand, a nucleic acid, a biotin-avidin binding pair, a peptide, protein, carbohydrate, lipid, vitamin, toxin, a component of a microorganism, a hormone, a receptor ligand or any derivative thereof. Other targeting moieties are known in the art and are encompassed by the disclosure.

The terms "specific affinity" or "specifically binds" mean that a targeting moiety such as an antibody or antigen binding antibody fragment, reacts or associates more frequently, more rapidly, with greater duration, with greater affinity, or with some combination of the above to the epitope, protein, or target molecule than with alternative substances, including proteins unrelated to the target epitope. Because of the sequence identity between homologous proteins in different species, specific affinity can, in several embodiments, include a binding agent that recognizes a protein or target in more than one species. Likewise, because of homology within certain regions of polypeptide sequences of different proteins, the term "specific affinity" or "specifically binds" can include a binding agent that recognizes more than one protein or target. It is understood that, in certain embodiments, a targeting moiety that specifically binds a first target may or may not specifically bind a second target. As such, "specific affinity" does not necessarily require (although it can include) exclusive binding, e.g., binding to a single target. Thus, a targeting moiety may, in certain embodiments, specifically bind more than one target. In certain embodiments, multiple targets may be bound by the same targeting moiety.

The term "epitope" refers to that portion of an antigen capable of being recognized and specifically bound by a targeting moiety (i.e., binding moiety) such as an antibody. When the antigen is a polypeptide, epitopes can be formed both from contiguous amino acids and noncontiguous amino acids juxtaposed by tertiary folding of a protein. Epitopes formed from contiguous amino acids are typically retained upon protein denaturing, whereas epitopes formed by tertiary folding are typically lost upon protein denaturing. An epitope typically includes at least 3, and more usually, at least 5 or 8-10 amino acids in a unique spatial conformation.

Expressions like "binding affinity for a target", "binding to a target" and analogous expressions known in the art refer to a property of a targeting moiety which may be directly measured through the determination of the affinity constants, e.g., the amount of targeting moiety that associates and dissociates at a given antigen concentration. Different methods can be used to characterize the molecular interaction, such as, but not limited to, competition analysis, equilibrium analysis and microcalorimetric analysis, and real-time interaction analysis based on surface plasmon resonance interaction (for example using a BIACORE® instrument). These methods are well-known to the skilled person and are described, for example, in Neri et al., Tibtech 14:465-470 (1996), and Jansson et al., J. Biol. Chem. 272:8189-8197 (1997).

As used herein an "effective amount" refers to a dosage of an agent sufficient to provide a medically desirable result. The effective amount will vary with the desired outcome, the particular condition being treated or prevented, the age and physical condition of the subject being treated, the severity of the condition, the duration of the treatment, the nature of the concurrent or combination therapy (if any), the specific route of administration and like factors within the knowledge and expertise of the health practitioner. An "effective amount" can be determined empirically and in a routine manner, in relation to the stated purpose. In the case of cancer, the effective amount of an agent may reduce the number of cancer cells; reduce the tumor size; inhibit (i.e., slow to some extent and preferably stop) cancer cell infiltration into peripheral organs; inhibit (i.e., slow to some extent and preferably stop) tumor metastasis; inhibit, to some extent, tumor growth; and/or relieve to some extent one or more of the symptoms associated with the disorder. To the extent the drug may prevent growth and/or kill existing cancer cells, it may be cytostatic and/or cytotoxic. For cancer therapy, efficacy in vivo can, for example, be measured by assessing the duration of survival, duration of progression free survival (PFS), the response rates (RR), duration of response, and/or quality of life.

The terms "hyperproliferative disorder", "proliferative disease", and "proliferative disorder", are used interchangeably herein to pertain to an unwanted or uncontrolled cellular proliferation of excessive or abnormal cells which is undesired, such as, neoplastic or hyperplastic growth, whether in vitro or in vivo. In some embodiments, the proliferative disease is cancer or tumor disease (including benign or cancerous) and/or any metastases, wherever the cancer, tumor and/or the metastasis is located. In some embodiments, the proliferative disease is a benign or malignant tumor. In some embodiments, the proliferative disease is a non-cancerous disease. In some embodiments, the proliferative disease is a hyperproliferative condition such as hyperplasias, fibrosis (especially pulmonary, but also other types of fibrosis, such as renal fibrosis), angiogenesis, psoriasis, atherosclerosis and smooth muscle proliferation in the blood vessels, such as stenosis or restenosis following angioplasty.

"Cancer," "tumor," or "malignancy" are used as synonymous terms and refer to any of a number of diseases that are characterized by uncontrolled, abnormal proliferation of cells, the ability of affected cells to spread locally or through the bloodstream and lymphatic system to other parts of the body (metastasize) as well as any of a number of characteristic structural and/or molecular features. "Tumor," as used herein refers to all neoplastic cell growth and proliferation, whether malignant or benign, and all pre-cancerous and cancerous cells and tissues. A "cancerous tumor," or "malignant cell" is understood as a cell having specific structural properties, lacking differentiation and being capable of invasion and metastasis. A cancer that can be treated using a carotenoid pharmaceutical composition provided herein includes without limitation, a non-hematologic malignancy including such as for example, lung cancer, pancreatic cancer, breast cancer, ovarian cancer, prostate cancer, head and neck cancer, gastric cancer, gastrointestinal cancer, colorectal cancer, esophageal cancer, cervical cancer, liver cancer, kidney cancer, biliary duct cancer, gallbladder cancer, bladder cancer, sarcoma (e.g., osteosarcoma), brain cancer, central nervous system cancer, and melanoma; and a hematologic malignancy such as for example, a leukemia, a lymphoma and other B cell malignancies, myeloma and other plasma cell dysplasias or dyscrasias. Other types of cancer and tumors that may be treated using a trans-crocetin composition are described herein or otherwise known in the art. The terms "cancer," "cancerous," "cell proliferative disorder," "proliferative disorder," and "tumor" are not mutually exclusive as referred to herein.

Terms such as "treating," or "treatment," or "to treat" refer to both (a) therapeutic measures that cure, slow down, attenuate, lessen symptoms of, and/or halt progression of a diagnosed pathologic condition or disorder and (b) prophylactic or preventative measures that prevent and/or slow the development of a targeted disease or condition. Thus, subjects in need of treatment include those already with the cancer, disorder or disease; those at risk of having the cancer or condition; and those in whom the infection or condition is to be prevented. Subjects are identified as "having or at risk of having" sepsis, an infectious disease, a disorder of the immune system, a metabolic disorder (e.g., diabetes), a hyperproliferative disease, or another disease or disorder referred to herein using well-known medical and diagnostic techniques. In certain embodiments, a subject is successfully "treated" according to the methods provided herein if the subject shows, e.g., total, partial, or transient amelioration or elimination of a symptom associated with the disease or condition (e.g., cancer and arthritis such as rheumatoid arthritis). In specific embodiments, the terms "treating," or "treatment," or "to treat" refer to the amelioration of at least one measurable physical parameter of a proliferative disorder, such as growth of a tumor, not necessarily discernible by the patient. In other embodiments, the terms "treating," or "treatment," or "to treat" refer to the inhibition of the progression of a proliferative disorder, either physically by, e.g., stabilization of a discernible symptom, physiologically by, e.g., stabilization of a physical parameter, or both. In other embodiments, the terms "treating," or "treatment," or "to treat" refer to the reduction or stabilization of tumor size, tumor cell proliferation or survival, or cancerous cell count. Treatment can be with a provided pharmaceutical composition disclosed herein (e.g., a liposomal trans-crocetinate) alone, or in combination with an additional therapeutic agent.

"Subject" and "patient," and "animal" are used interchangeably and refer to mammals such as human patients and non-human primates, as well as experimental animals such as rabbits, rats, and mice, and other animals. Animals include all vertebrates, e.g., mammals and non-mammals, such as chickens, amphibians, and reptiles. "Mammal" as used herein refers to any member of the class Mammalia, including, without limitation, humans and nonhuman primates such as chimpanzees and other apes and monkey species; farm animals such as cattle, sheep, pigs, goats and horses; domestic mammals such as dogs and cats; laboratory animals including rodents such as mice, rats and guinea pigs, and other members of the class Mammalia known in the art. In a particular embodiment, the patient is a human.

The term "pharmaceutically acceptable carrier" refers to an ingredient in a pharmaceutical formulation, other than an active ingredient, which is nontoxic to a subject. A pharmaceutically acceptable carrier includes, but is not limited to, a buffer, carrier, excipient, stabilizer, diluent, or preservative. Pharmaceutically acceptable carriers can include for example, one or more compatible solid or liquid filler, diluents or encapsulating substances which are suitable for administration to a human or other subject.

"Therapeutic agent": In some embodiments, the provided liposome compositions and liposomal formulations, comprise liposomes encapsulating or otherwise associated with one or more therapeutic agents present anywhere in, on, or around the liposome. For example, a therapeutic agent can be embedded in the lipid bilayer of the liposome, encapsulated in the internal phase of the liposome, or tethered to the exterior of the liposome. The therapeutic agent or therapeutic agents used according to the disclosed compositions and methods can include any agent directed to treat a condition in a subject. Examples of therapeutic agents that may be suitable for use in accordance with the disclosed methods include vitamin C, thiamine, hydrocortisone or another corticosteroid (e.g., a glucocorticoid such as, cortisone, ethamethasoneb, prednisone, prednisolone, triamcinolone, dexamethasone and methylprednisolone; and mineralocorticoids such as fludrocortisonel), astaxanthin, abscisic acid, vitamin A, angiotensin II (e.g., GIAPREZA™), tissue plasminogen activator (tPA), an antimicrobial (e.g., antibiotic) and an anti-inflammatory.

Additional examples of therapeutic agents that may be suitable for use in accordance with the disclosed methods include, without limitation, anti-restenosis, pro- or anti-proliferative, anti-neoplastic, antimitotic, anti-platelet, anti-coagulant, antifibrin, antithrombin, cytostatic, antibiotic and other anti-infective agents, anti-enzymatic, anti-metabolic, angiogenic, cytoprotective, angiotensin converting enzyme (ACE) inhibiting, angiotensin II receptor antagonizing and/or cardioprotective agents. In general, any therapeutic agent known in the art can be used, including without limitation agents listed in the United States Pharmacopeia (U.S.P.), Goodman and Gilman's The Pharmacological Basis of Therapeutics, 10$^{th}$ Ed., McGraw Hill, 2001; Katzung, Ed., Basic and Clinical Pharmacology, McGraw-Hill/Appleton & Lange, 8$^{th}$ ed., Sep. 21, 2000; Physician's Desk Reference (Thomson Publishing; and/or The Merck Manual of Diagnosis and Therapy, 18$^{th}$ ed., 2006, Beers and Berkow, Eds., Merck Publishing Group; or, in the case of animals, The Merck Veterinary Manual, 9th ed., Kahn Ed., Merck Publishing Group, 2005; all of which are incorporated herein by reference used herein to refer to an agent or a derivative thereof that can interact with a hyperproliferative cell such as a cancer cell or an immune cell, thereby reducing the proliferative status of the cell and/or killing the cell. Examples of therapeutic agents include, but are not limited to, chemotherapeutic agents, cytotoxic agents, platinum-based agents (e.g., cisplatin, carboplatin, oxaliplatin), taxanes (e.g., Taxol), etoposide, alkylating agents (e.g., cyclophosphamide, ifosamide), metabolic antagonists (e.g., methotrexate (MTX), 5-fluorouracil, gemcitabine, pemetrexed, or derivatives thereof), antitumor antibiotics (e.g., mitomycin, doxorubicin), plant-derived antitumor agents (e.g., vincristine, vindesine, Taxol). Such agents may further include, but are not limited to, the anticancer agents trimetrexate, TEMOZOLOMIDE™, RALTRITREXED™, S-(4-Nitrobenzyl)-6-thioinosine (NBMPR), 6-benzyguanidine (6-BG), bis-chloronitrosourea (BCNU) and CAMPTOTHECIN™, or a therapeutic derivative of any thereof. "Therapeutic agents" also refer to salts, acids, and free based forms of the above agents.

The term "pharmaceutically acceptable carrier" refers to an ingredient in a pharmaceutical formulation, other than an active ingredient, which is nontoxic to a subject. A pharmaceutically acceptable carrier includes, but is not limited to, a buffer, carrier, excipient, stabilizer, diluent, or preservative. Pharmaceutically acceptable carriers can include for example, one or more compatible solid or liquid filler, diluents or encapsulating substances which are suitable for administration to a human or other subject.

The term "kit" refers to a set of two or more components necessary for employing the methods and compositions provided herein. Kit components can include, but are not limited to, liposome compositions and liposomal formulations disclosed herein, reagents, buffers, containers and/or equipment. The phrase "stored separately" refers to a manner of liposome storage that prevents a first population of liposomes from contacting another population of liposomes.

The term "radiosensitizing agent" means a compound that makes tumor cells more sensitive to radiation therapy. Examples of radiosensitizing agents include misonidazole, metronidazole, tirapazamine, and trans-crocetin.

Pharmaceutical Compositions

The provided pharmaceutical compositions can be prepared in a variety of ways using commercially available starting materials, compounds known in the literature, or from readily prepared intermediates, by employing standard synthetic methods and procedures either known to those skilled in the art, or which will be apparent to the skilled artisan in light of the teachings herein. Standard synthetic methods and procedures for the preparation of organic molecules and functional group transformations and manipulations can be obtained from the relevant scientific literature or from standard textbooks in the field. Although not limited to any one or several sources, classic texts such as Smith et al., March's Advanced Organic Chemistry. Reactions, Mechanisms, and Structure, $5^{th}$ edition, John Wiley & Sons: New York, 2001; Greene, T. W., Wuts, P. G. M., Protective Groups in Organic Synthesis, $3^{rd}$ edition, John Wiley & Sons: New York, 1999; R. Larock, Comprehensive Organic Transformations, VCH Publishers (1989); L. Fieser and M. Fieser, Fieser and Fieser's Reagents for Organic Synthesis, John Wiley and Sons (1994); and L. Paquette, ed., Encyclopedia of Reagents for Organic Synthesis, John Wiley and Sons (1995), incorporated by reference herein, are useful and recognized reference textbooks of organic synthesis known to those in the art. The following descriptions of synthetic methods are designed to illustrate, but not to limit, general procedures for the preparation of compounds of the present disclosure.

In some embodiments, the disclosure provides a new class of multivalent ionizable carotenoid (e.g., trans-carotenoid) salts.

In some embodiments, the disclosure provides a pharmaceutical composition comprising an ionizable carotenoid having the formula:

Polyene Carotenoid-Q wherein, the Polyene Carotenoid comprises
(a) 3, 4, 5, 6, 7, 8, 9, 10, 3-5, 6-8, 9-10, or more than 9, conjugated double bonds,
(b) methyl or low alkyl (C2-C3) substitutions, and
(c) 1, 2, 3, or more than 3, ionizable groups; and
Q is a multivalent counterion.

In some embodiments, the Polyene Carotenoid comprises all trans conjugated double bonds. In some embodiments, the Polyene Carotenoid comprises 6-9 conjugated double bonds. In particular embodiments, the Polyene Carotenoid comprises 7 conjugated double bonds. The Polyene Carotenoid can be naturally occurring or synthetic. In some embodiments, the Polyene Carotenoid is naturally occurring. In other embodiments, the Polyene Carotenoid is synthetic. The ionizable group(s) may be anionic and/or cationic. In some embodiments, the Polyene Carotenoid-Q comprises two or more of the same ionizable group. In some embodiments, the Polyene Carotenoid comprises two or more different ionizable groups. In some embodiments, the Polyene Carotenoid comprises one or more anionic ionizable groups. In some embodiments, the Polyene Carotenoid comprises at least one ionizable group selected from: a carboxylic group, a sulfonate group, a sulfate group, a phosphonate, or a phosphate group, and a hydroxamate moiety. In other embodiments, the Polyene Carotenoid comprises one or more cationic ionizable groups (e.g., a primary, secondary, or tertiary amine group, a quaternary ammonium group, a choline group, a guanidine group, or an imidazole group). In particular embodiments, the Polyene Carotenoid comprises one or more cationic ionizable groups and the pharmaceutical composition is substantially free of nucleic acids.

In some embodiments, Q is a multivalent cation counterion. In some embodiments, Q is a multivalent metal cation. In further embodiments, Q is a multivalent transition metal cation. In some embodiments, Q is a divalent counterion. In some embodiments, Q is a divalent cation counterion. In some embodiments, Q is a divalent metal cation. In further embodiments, Q is a divalent transition metal cation. In some embodiments, Q is at least one member selected from $Ca^{2+}$, $Mg^{2+}$, $Zn^{2+}$, $Cu^{2+}$, $Co^{2+}$, and $Fe^{2+}$. In some embodiments, Q is $Ca^{2+}$ or $Mg^{2+}$. In some embodiments, Q is $Ca^{2+}$. In further embodiments, the Polyene Carotenoid-Q is calcium trans-crocetinate (CTC). In some embodiments, Q is $Mg^{2+}$. In further embodiments, the Polyene Carotenoid-Q is magnesium trans-crocetinate (MTC). In other embodiments, Q is a trivalent cation counterion such as $Fe^{3+}$. In other embodiments, Q is a multivalent organic counterion. In some embodiments, Q is a divalent organic cation. In some embodiments, Q is a bivalent organic cation such as protonated diamine. Liposomes comprising the Polyene Carotenoid-Q compositions and pharmaceutical compositions (e.g., liposome compositions) comprising the liposomes are also provided herein.

In some embodiments, the disclosure provides a pharmaceutical composition comprising an ionizable carotenoid having the formula:

Q-$R_1$-Polyene Carotenoid-$R_2$-Q, wherein, the R1-Polyene Carotenoid-R2 comprises
(a) 3, 4, 5, 6, 7, 8, 9, 10, 3-5, 6-8, 9-10, or more than 9, conjugated double bonds,
(b) methyl or low alkyl (C2-C3) substitutions, and
(c) 1, 2, 3, or more than 3, ionizable groups;
$R_1$ and $R_2$ are ionizable groups; and Q is a multivalent counterion.

In some embodiments, the Q-R1-Polyene Carotenoid-R2 comprises all trans conjugated double bonds. In particular embodiments, the Q-R1-Polyene Carotenoid-R2 comprises 6-9 conjugated double bonds. The Q-R1-Polyene Carotenoid-R2 can be naturally occurring or synthetic. In some embodiments, the Q-R1-Polyene Carotenoid-R2 is naturally occurring. In other embodiments, the Q-R1-Polyene Carotenoid-R2 is synthetic. In some embodiments, $R_1$ and $R_2$ are the same ionizable group. In other embodiments, $R_1$ and $R_2$ are different ionizable groups. In some embodiments, $R_1$ and $R_2$ are the same cationic ionizable group (e.g., a primary, secondary, or tertiary amine group, a quaternary ammonium group, a choline group, a guanidine group, and an imidazole group). In other embodiments, $R_1$ and $R_2$ are different cationic groups. In some embodiments, $R_1$ and $R_2$ are the same anionic ionizable group (e.g., a carboxylic group, a sulfonate group, a sulfate group, a phosphonate, a phosphate group, and a hydroxamate group). In other embodiments, $R_1$ and $R_2$ are different anionic groups. In some embodiments, $R_1$ is a cationic ionizable group or anionic ionizable group and $R_2$ is an anionic ionizable group or cationic group, respectively. In some embodiments, the Polyene Carotenoid comprises at least one ionizable group selected from: a carboxylic group, a sulfonate group, a sulfate group, a phosphonate, or a phosphate group, and a hydroxamate moiety. In some embodiments, $R_1$ and/or $R_2$ is at least one ionizable group selected from: a carboxylic group, a sulfonate group, a sulfate group, a phosphonate, or a phosphate group, and a hydroxamate moiety. In some embodiments, $R_2$ is at least one ionizable group selected from: a carboxylic group, a sulfonate group, a sulfate group, a phosphonate, or a phosphate group, and a hydroxamate moiety. In other embodiments, $R_1$ and/or $R_2$ a cationic ionizable group (e.g., a primary, secondary, or tertiary amine group, a quaternary ammonium group, a choline group, a guanidine group, or an imidazole group). In particular embodiments, $R_1$ is a cationic ionizable group and the pharmaceutical composition is substantially free of nucleic acids.

In some embodiments, Q is a multivalent cation counterion. In some embodiments, Q is a multivalent metal cation. In further embodiments, Q is a multivalent transition metal counterion. In some embodiments, Q is a divalent counterion. In some embodiments, Q is a divalent cation counterion. In further embodiments, Q is a divalent metal cation. In some embodiments, Q is at least one member selected from $Ca^{2+}$, $Mg^{2+}$, $Zn^{2+}$, $Cu^{2+}$, $Co^{2+}$, and $Fe^{2+}$. In further embodiments, Q is $Ca^{2+}$ or $Mg^{2+}$. In further embodiments, Q is $Ca^{2+}$. In some embodiments, Q is $Mg^{2+}$. In other embodiments, Q is a trivalent cation counterion such as $Fe^{3+}$. In other embodiments, Q is a multivalent organic cation. In further embodiments, Q is a divalent organic cation such as a protonated diamine. Liposomes comprising the R1-Polyene Carotenoid-$R_2$ compositions and pharmaceutical compositions (e.g., liposome compositions) comprising the liposomes are also provided herein.

In some embodiments, the disclosure provides a pharmaceutical composition comprising an ionizable bis-alpha, omega-carotenoid having the formula:

Q-$R_1$-Polyene Carotenoid-$R_1$-Q, wherein, the $R_1$-Polyene Carotenoid-$R_1$-Q comprises
(a) 3, 4, 5, 6, 7, 8, 9, 10, 3-5, 6-8, 9-10, or more than 9, conjugated double bonds,
(b) methyl or low alkyl (C2-C3) substitutions, and
(c) 1, 2, 3, or more than 3, ionizable groups; and $R_1$ is an ionizable group; and
Q is a multivalent counterion.

In some embodiments, the bis-alpha, omega-carotenoid comprises all trans conjugated double bonds. In some embodiments, the bis-alpha, omega-carotenoid comprises 6-9 conjugated double bonds. In particular embodiments, the bis-alpha, omega-carotenoid comprises 7 conjugated double bonds. The bis-alpha, omega-carotenoid can be naturally occurring or synthetic. In some embodiments, the bis-alpha, omega-carotenoid is naturally occurring. In other embodiments, the bis-alpha, omega-carotenoid is synthetic. In some embodiments, $R_1$ is an anionic ionizable group. In some embodiments, the bis-alpha, omega-carotenoid comprises an ionizable group selected from: a carboxylic group, a sulfonate group, a sulfate group, a phosphonate, a phosphate group, and a hydroxamate moiety. In other embodiments, $R_1$ is a cationic ionizable group (e.g., a primary, secondary, or tertiary amine group, a quaternary ammonium group, a choline group, a guanidine group, or an imidazole group). In particular embodiments, $R_1$ is a cationic ionizable group and the pharmaceutical composition is substantially free of nucleic acids.

In some embodiments, Q is a multivalent cation counterion. In further embodiments, Q is a multivalent metal cation. In some embodiments, Q is a multivalent transition metal counterion. In some embodiments, Q is a divalent counterion. In some embodiments, Q is a divalent cation counterion. In further embodiments, Q is a divalent metal cation. In some embodiments, Q is at least one member selected from $Ca^{2+}$, $Mg^{2+}$, $Zn^{2+}$, $Cu^{2+}$, $Co^{2+}$, and $Fe^{2+}$. In further embodiments, Q is $Ca^{2+}$ or $Mg^{2+}$. In some embodiments, Q is $Ca^{2+}$. In some embodiments, Q is $Mg^{2+}$. In other embodiments, Q is a trivalent cation counterion such as $Fe^{3+}$. In some embodiments, Q is a multivalent organic cation. In further embodiments, Q is a divalent organic cation such as a protonated diamine or a protonated polyamine. Liposomes comprising the $R_1$-Polyene Carotenoid-$R_1$ compositions and pharmaceutical compositions (e.g., liposome compositions) comprising the liposomes are also provided herein.

In some embodiments, the disclosure provides a pharmaceutical composition comprising an ionizable bis-alpha, omega-carotenoid having the formula: $R_1$-Polyene Carotenoid-$R_1$, wherein, the bis-alpha, omega-carotenoid comprises:
(a) 3, 4, 5, 6, 7, 8, 9, 10, 3-5, 6-8, 9-10, or more than 9, conjugated double bonds, and
(b) 1, 2, 3, or more than 3, ionizable groups; and
the bis-alpha, omega-carotenoid is optionally substituted with 1 to n methyl or low C1-C3 alkyl substitutions, wherein n=1 to 4; and $R_1$ is a polar group and/or a monocyclic functional group. In some embodiments, the bis-alpha, omega-carotenoid comprises all trans conjugated double bonds. In some embodiments, the bis-alpha, omega-carotenoid comprises 6-9 conjugated double bonds. In particular embodiments, the bis-alpha, omega-carotenoid comprises 7 conjugated double bonds. The bis-alpha, omega-carotenoid can be naturally occurring or synthetic. In some embodiments, the bis-alpha, omega-carotenoid is naturally occurring. In other embodiments, the bis-alpha, omega-carotenoid is synthetic. In some embodiments, $R_1$ is a polar group. In some embodiments, $R_1$ is a monocyclic functional group. In some embodiments, $R_1$ is a polar group and a monocyclic functional group. In some embodiments, the bis-alpha, omega-carotenoid comprises a monocyclic and/or polar functional group selected from a functional group present in astaxanthin, lutein, xanthophyll and zeaxanthin. In some embodiments, the bis-alpha, omega-carotenoid is selected from astaxanthin, lutein, xanthophyll and zeaxanthin (e.g., as depicted below).

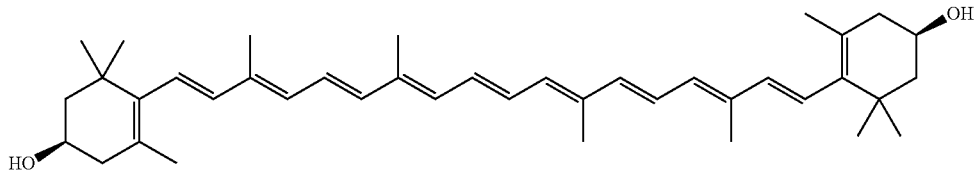

Zeaxanthin

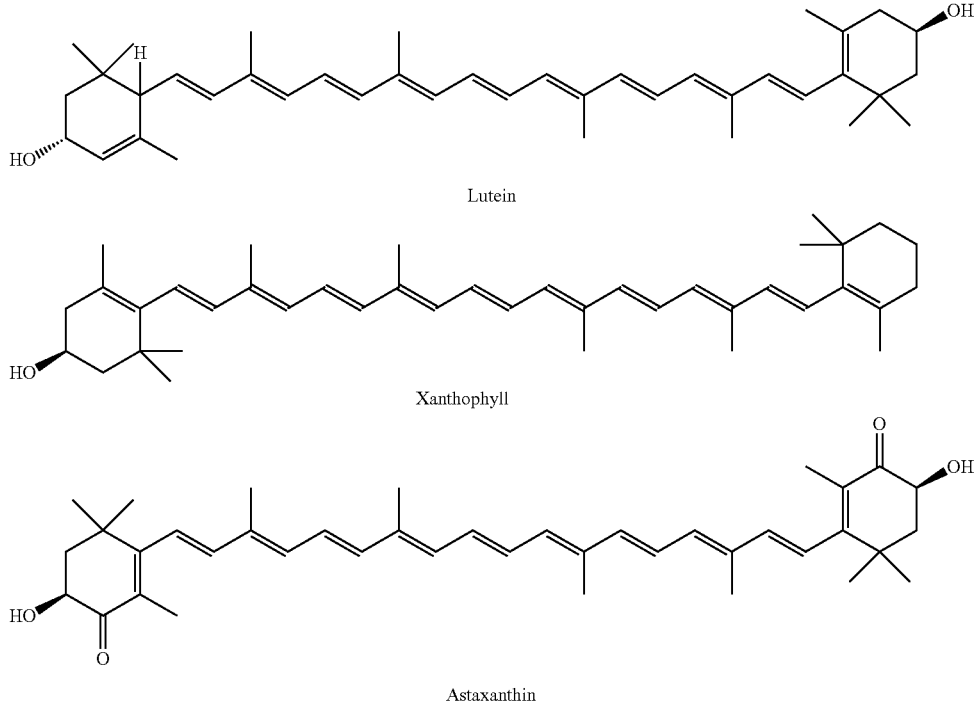

Lutein

Xanthophyll

Astaxanthin

Liposomes comprising the bis-alpha, omega-carotenoid compositions and pharmaceutical compositions (e.g., liposome compositions) comprising the liposomes are also provided herein.

In some embodiments, the pharmaceutical composition comprises a trans-crocetin having the formula: Q-trans-crocetin-Q

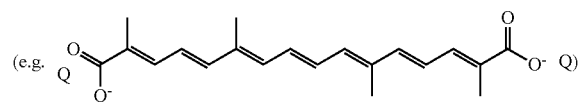

wherein,

Q is a multivalent cation counterion.

In some embodiments, Q is a multivalent metal cation. In further embodiments, Q is a multivalent transition metal cation. In some embodiments, Q is a divalent cation counterion. In further embodiments, Q is a divalent metal cation. In some embodiments, Q is at least one member selected from $Ca^{2+}$, $Mg^{2+}$, $Zn^{2+}$, $Cu^{2+}$, $Co^{2+}$, and $Fe^{2+}$. In further embodiments, Q is $Ca^{2+}$ or $Mg^{2+}$. In some embodiments, Q is $Ca^{2+}$. In some embodiments, Q is $Mg^{2+}$. In other embodiments, Q is a trivalent cation counterion such as $Fe^{3+}$. In some embodiments, Q is a multivalent organic cation. In further embodiments, Q is a divalent organic cation such as a protonated diamine. Liposomes comprising the trans-crocetin compositions and pharmaceutical compositions (e.g., liposome compositions) comprising the liposomes are also provided herein.

In some embodiments, the disclosure provides a pharmaceutical composition comprising calcium trans-crocetin (CTC). The CTC can exist in linear and/or cyclic form (shown below)

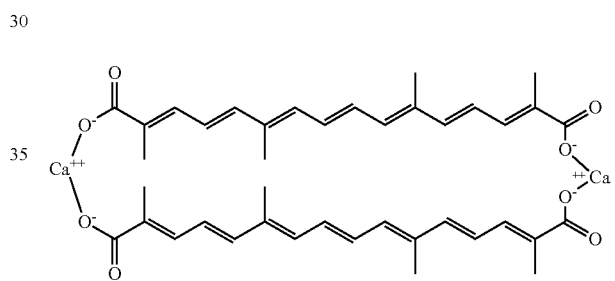

Liposomes comprising the CTC compositions and pharmaceutical compositions (e.g., liposome compositions) comprising the liposomes are also provided herein.

In some embodiments, the disclosure provides a pharmaceutical composition comprising magnesium trans-crocetin (MTC). The MTC can exist in linear and/or cyclic form (shown below).

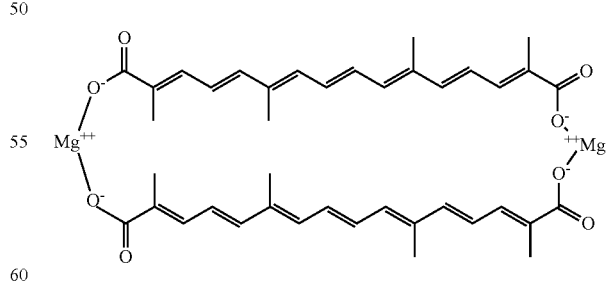

Liposomes comprising the MTC compositions and pharmaceutical compositions (e.g., liposome compositions) comprising the liposomes are also provided herein.

In some embodiments, the disclosure provides a pharmaceutical composition comprising trans-norbixin having the formula: Q-norbixin-Q

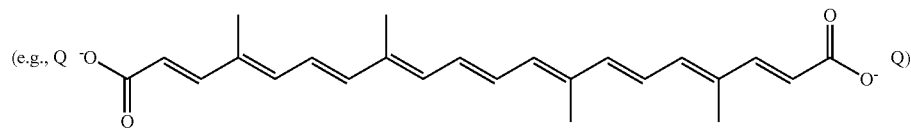

wherein,
Q is a multivalent cation counterion.
In some embodiments, Q is a multivalent cation counterion. In some embodiments, Q is a multivalent metal cation. In further embodiments, Q is a multivalent transition metal cation. In some embodiments, Q is a divalent cation counterion. In further embodiments, Q is a divalent metal cation. In some embodiments, Q is at least one member selected from $Ca^{2+}$, $Mg^{2+}$, $Zn^{2+}$, $Cu^{2+}$, $Co^{2+}$, and $Fe^{2+}$. In further embodiments, Q is $Ca^{2+}$ or $Mg^{2+}$. In some embodiments, Q is $Ca^{2+}$. In some embodiments, Q is $Mg^{2+}$. In other embodiments, Q is a trivalent cation counterion such as $Fe^{3+}$. In some embodiments, Q is a multivalent organic cation. In further embodiments, Q is a divalent organic cation such as a protonated diamine. Liposomes comprising the trans-norbixin compositions and pharmaceutical compositions (e.g., liposome compositions) comprising the liposomes are also provided herein.

In some embodiments, the disclosure provides a pharmaceutical composition comprising calcium trans-norbixin (CTN). The CTN can exist in linear and/or cyclic form (shown below),

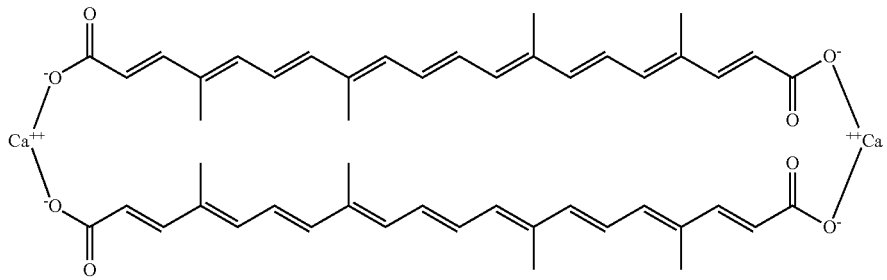

Liposomes comprising CTN and pharmaceutical compositions (e.g., liposome compositions) comprising the liposomes are also provided herein.

In some embodiments, the disclosure provides a pharmaceutical composition comprising magnesium trans-norbixin (MTN). The MTN can exist in linear and/or cyclic form (shown below),

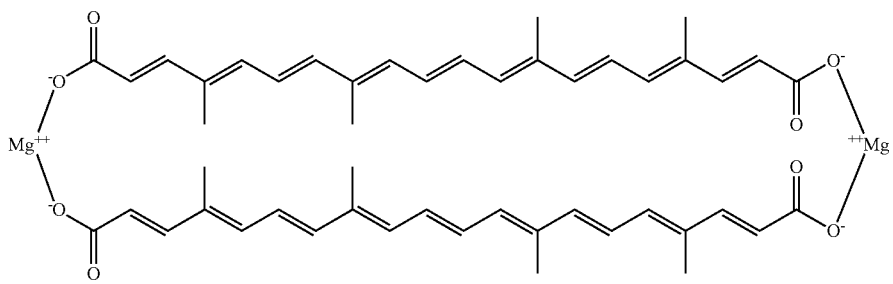

Liposomes comprising MTN and pharmaceutical compositions (e.g., liposome compositions) comprising the liposomes are also provided herein.

The lipids and other components of the liposomes contained in the liposome compositions can be any lipid, lipid combination and ratio, or combination of lipids and other liposome components and their respective ratios known in the art. However, it will be understood by one skilled in the art that liposomal encapsulation of any particular drug, such as, and without limitation, the carotenoid compositions discussed herein, may involve substantial routine experimentation to achieve a useful and functional liposomal formulation. In general, the provided liposomes may have any liposome structure, e.g., structures having an inner space sequestered from the outer medium by one or more lipid bilayers, or any microcapsule that has a semi-permeable membrane with a lipophilic central part where the membrane sequesters an interior. The lipid bilayer can be any arrangement of amphiphilic molecules characterized by a hydrophilic part (hydrophilic moiety) and a hydrophobic part (hydrophobic moiety). Usually amphiphilic molecules in a bilayer are arranged into two dimensional sheets in which hydrophobic moieties are oriented inward the sheet while hydrophilic moieties are oriented outward. Amphiphilic molecules forming the provided liposomes can be any known or later discovered amphiphilic molecules, e.g., lipids of synthetic or natural origin or biocompatible lipids. The liposomes can also be formed by amphiphilic polymers and surfactants, e.g., polymerosomes and niosomes. For the purpose of this disclosure, without limitation, these liposome-forming materials also are referred to as "lipids".

The liposome composition formulations provided herein can be in liquid or dry form such as a dry powder or dry cake. The dry powder or dry cake may have undergone primary drying under, for example, lyophilization conditions or optionally, the dry cake or dry powder may have undergone both primary drying only or both primary drying and secondary drying. In the dry form, the powder or cake may, for example, have between 1% to 6% moisture, for example, such as between 2% to 5% moisture or between 2% to 4% moisture. One example method of drying is lyophilization (also called freeze-drying, or cryodessication). Any of the compositions and methods of the disclosure may include liposomes, lyophilized liposomes or liposomes reconstituted from lyophilized liposomes. In some embodiments, the compositions and methods include one or more lyoprotectants or cryoprotectants. These protectants are typically polyhydroxy compounds such as sugars (mono-, di-, and polysaccharides), polyalcohols, and their derivatives, glycerol, or polyethyleneglycol, trehalose, maltose, sucrose, glucose, lactose, dextran, glycerol, or aminoglycosides. In further embodiments, the lyoprotectants or cryoprotectants comprise up to 10% or up to 20% of a solution outside the liposome, inside the liposome, or both outside and inside the liposome.

The properties of liposomes are influenced by the nature of lipids used to make the liposomes. A wide variety of lipids have been used to make liposomes. These include cationic, anionic and neutral lipids. In some embodiments, the liposomes comprising the carotenoid compositions (e.g., CTC and MTC) are anionic or neutral. In other embodiments, the provided liposomes are cationic. The determination of the charge (e.g., anionic, neutral or cationic) can routinely be determined by measuring the zeta potential of the liposome. The zeta potential of the liposome can be positive, zero or negative. In some embodiments, the zeta potential of the liposome is $-150$ to $150$ mV, or $-50$ to $50$ mV, or any range therein between. In some embodiments, the zeta potential of the liposome is less than or equal to zero. In some embodiments, the zeta potential of the liposome is $-150$ to $0$, $-50$ to $0$ mV, $-40$ to $0$ mV, $-30$ to $0$ mV, $-25$ to $0$ mV, $-20$ to $0$ mV, $-10$ to $0$ mV, $-9$ to $0$ mV, $-8$ to $0$ mV, $-7$ to $0$ mV, $-6$ to $0$ mV, $-5$ to $0$ mV, $-4$ to $0$ mV, $-3$ to $0$ mV, $-2$ to $0$ mV, $-1$ to $0$ mV, or $-8$ to $2$ mV, or any range therein between. In other embodiments, the zeta potential of the liposome is more than zero. In some embodiments, the liposome has a zeta potential that is $0.2$ to $150$ mV, $1$ to $50$ mV, $1$ to $40$ mV, $1$ to $30$ mV, $1$ to $25$ mV, $1$ to $20$ mV, $1$ to $15$ mV, $1$ to $10$ mV, $1$ to $5$ mV, $2$ to $10$ mV, $3$ to $10$ mV, $4$ to $10$ mV, or $5$ to $10$ mV, or any range therein between.

In some embodiments, cationic lipids are used to make cationic liposomes which are commonly used as gene transfection agents. The positive charge on cationic liposomes enables interaction with the negative charge on cell surfaces. Following binding of the cationic liposomes to the cell, the liposome is transported inside the cell through endocytosis.

In some preferred embodiments, a neutral to anionic liposome is used. In a preferred embodiment, an anionic liposome is used. Using a mixture of, for example, neutral lipids such as HSPC and anionic lipids such as PEG-DSPE results in the formation of anionic liposomes which are less likely to non-specifically bind to normal cells. Specific binding to tumor cells can be achieved by using a tumor targeting antibody such as, for example, a folate receptor antibody, including, for example, folate receptor alpha antibody, folate receptor beta antibody and/or folate receptor delta antibody.

As an example, at least one (or some) of the lipids is/are amphipathic lipids, defined as having a hydrophilic and a hydrophobic portion (typically a hydrophilic head and a hydrophobic tail). The hydrophobic portion typically orients into a hydrophobic phase (e.g., within the bilayer), while the hydrophilic portion typically orients toward the aqueous phase (e.g., outside the bilayer). The hydrophilic portion can comprise polar or charged groups such as carbohydrates, phosphate, carboxylic, sulfate, amino, sulfhydryl, nitro, hydroxy and other like groups. The hydrophobic portion can comprise apolar groups that include without limitation long chain saturated and unsaturated aliphatic hydrocarbon groups and groups substituted by one or more aromatic, cyclo-aliphatic or heterocyclic group(s). Examples of amphipathic compounds include, but are not limited to, phospholipids, aminolipids and sphingolipids.

Typically, for example, the lipids are phospholipids. Phospholipids include without limitation phosphatidylcholine, phosphatidylethanolamine, phosphatidylglycerol, phosphatidylinositol, phosphatidylserine, and the like. It is to be understood that other lipid membrane components, such as cholesterol, sphingomyelin, and cardiolipin, can be used.

The lipids comprising the liposomes provided herein can be anionic and neutral (including zwitterionic and polar) lipids including anionic and neutral phospholipids. Neutral lipids exist in an uncharged or neutral zwitterionic form at a selected pH. At physiological pH, such lipids include, for example, dioleoylphosphatidylglycerol (DOPG), diacylphosphatidylcholine, diacylphos-phatidylethanolamine, ceramide, sphingomyelin, cephalin, cholesterol, cerebrosides and diacylglycerols. Examples of zwitterionic lipids include without limitation dioleoylphosphatidylcholine (DOPC), dimyristoylphos-phatidylcholine (DMPC), and dioleoylphosphatidylserine (DOPS). Anionic lipids are negatively charged at physiological pH. These lipids include without limitation phosphatidylglycerol, cardiolipin, diacylphosphatidylserine, diacyl-phosphatidic acid, N-dodecanoyl phosphatidylethanolamines, N-succinyl phosphatidylethanolamines, N-glutarylphosphatidylethanolamines, lysylphosphati-dylglycerols, palmitoyloleyolphosphatidylglycerol (POPG), and other anionic modifying groups joined to neutral lipids.

Collectively, anionic and neutral lipids are referred to herein as non-cationic lipids. Such lipids may contain phosphorus but they are not so limited. Examples of non-cationic lipids include lecithin, lysolecithin, phosphatidylethanolamine, lysophosphatidylethanolamine, dioleoylphosphatidylethanolamine (DOPE), dipalmitoyl phosphatidyl ethanolamine (DPPE), dimyristoylphos-phoethanolamine (DMPE), distearoylphosphatidy l-ethanolamine (DSPE), palmitoyloleoyl-phosphatidylethanolamine (POPE) palmitoyloleoylphospha-tidylcholine (POPC), egg phosphatidylcholine (EPC), distearoylphospha-tidylcholine (DSPC), dioleoylphosphatidylcholine (DOPC), dipalmitoylphosphatidylcholine (DPPC), dioleoylphosphatidylglycerol (DOPG), dipalmitoyl-phosphatidylglycerol (DPPG), palmitoyloleyol-phosphatidylglycerol (POPG), 16-O-monomethyl PE, 16-O-dimethyl PE, 18-1-trans-PE, palmitoyloleoylphos-phatidylethanolamine (POPE), 1-stearoyl-2-oleoylphosphatidylethanolamine (SOPE), phosphatidylserine, phosphatidyl-inositol, sphingomyelin, cephalin, cardiolipin, phosphatidic acid, cerebrosides, dicetylphosphate, and cholesterol.

The liposomes may be assembled using any liposomal assembly method using liposomal components (also referred to as liposome components) known in the art. Liposomal components include, for example, lipids such as DSPE, HSPC, cholesterol and derivatives of these components. Other suitable lipids are commercially available for example, by Avanti Polar Lipids, Inc. (Alabaster, Alabama, USA). A partial listing of available negatively or neutrally charged lipids suitable for making anionic liposomes, can be, for example, at least one of the following: DLPC, DMPC, DPPC, DSPC, DOPC, DMPE, DPPE, DOPE, DMPA•Na, DPPA•Na, DOPA•Na, DMPG•Na, DPPG•Na, DOPG•Na, DMPS•Na, DPPS•Na, DOPS•Na, DOPE-Glutaryl•(Na)2, tetramyristoyl cardiolipin•(Na)2, DSPE-mPEG-2000•Na, DSPE-mPEG-5000•Na, and DSPE-maleimide PEG-2000•Na.

In some embodiments, the provided compositions are formulated in a liposome comprising a cationic lipid. In one embodiment, the cationic lipid is selected from, but not limited to, a cationic lipid described in Intl. Appl. Publ. Nos. WO2012/040184, WO2011/153120, WO2011/149733, WO2011/090965, WO2011/043913, WO2011/022460, WO2012/061259, WO2012/054365, WO2012/044638, WO2010/080724, WO2010/21865 and WO2008/103276, U.S. Pat. Nos. 7,893,302, 7,404,969 and 8,283,333, and U.S. Appl. Publ. Nos. US20100036115 and US20120202871; each of which is herein incorporated by reference in their entirety. In another embodiment, the cationic lipid may be selected from, but not limited to, formula A described in Intl. Appl. Publ. Nos WO2012/040184, WO2011/153120, WO201/1149733, WO2011/090965, WO2011/043913, WO2011/022460, WO2012/061259, WO2012/054365 and WO2012/044638; each of which is herein incorporated by reference in their entirety. In yet another embodiment, the cationic lipid may be selected from, but not limited to, formula CLI-CLXXIX of International Publication No. WO2008103276, formula CLI-CLXXIX of U.S. Pat. No. 7,893,302, formula CLI-CLXXXII of U.S. Pat. No. 7,404,969 and formula I-VI of US Patent Publication No. US20100036115; each of which is herein incorporated by reference in their entirety. As a non-limiting example, the cationic lipid may be selected from (20Z,23Z)—N,N-dimethylnonacosa-20,23-dien-10-amine, (17Z, 20Z)—N,N-dimemylhexacosa-17,20-dien-9-amine, (1Z,19Z)—N5N-dimethyl-pentacosa-16,19-dien-8-amine, (13Z, 16Z)—N,N-dimethyldocosa-13,16-dien-5-amine, (12Z,15Z)—N,N-dimethylhenicosa-12,15-dien-4-amine, (14Z,17Z)—N,N-dimethyltricosa-14,17-dien-6-amine, (15Z,18Z)—N,N-dimethyltetracosa-15,18-dien-7-amine, (18Z,21Z)—N,N-dimethylheptacosa-18,21-dien-10-amine, (15Z, 18Z)—N,N-dimethyltetracosa-15,18-dien-5-amine, (14Z,17Z)—N,N-dimethyl-tricosa-14,17-dien-4-amine, (19Z,22Z)—N,N-dimeihyloctacosa-19,22-dien-9-amine, (18Z,21 Z)—N,N-dimethylheptacosa-18,21-dien-8-amine, (17Z,20Z)—N,N-dimethylhexacosa-17,20-dien-7-amine, (16Z,19Z)—N,N-dimethylpenta-cosa-16,19-dien-6-amine, (22Z,25Z)—N,N-dimethylhentriaconta-22,25-dien-10-amine, (21 Z,24Z)—N,N-dimethyl-triaconta-21,24-dien-9-amine, (18Z)—N,N-dimetylheptacos-18-en-10-amine, (17Z)—N,N-dimethylhexacos-17-en-9-amine, (19Z,22Z)—N,N-dimethyloctacosa-19,22-dien-7-amine, N,N-dimethylheptacos-an-10-amine, (20Z,23Z)—N-ethyl-N-methylnonacosa-20,23-dien-10-amine, 1-[(11Z,14Z)-1-nonylicosa-11,14-dien-1-yl]pyrrolidine, (20Z)—N,N-dimethyl-heptacos-20-en-10-amine, (15Z)—N,N-dimethyl eptacos-15-en-10-amine, (14Z)—N,N-dimethylnonacos-14-en-10-amine, (17Z)—N,N-dimethylnonacos-17-en-10-amine, (24Z)—N,N-dimethyltritriacont-24-en-10-amine, (20Z)—N,N-di-methylnonacos-20-en-10-amine, (22Z)—N,N-dimethylhentriacont-22-en-10-amine, (16Z)—N,N-dimethylpenta-cos-16-en-8-amine, (12Z,15Z)—N,N-dimethyl-2-nonylhenicosa-12,15-dien-1-amine, (13Z,16Z)—N,N-dimethyl-3-nonyldocos-a-13,16-dien-1-amine, N,N-dimethyl-1-[(1S,2R)-2-octylcyclo-propyl]eptadec-an-8-amine, 1-[(1S,2R)-2-hexylcyclopropyl]-N,N-dimethylnonadecan-10-amine, N,N-dimethyl-1-[(1S,2R)-2-octylcyclopropyl]nonadecan-10-amine, N,N-dimethyl-21-[R1S,2R)-2-octylcyclopropyl]henicosan-10-amine,N,N-dimethyl-1-[(1S,2S)-2-{[(1R,2R)-2-pentylcyclopropyl]methyl}cyclopropyl]nonadecan-10-amine,N,N-dimethyl-1-[(1S,2R)-2-octylcyclopropyl]hexadecan-8-amine, N,N-dimethyl-[(1R,2S)-2-undecyl-cyclopropyl]tetradecan-5-amine, N,N-dimethyl-3-17-[(1S, 2R)-2-octylcyclopropyl]heptyl}dodecan-1-amine, 1-[(1R,2S)-2-heptylcyclopropyl]-N,N-dimethyloctadecan-9-amine, 1-[(1S,2R)-2-decylcyclopropyl]-N,N-dimethyl-penta-decan-6-amine, N,N-dimethyl-1-[(1S, 2R)-2-octylcyclopropyl]pentadecan-8-amine, R—N,N-dimethyl-1-[(9Z, 12Z)-octadeca-9,12-dien-1-yloxy]-3-(octyloxy)propan-2-amine, S—N,N-dimethyl-1-[(9Z,12Z)-octadeca-9,12-dien-1-yloxy]-3-(octyloxy)propan-2-amine, 1-12-[(9 Z,12Z)-octadeca-9,12-dien-1-yloxy]-1-[(octyloxy)methyl]ethyl}pyrrolidine, (2S)—N,N-dimethyl-1-[(9Z,12Z)-octadeca-9,12-dien-1-yloxy]-3-[(5Z-)-oct-5-en-1-yloxy]propan-2-amine, 1-12-[(9Z,12Z)-octadeca-9,12-dien-1-yloxy]-1-[(octyloxy)methyl]ethyl}azetidine, (2S)-1-(hexyloxy)-N,N-dimethyl-3-[(9Z, 12Z)-octadeca-9,12-dien-1-yloxy]propan-2-amine, (2S)-1-(heptyloxy)-N,N-di-methyl-3-[(9Z,12Z)-octadeca-9,12-dien-1-yloxy]propan-2-amine, N,N-dimethyl-1-(nonyloxy)-3-[(9Z,12Z)-octadeca-9,12-dien-1-yloxy]propan-2-amine, N,N-dimethyl-1-[(9Z)-octadec-9-en-1-yloxy]-3-(octyloxy) propan-2-amine; (2S)—N,N-dimethyl-1-[(6Z,9Z,12Z)-octadeca-6,9,12-trien-1-yloxy]-3-(octyloxy)propan-2-amine, (2S)-1-[(11Z,14Z)-icosa-11,14-dien-1-yloxy]-N,N-dimethyl-3-(pentyloxy)propan-2-amine, (2S)-1-(hexyloxy)-3-[(11Z,14Z)-icosa-11,14-dien-1-yloxy]-N,N-dimethylpropan-2-amine, 1-[(11Z,14Z)-icosa-11,14-dien-1-yloxy]-N,N-dimethyl 1-3-(octyloxy)propan-2-amine, 1-[(13Z,16Z)-docosa-13,16-dien-1-yloxy]-N,N-dimethyl-3-(octyloxy)propan-2-amine, (2S)-1-[(13Z,16Z)-docosa-13,16-dien-1-yloxy]-3-(hexyloxy)-N,N-dimethyl-propan-2-amine, (2S)-1-[(13Z)-docos-13-en-1-yloxy]-3-(hexyloxy)-N,N-dimethyl propan-2-amine, 1-[(13Z)-docos-13-en-1-yloxy]-N,N-dimethyl-3-(octyloxy) propan-2-amine, 1-[(9Z)-hexadec-9-en-1-yloxy]-N,N-dimethyl-3-(octyloxy) propan-2-amine, (2R)—N,N-dimethyl-H(1-metoyloctyl)oxy]-3-[(9Z,12Z)-octa-deca-9,12-dien-1-yloxy]propan-2-amine, (2R)-1-[(3,7-dimethyloctyl)oxy]-N, N-dimethyl-3-R9Z,12Z)-octadeca-9,12-die-n-1-yloxylpropan-2-amine, N,N-di-methyl-1-(octyloxy)-3-(18-[(1S,2S)-2-{[(1R,2R)-2-pentylcyclopropyl]-methyl}cyclopropyl]octyl}oxy) propan-2-amine, N,N-dimethyl-1-{[-(2-oclylcyclo-propyl)octyl]oxy}-3-(octyloxy) propan-2-amine and (11E,20Z,23Z)—N, N-dimethylnonacosa-11,20,2-trien-10-amine or a pharmaceutically acceptable salt or acid or stereoisomer thereof.

In one embodiment, the lipid may be a cleavable lipid such as those described in in Intl. Publ. No. WO2012/170889, which is herein incorporated by reference in its entirety The cationic lipid can routinely be synthesized using methods known in the art (see, e.g., Intl. Publ. Nos. WO2012/040184, WO2011/153120, WO2011/149733, WO2011/090965, WO201/1043913, WO2011/022460, WO2012/061259, WO2012/054365, WO2012/044638, WO2010/080724 and WO2010/21865; each of which is herein incorporated by reference in its entirety.

Lipid derivatives can include, for example, at least, the bonding (preferably covalent bonding) of one or more steric stabilizers and/or functional groups to the liposomal component after which the steric stabilizers and/or functional groups should be considered part of the liposomal components. Functional groups comprise groups that can be used to attach a liposomal component to another moiety such as a protein. Such functional groups include, at least, maleimide. These steric stabilizers include at least one from the group consisting of polyethylene glycol (PEG); poly-L-lysine (PLL); monosialoganglioside (GM1); poly(vinyl pyrrolidone) (PVP); poly(acrylamide) (PAA); poly(2-methyl-2-oxazoline); poly(2-ethyl-2-oxazoline); phosphatidylpolyglycerol; poly[N-(2-hydroxy-propyl) methacrylamide]; amphiphilic poly-N-vinylpyrrolidones; L-amino-acid-based polymer; and polyvinyl alcohol.

In some embodiments, the provided carotenoid compositions are formulated in a lipid-polycation complex. The formation of the lipid-polycation complex may be accomplished using methods known in the art and/or as described in U.S. Pub. No. 2012/0178702, herein incorporated by reference in its entirety. As a non-limiting example, the polycation may include a cationic peptide or a polypeptide such as, but not limited to, polylysine, polyornithine and/or polyarginine and the cationic peptides described in International Pub. No. WO2012/013326; herein incorporated by reference in its entirety. In another embodiment, the provided carotenoid composition is formulated in a lipid-polycation complex which further includes a neutral lipid such as, but not limited to, cholesterol or dioleoyl phosphatidylethanolamine (DOPE).

Since the components of a liposome can include any molecule(s) (i.e., chemical/reagent/protein) that is bound to it, in some embodiments, the components of the provided liposomes include, at least, a member selected from: DSPE, DSPE-PEG, DSPE-maleimide, HSPC; HSPC-PEG; HSPC-maleimide; cholesterol; cholesterol-PEG; and cholesterol-maleimide. In some embodiments, the components of the provided liposomes include DSPE, DSPE-PEG, DSPE-maleimide, HSPC; HSPC-PEG; HSPC-maleimide; cholesterol; cholesterol-PEG; and cholesterol-maleimide. In a preferred embodiment, the liposomal components that make up the liposome comprises DSPE; DSPE-FITC; DSPE-maleimide; cholesterol; and HSPC.

In additional embodiments, the liposomes of the liposome compositions provided herein comprise oxidized phospholipids. In some embodiments, the liposomes comprise an oxidize phospholipid of a member selected from phosphatidylserines, phosphatidylinositols, phosphatidylethanolamines, phosphatidylcholines and 1-palmytoyl-2-arachidonoyl-sn-glycero-2-phosphate. In some embodiments, the phospholipids have unsaturated bonds. In some embodiments, the phospholipids are arachidonic acid containing phospholipids. In additional embodiments, the phospholipids are sn-2-oxygenated. In additional embodiments, the phospholipids are not fragmented.

In some embodiments, the liposomes of the disclosed liposome compositions comprise oxidized 1-palmitoyl-2-arachidonoyl-sn-glycero-3-phosphorylcholine (OxPAPC). The term "oxPAPC", as used herein, refers to lipids generated by the oxidation of 1-palmitoyl-2-arachidonyl-sn-glycero-3-phosphorylcholine (PAPC), which results in a mixture of oxidized phospholipids containing either fragmented or full length oxygenated sn-2 residues. Well-characterized oxidatively fragmented species contain a five-carbon sn-2 residue bearing omega-aldehyde or omega-carboxyl groups. Oxidation of arachidonic acid residue also produces phospholipids containing esterified isoprostanes. oxPAPC includes HOdiA-PC, KOdiA-PC, HOOA-PC and KOOA-PC species, among other oxidized products present in oxPAPC. In further embodiments, the oxPAPCs are epoxyisoprostane-containing phospholipids. In further embodiments, the oxPAPC is 1-palmitoyl-2-(5,6-epoxyisoprostane E2)-sn-glycero-3-phosphocholine (5,6-PEIPC), 1-palmitoyl-2-(epoxy-cyclopenten-one)-sn-glycero-3-phosphorylcholine (PECPC) and/or 1-palmitoyl-2-(epoxy-isoprostane E2)-sn-glycero-4-phosphocholine (PEIPC). In some embodiments, the phospholipids have unsaturated bonds. In some embodiments, the phospholipids are arachidonic acid containing phospholipids. In additional embodiments, the phospholipids are sn-2-oxygenated. In additional embodiments, the phospholipids are not fragmented.

In some embodiments, the liposomes of the disclosed liposome compositions comprise a lipid selected from: 1-palmitoyl-2-glutaroyl-sn-glycero-3-phosphocholine (PGPC); 1-palmitoyl-2-(9'oxo-nonanoyl)-sn-glycero-3-phosphocholine; 1-palmitoyl-2-arachinodoyl-sn-glycero-3-phosphocholine; 1-palmitoyl-2-myristoyl-sn-glycero-3-phosphocholine; 1-palmitoyl-2-hexadec-yl-sn-glycero-3-phosphocholine; 1-palmitoyl-2-azelaoyl-sn-glycero-3-phosphocholine; and 1-palmitoyl-2-acetoyl-sn-glycero-3-phospho-choline. In further embodiments, the liposome comprises PGPC.

In some embodiments, at least one component of the liposome lipid bilayer is functionalized (or reactive). As used herein, a functionalized component is a component that comprises a reactive group that can be used to crosslink reagents and moieties to the lipid. If the lipid is functionalized, any liposome that it forms is also functionalized. In some embodiments, the reactive group is one that will react with a crosslinker (or other moiety) to form crosslinks. The reactive group in the liposome lipid bilayer is located anywhere on the lipid that allows it to contact a crosslinker and be crosslinked to another moiety (e.g., a steric stabilizer or targeting moiety). In some embodiments, the reactive group is in the head group of the lipid, including for example a phospholipid. In some embodiments, the reactive group is a maleimide group. Maleimide groups can be crosslinked to each other in the presence of dithiol crosslinkers including but not limited to dithiothreitol (DTT).

It is to be understood that the use of other functionalized lipids, other reactive groups, and other crosslinkers beyond those described above is further contemplated. In addition to the maleimide groups, other examples of contemplated reactive groups include but are not limited to other thiol reactive groups, amino groups such as primary and secondary amines, carboxyl groups, hydroxyl groups, aldehyde groups, alkyne groups, azide groups, carbonyls, halo acetyl (e.g., iodoacetyl) groups, imidoester groups, N-hydroxysuccinimide esters, sulfhydryl groups, and pyridyl disulfide groups.

Functionalized and non-functionalized lipids are available from a number of commercial sources including Avanti Polar Lipids (Alabaster, AL) and Lipoid LLC (Newark, NJ).

In some embodiments, the liposomes include a steric stabilizer that increases their longevity in circulation. One or more steric stabilizers such as a hydrophilic polymer (polyethylene glycol (PEG)), a glycolipid (monosialoganglioside (GM1)) or others occupies the space immediately adjacent to the liposome surface and excludes other macromolecules from this space. Consequently, access and binding of blood plasma opsonins to the liposome surface are hindered, and thus interactions of macrophages with such liposomes, or any other clearing mechanism, are inhibited and longevity of the liposome in circulation is enhanced. In some embodiments, the steric stabilizer or the population of steric stabilizers is a PEG or a combination comprising PEG. In further embodiments, the steric stabilizer is a PEG or a combination comprising PEG with a number average molecular weight (Mn) of 200 to 5000 Daltons. These PEG(s) can be of any structure such as linear, branched, star or comb structure and are commercially available.

In some embodiments, liposomes of the provided liposome compositions are pegylated (e.g., pegylated liposomal CTC and pegylated liposomal MTC). In some embodiments, the pegylated liposomes are water soluble. That is, the pegylated liposomes are in the form of an aqueous solution.

The diameter of the provided liposomes is not particularly limited. In some embodiments, the liposomes have a mean diameter of for example, 20 nm to 500 nm (nanometer), or 20 nm to 200 nm, or any range therein between. In some embodiments, the liposomes have a mean diameter of 80 nm to 120 nm, or any range therein between.

In some embodiments, the pH of solutions comprising the liposome composition is from pH 2 to 8, or any range therein between. In some embodiments, the pH of solutions comprising the liposome composition is from pH 5 to 8, or 6 to 7, or any range therein between. In some embodiments, the pH of solutions comprising the liposome composition is from pH 6 to 7, or any range therein between. In some embodiments, the pH of solutions comprising the liposome composition is from 6 to 7.5, from 6.5 to 7.5, from 6.7 to 7.5, or from 6.3 to 7.0, or any range therein between.

In additional embodiments, the provided liposome composition comprises a buffer. In further embodiments, the buffer is selected from HEPES, citrate, or sodium phosphate (e.g., monobasic and/or dibasic sodium phosphate). In some embodiments, the buffer is HEPES. In some embodiments, the buffer is citrate. In some embodiments, the buffer is sodium phosphate (e.g., monobasic and/or dibasic sodium phosphate). In some embodiments, the buffer is at a concentration of 15 to 200 mM, or any range therein between.

In yet further embodiments, the buffer is at a concentration of 5 to 200 mM, 15 to 200, 5 to 100 mM, 15 to 100 mM, 5 to 50 mM, 15 to 50 mM, 5 to 25 mM, 5 to 20 mM, 5 to 15 mM, or any range therein between. In some embodiments, the buffer is HEPES at a concentration of 5 to 200 mM, or any range therein between. In some embodiments, the buffer is citrate at a concentration of 5 to 200 mM, or any range therein between. In some embodiments, the buffer is sodium phosphate at a concentration of 5 to 200 mM, or any range therein between.

In additional embodiments, the liposome composition contains one or more lyoprotectants or cryoprotectants. In some embodiments, the cryoprotectant is mannitol, trehalose, sorbitol, or sucrose. In some embodiments, the lyoprotectant and/or cryoprotectant is present in the composition at 1 to 20%, or 5 to 20% weight percent, or any range therein between.

In additional embodiments, the provided liposome composition comprises a tonicity agent. In some embodiments, the concentration (weight percent) of the tonicity agent is 0.1-20%, 1-20%, 0.5-15%, 1-15%, or 1-50%, or any range therein between. In some embodiments, the liposome composition includes a sugar (e.g., trehalose, maltose, sucrose, lactose, mannose, mannitol, glycerol, dextrose, fructose, etc.). In further embodiments, the concentration (weight percent) of the sugar is 0.1-20%, 1-20%, 0.5-15%, 1%-15%, or 1-50%, or any range therein between.

In some embodiments, the provided liposome composition comprises trehalose. In further embodiments, the concentration weight percent of trehalose is 0.1-20%, 1-20%, 0.5-15%, 1%-15%, 5-20%, or 1-50%, or any range therein between. In yet further embodiments, the concentration (weight percent) of trehalose is 1-15%, or any range therein between. In an additional embodiment, the trehalose is present at about 5% to 20% weight percent of trehalose or any combination of one or more lyoprotectants or cryoprotectants at a total concentration of 5% to 20%. In some embodiments, the pH of the liposome composition is from 6 to 7.5, from 6.5 to 7.5, from 6.7 to 7.5, or from 6.3 to 7.0, or any range therein between.

In some embodiments, the liposome composition comprises dextrose. In some embodiments, the concentration weight percent of dextrose is 0.1-20%, 1-20%, 0.5-15%, 1-15%, 5-20%, or 1-50%, or any range therein between. In particular embodiments, the concentration (weight percent) of dextrose is 1-20%, or any range therein between. In an additional embodiment, the dextrose is present at 1 to 20% weight percent of dextrose or any combination of one or more lyoprotectants or cryoprotectants at a total concentration of 1% to 20%, or 5% to 20%, or any range therein between.

In some embodiments, the disclosure provides a liposome composition that comprises a liposome encapsulating an ionizable carotenoid salt. In some embodiments, the composition comprises a liposome encapsulating an ionizable carotenoid salt of any of [1]-[28]. In some embodiments, the liposome is pegylated. In some embodiments, the liposome is targeted. In some embodiments, the liposome is unpegylated and targeted. In some embodiments, the liposome is unpegylated and nontargeted. In some embodiments, the liposome contains less than 6 million, less than 500,000, less than 200,000, less than 100,000, less than 50,000, less than 10,000, or less than 5,000, molecules of the ionizable carotenoid. In some embodiments, the liposome contains 10 to 100,000, 100 to 10,000, or 1,000 to 5,000 molecules of the ionizable carotenoid, or any range therein between. In additional embodiments, the encapsulated ionizable carotenoid is trans-crocetin, trans-norbixin, or an ionizable carotenoid provided in [1]-[28] and/or FIGS. 1A-1D, herein. In some embodiments, the liposome encapsulates a plurality of carotenoids In further embodiments, the liposome encapsulates a plurality of ionizable carotenoids (e.g., a combination of trans-crocetin, trans-norbixin, and/or one or more ionizable carotenoid provided in [1]-[28] and/or FIGS. 1A-1D, herein).

In some embodiments, the disclosure provides a liposome composition that comprises an unpegylated nontargeted liposome encapsulating an ionizable carotenoid salt. In some embodiments, the liposome encapsulates the ionizable carotenoid salt of any of [1]-[28]. In some embodiments, the encapsulated ionizable carotenoid is trans-crocetin. In some embodiments, the encapsulated ionizable carotenoid is trans-norbixin. In some embodiments, the encapsulated ionizable carotenoid is a carotenoid provided in [1]-[28] and/or FIGS. 1A-1D, herein. In some embodiments, the unpegylated nontargeted liposome contains less than 6 million, less than 500,000, less than 200,000, less than 100,000, less than 50,000, less than 10,000, or less than 5,000, molecules of the carotenoid. In some embodiments, the liposome contains 10 to 100,000, 100 to 10,000, or 1,000 to 5,000 molecules of the ionizable carotenoid, or any range therein between. In further embodiments, the liposome encapsulates a plurality of carotenoids. In some embodiments, the liposome encapsulates a plurality of ionizable carotenoids (e.g., a combination of trans-crocetin, trans-norbixin, and/or one or more ionizable carotenoid provided in [1]-[28] and/or FIGS. 1A-1D, herein).

In some embodiments, the disclosure provides a liposome composition that comprises a pegylated liposome encapsulating an ionizable carotenoid salt. In some embodiments, the liposome encapsulates the ionizable carotenoid salt of any of [1]-[28]. In some embodiments, the pegylated liposome contains less than 6 million, less than 500,000, less than 200,000, less than 100,000, less than 50,000, less than 10,000, or less than 5,000, molecules of the ionizable carotenoid. In some embodiments, the pegylated liposome contains 10 to 100,000, 100 to 10,000, or 1,000 to 5,000, molecules of the carotenoid, or any range therein between. In some embodiments, the encapsulated ionizable carotenoid is trans-crocetin. In some embodiments, the encapsulated ionizable carotenoid is trans-norbixin. In some embodiments, the encapsulated ionizable carotenoid is a carotenoid provided in [1]-[28] and/or FIGS. 1A-1D, herein. In some embodiments, the pegylated liposome encapsulates a plurality of carotenoids In further embodiments, the liposome encapsulates a plurality of ionizable carotenoids (e.g., a combination of trans-crocetin, trans-norbixin, and/or one or more ionizable carotenoid provided in [1]-[28] and/or FIGS. 1A-1D, herein). In some embodiments, the pegylated liposome is targeted. In some embodiments, the pegylated liposome is nontargeted.

In some embodiments, the disclosure provides a liposome composition that comprises a targeted liposome encapsulating an ionizable carotenoid salt. In some embodiments, the liposome encapsulates the ionizable carotenoid salt of any of [1]-[28]. In some embodiments, the targeted liposome comprises a targeting moiety having a specific affinity for a surface antigen on a target cell of interest. In some embodiments, the targeting moiety is attached to one or both of a PEG and the exterior of the liposome. In some embodiments, the targeting moiety is a polypeptide. In further embodiments, the targeting moiety is an antibody or an antigen binding fragment of an antibody. In some embodiments, the targeting moiety binds the surface antigen with an equilibrium dissociation constant (Kd) in a range of $50 \times 10^{-12}$ to $10 \times 10^{-6}$ as determined using BIACORE® analysis. In further embodiments, the Kd is determined using a surface plasmon resonance technique in which an antigen containing the epitope is immobilized, the targeting moiety serves as analyte, and the following conditions are used: 10 mM MES buffer, 0.05% polyoxyethylene sorbitan monolaurate, and 150 mM NaCl at 37° C. In some embodiments, the targeting moiety comprises a protein or folate conjugate with specific affinity for one or more folate receptors selected from: folate receptor alpha (FR-α), folate receptor beta (FR-β), and folate receptor delta (FR δ). In some embodiments, the targeted liposome contains 1 to 1000, 50 to 750, 100 to 500, or 30 to 200 targeting moieties, or any range therein between. The targeted liposome can be pegylated or unpegylated.

In some embodiments, the targeted liposome is pegylated and encapsulates an ionizable carotenoid salt. In some embodiments, the liposome encapsulates the ionizable carotenoid salt of any of [1]-[28]. In some embodiments, the targeted pegylated liposome contains 1 to 1000, 50 to 750, 100 to 500, or 30 to 200 targeting moieties, or any range therein between. In some embodiments, the targeted pegylated liposome contains 10 to 100,000, 100 to 10,000, or 1,000 to 5,000, molecules of the ionizable carotenoid, or any range therein between. In some embodiments, the encapsulated ionizable carotenoid is trans-crocetin. In some embodiments, the encapsulated ionizable carotenoid is trans-norbixin. In some embodiments, the encapsulated ionizable carotenoid is a carotenoid provided in [1]-[28] and/or FIGS. 1A-1D, herein.

In other embodiments, the targeted liposome is unpegylated and encapsulates an ionizable carotenoid salt. In some embodiments, the liposome encapsulates the ionizable carotenoid salt of any of [1]-[28]. In some embodiments, the targeted unpegylated liposome contains 1 to 1000, 50 to 750, 100 to 500, or 30 to 200 targeting moieties, or any range therein between. In further embodiments, the liposome contains 10 to 100,000, 100 to 10,000, or 1,000 to 5,000, molecules of the ionizable carotenoid, or any range therein between. In some embodiments, the encapsulated ionizable carotenoid is trans-crocetin. In some embodiments, the encapsulated ionizable carotenoid is trans-norbixin. In some embodiments, the encapsulated ionizable carotenoid is a carotenoid provided in [1]-[28] and/or FIGS. 1A-1D, herein. In additional embodiments, the targeted unpegylated liposome encapsulates a plurality of carotenoids. In further embodiments, the liposome encapsulates a plurality of ionizable carotenoids (e.g., a combination of trans-crocetin, trans-norbixin, and/or one or more ionizable carotenoid provided in [1]-[28] and/or FIGS. 1A-1D, herein).

In some embodiments, the disclosure provides a pegylated liposome composition that comprises a liposome encapsulating an ionizable carotenoid salt provided in any of and encapsulates an ionizable carotenoid salt. In some embodiments, the liposome encapsulates the ionizable carotenoid salt of any of [1]-[28]. In some embodiments, the liposome contains less than 6 million, less than 500,000, less than 200,000, less than 100,000, less than 50,000, less than 10,000, or less than 5,000, molecules of the ionizable carotenoid. In some embodiments, the pegylated liposome contains 10 to 100,000, 100 to 10,000, or 1,000 to 5,000 molecules of the ionizable carotenoid, or any range therein between. In additional embodiments, the liposome comprises a plurality of carotenoids. In further embodiments, the liposome comprises a plurality of ionizable carotenoids such as two or more of the ionizable carotenoids provided in [1]-[28] and/or FIGS. 1A-1D, herein.

In additional embodiments, the disclosure provides a liposome composition that comprises a pegylated and targeted liposome encapsulating an ionizable carotenoid salt. In some embodiments, the liposome encapsulates the ionizable carotenoid salt of any of [1]-[28]. In some embodiments, the pegylated and targeted liposome contains 1 to 1000, 50 to 750, 100 to 500, or 30 to 200 targeting moieties, or any range therein between. In some embodiments, the pegylated and targeted liposome contains 10 to 100,000, 100 to 10,000, or 1,000 to 5,000 molecules of the ionizable carotenoid, or any range therein between. In additional embodiments, the liposome comprises a plurality of carotenoids. In further embodiments, the liposome comprises a plurality of ionizable carotenoids such as two or more of the ionizable carotenoids provided in [1]-[28] and/or FIGS. 1A-1D, herein.

In additional embodiments, the disclosure provides a liposome composition that comprises a pegylated and untargeted liposome encapsulating an ionizable carotenoid salt. In some embodiments, the liposome encapsulates the ionizable carotenoid salt of any of [1]-[28]. In some embodiments, the pegylated and untargeted liposome contains 10 to 100,000, 100 to 10,000, or 1,000 to 5,000 molecules of the ionizable carotenoid, or any range therein between. In additional embodiments, the pegylated and untargeted liposome comprises a plurality of carotenoids. In further embodiments, the liposome comprises a plurality of ionizable carotenoids such as one or more ionizable carotenoids such as two or more of the ionizable carotenoids provided in [1]-[28] and/or FIGS. 1A-1D, herein.

In additional embodiments, the disclosure provides a liposome composition that comprises an unpegylated liposome encapsulating an ionizable carotenoid salt. In some embodiments, the liposome encapsulates the ionizable carotenoid salt of any of [1]-[28]. In some embodiments, the liposome contains less than 6 million, less than 500,000, less than 200,000, less than 100,000, less than 50,000, less than 10,000, or less than 5,000, molecules of the ionizable carotenoid. In some embodiments, the unpegylated liposome contains 10 to 100,000, 100 to 10,000, or 1,000 to 5,000 molecules of the ionizable carotenoid, or any range therein between. In additional embodiments, the unpegylated liposome comprises a plurality of carotenoids. In further embodiments, the liposome comprises a plurality of ionizable carotenoids such as two or more of the ionizable carotenoids provided in [1]-[28] and/or FIGS. 1A-1D, herein.

In additional embodiments, the disclosure provides a liposome composition that comprises an unpegylated and targeted liposome encapsulating an ionizable carotenoid salt. and encapsulates an ionizable carotenoid salt. In some embodiments, the liposome encapsulates the ionizable carotenoid salt of any of [1]-[28]. In some embodiments, the unpegylated and targeted liposome contains 1 to 1000, 50 to 750, 100 to 500, or 30 to 200 targeting moieties, or any range therein between. In some embodiments, the unpegylated and targeted liposome contains 10 to 100,000, 100 to 10,000, or 1,000 to 5,000 molecules of the ionizable carotenoid, or any range therein between. In additional embodiments, the unpegylated and targeted liposome comprises a plurality of carotenoids. In further embodiments, the liposome comprises a plurality of ionizable carotenoids such as two or more of the ionizable carotenoids provided in [1]-[28] and/or FIGS. 1A-1D, herein.

In additional embodiments, the disclosure provides a liposome composition that comprises an unpegylated and nontargeted liposome encapsulating an ionizable carotenoid salt and encapsulates an ionizable carotenoid salt. In some embodiments, the liposome encapsulates the ionizable carotenoid salt of any of [1]-[28]. In some embodiments, the unpegylated and nontargeted liposome contains 10 to 100, 000, 100 to 10,000, or 1,000 to 5,000 molecules of the ionizable carotenoid, or any range therein between. In additional embodiments, the unpegylated and nontargeted liposome comprises a plurality of carotenoids. In further embodiments, the liposome comprises a plurality of ionizable carotenoids such as two or more of the ionizable carotenoids provided in [1]-[28] and/or FIGS. 1A-1D, herein.

In some embodiments, the disclosure provides a pegylated liposome composition that comprises a liposome encapsulating a trans-crocetin salt. In some embodiments, the liposome contains less than 6 million, less than 500,000, less than 200,000, less than 100,000, less than 50,000, less than 10,000, or less than 5,000, molecules of trans-crocetin. In some embodiments, the pegylated liposome contains 10 to 100,000, 100 to 10,000, or 1,000 to 5,000 molecules of trans-crocetin, or any range therein between. In additional embodiments, the liposome comprises a plurality of carotenoids. In further embodiments, the liposome comprises a plurality of ionizable carotenoids such as one or more ionizable carotenoids provided in [1]-[28] and/or FIGS. 1A-1D, herein.

In additional embodiments, the disclosure provides a liposome composition that comprises a pegylated and targeted liposome encapsulating a trans-crocetin salt. In some embodiments, the pegylated and targeted liposome contains 1 to 1000, 50 to 750, 100 to 500, or 30 to 200 targeting moieties, or any range therein between. In some embodiments, the pegylated and targeted liposome contains 10 to 100,000, 100 to 10,000, or 1,000 to 5,000 molecules of trans-crocetin, or any range therein between. In additional embodiments, the pegylated and targeted liposome comprises a plurality of carotenoids. In further embodiments, the liposome comprises a plurality of ionizable carotenoids such as one or more ionizable carotenoids provided in [1]-[28] and/or FIGS. 1A-1D, herein.

In additional embodiments, the disclosure provides a liposome composition that comprises a pegylated and untargeted liposome encapsulating a trans-crocetin salt. In some embodiments, the pegylated and untargeted liposome contains 10 to 100,000, 100 to 10,000, or 1,000 to 5,000 molecules of trans-crocetin, or any range therein between. In additional embodiments, the pegylated and untargeted liposome comprises a plurality of carotenoids. In further embodiments, the liposome comprises a plurality of ionizable carotenoids such as one or more ionizable carotenoids provided in [1]-[28] and/or FIGS. 1A-1D, herein.

In additional embodiments, the disclosure provides a liposome composition that comprises an unpegylated liposome encapsulating trans-crocetin salt. In some embodiments, the liposome contains less than 6 million, less than 500,000, less than 200,000, less than 100,000, less than 50,000, less than 10,000, or less than 5,000, molecules of trans-crocetin. In some embodiments, the unpegylated liposome contains 10 to 100,000, 100 to 10,000, or 1,000 to 5,000 molecules of trans-crocetin, or any range therein between. In additional embodiments, the unpegylated liposome comprises a plurality of carotenoids. In further embodiments, the liposome comprises a plurality of ionizable carotenoids such as one or more ionizable carotenoids provided in [1]-[28] and/or FIGS. 1A-1D, herein.

In additional embodiments, the disclosure provides a liposome composition that comprises an unpegylated and targeted liposome encapsulating a trans-crocetin salt. In some embodiments, the unpegylated and targeted liposome contains 1 to 1000, 50 to 750, 100 to 500, or 30 to 200 targeting moieties, or any range therein between. In some embodiments, the unpegylated and targeted liposome contains 10 to 100,000, 100 to 10,000, or 1,000 to 5,000 molecules of trans-crocetin, or any range therein between. In additional embodiments, the unpegylated and targeted liposome comprises a plurality of carotenoids. In further embodiments, the liposome comprises a plurality of ionizable carotenoids such as one or more carotenoids provided in [1]-[28] and/or FIGS. 1A-1D, herein.

In additional embodiments, the disclosure provides a liposome composition that comprises an unpegylated and nontargeted liposome encapsulating a trans-crocetin salt. In some embodiments, the unpegylated and nontargeted liposome contains 10 to 100,000, 100 to 10,000, or 1,000 to 5,000 molecules of trans-crocetin, or any range therein between. In additional embodiments, the unpegylated and nontargeted liposome comprises a plurality of carotenoids. In further embodiments, the liposome comprises a plurality of ionizable carotenoids such as one or more carotenoids provided in [1]-[28] and/or FIGS. 1A-1D, herein.

In some embodiments, the disclosure provides a pegylated liposome composition that comprises a liposome encapsulating a trans-norbixin salt. In some embodiments, the liposome contains less than 6 million, less than 500,000, less than 200,000, less than 100,000, less than 50,000, less than 10,000, or less than 5,000, molecules of trans-norbixin. In some embodiments, the pegylated liposome contains 10 to 100,000, 100 to 10,000, or 1,000 to 5,000 molecules of trans-norbixin, or any range therein between. In additional embodiments, the liposome comprises a plurality of carotenoids. In further embodiments, the liposome comprises a plurality of ionizable carotenoids such as one or more ionizable carotenoids provided in [1]-[28] and/or FIGS. 1A-1D, herein.

In additional embodiments, the disclosure provides a liposome composition that comprises a pegylated and targeted liposome encapsulating a trans-norbixin salt. In some embodiments, the pegylated and targeted liposome contains 1 to 1000, 50 to 750, 100 to 500, or 30 to 200 targeting moieties, or any range therein between. In some embodiments, the pegylated and targeted liposome contains 10 to 100,000, 100 to 10,000, or 1,000 to 5,000 molecules of trans-norbixin, or any range therein between. In additional embodiments, the pegylated and targeted liposome comprises a plurality of carotenoids. In further embodiments, the liposome comprises a plurality of ionizable carotenoids such as one or more ionizable carotenoids provided in [1]-[28] and/or FIGS. 1A-1D, herein.

In additional embodiments, the disclosure provides a liposome composition that comprises a pegylated and untargeted liposome encapsulating a trans-norbixin salt. In some embodiments, the pegylated and untargeted liposome contains 10 to 100,000, 100 to 10,000, or 1,000 to 5,000 molecules of trans-norbixin, or any range therein between. In additional embodiments, the pegylated and untargeted liposome comprises a plurality of carotenoids. In further embodiments, the liposome comprises a plurality of ionizable carotenoids such as one or more ionizable carotenoids provided in [1]-[28] and/or FIGS. 1A-1D, herein.

In additional embodiments, the disclosure provides a liposome composition that comprises an unpegylated liposome encapsulating trans-norbixin salt. In some embodiments, the liposome contains less than 6 million, less than 500,000, less than 200,000, less than 100,000, less than 50,000, less than 10,000, or less than 5,000, molecules of trans-norbixin. In some embodiments, the unpegylated liposome contains 10 to 100,000, 100 to 10,000, or 1,000 to 5,000 molecules of trans-norbixin, or any range therein between. In additional embodiments, the unpegylated liposome comprises a plurality of carotenoids. In further embodiments, the liposome comprises a plurality of ionizable carotenoids such as one or more ionizable carotenoids provided in [1]-[28] and/or FIGS. 1A-1D, herein.

In additional embodiments, the disclosure provides a liposome composition that comprises an unpegylated and targeted liposome encapsulating a trans-norbixin salt. In some embodiments, the unpegylated and targeted liposome contains 1 to 1000, 50 to 750, 100 to 500, or 30 to 200 targeting moieties, or any range therein between. In some embodiments, the unpegylated and targeted liposome contains 10 to 100,000, 100 to 10,000, or 1,000 to 5,000 molecules of trans-norbixin, or any range therein between. In additional embodiments, the unpegylated and targeted liposome comprises a plurality of carotenoids. In further embodiments, the liposome comprises a plurality of ionizable carotenoids such as one or more carotenoids provided in [1]-[28] and/or FIGS. 1A-1D, herein.

In additional embodiments, the disclosure provides a liposome composition that comprises an unpegylated and nontargeted liposome encapsulating a trans-norbixin salt. In some embodiments, the unpegylated and nontargeted liposome contains 10 to 100,000, 100 to 10,000, or 1,000 to 5,000 molecules of trans-norbixin, or any range therein between. In additional embodiments, the unpegylated and nontargeted liposome comprises a plurality of carotenoids. In further embodiments, the liposome comprises a plurality of ionizable carotenoids such as one or more carotenoids provided in [1]-[28] and/or FIGS. 1A-1D, herein.

In some embodiments, the provided liposome compositions comprise a liposome encapsulating one or more ionizable carotenoid salts (e.g., divalent, trivalent or tetravalent salt of an ionizable carotenoid of any of [1]-[28], and/or FIGS. 1A-1D)) and one or more aqueous pharmaceutically acceptable carriers. In some embodiments, the liposome composition contains trehalose. In some embodiments, the liposome composition contains 1% to 50% weight of trehalose. In some embodiments, the liposome composition contains HBS at a concentration of between 1 to 200 mM and a pH of between 2 to 8. In some embodiments, liposome composition has a pH 5-8, or any range therein between. In some embodiments, liposome composition has a pH 6-7, or any range therein between.

In further embodiments, the provided liposome compositions comprise a liposome encapsulating a trans-crocetin salt, and one or more aqueous pharmaceutically acceptable carriers. In some embodiments, the liposome solution contains trehalose. In some embodiments, the liposome solution contains 1% to 50% weight of trehalose. In some embodiments, the liposome solution contains HBS at a concentration of 1 to 200 mM and a pH of 2-8, or any range therein between. In some embodiments, liposome solution has a pH 5-8, or any range therein between. In some embodiments, liposome solution has a pH 6-7, or any range therein between. In some embodiments, the provided trans-crocetin salt is a multivalent salt (e.g., divalent, trivalent, or tetravalent). In some embodiments, the trans-crocetin salt is CTC. In some embodiments, the trans-crocetin salt is MTC.

In further embodiments, the provided liposome compositions comprise a liposome encapsulating a trans-norbixin salt, and one or more aqueous pharmaceutically acceptable carriers. In some embodiments, the liposome solution contains trehalose. In some embodiments, the liposome solution contains 1% to 50% weight of trehalose. In some embodiments, the liposome solution contains HBS at a concentration of 1 to 200 mM and a pH of 2-8, or any range therein between. In some embodiments, liposome solution has a pH 5-8, or any range therein between. In some embodiments, liposome solution has a pH 6-7, or any range therein between. In some embodiments, the provided trans-norbixin salt is a multivalent salt (e.g., divalent, trivalent, or tetravalent). In some embodiments, the trans-norbixin salt is CTN. In some embodiments, the trans-norbixin salt is MTN.

The provided liposomes comprise an aqueous compartment enclosed by at least one lipid bilayer. When lipids that include a hydrophilic headgroup are dispersed in water they can spontaneously form bilayer membranes referred to as lamellae. The lamellae are composed of two monolayer sheets of lipid molecules with their non-polar (hydrophobic) surfaces facing each other and their polar (hydrophilic) surfaces facing the aqueous medium. The term liposome includes unilamellar vesicles which are comprised of a single lipid bilayer and generally have a diameter in the range of about 20 to about 500 nm, about 50 to about 300 nm, about 50 to about 150 nm, about 30 to about 1000 nm, about 30 to about 175 nm, about 80 to about 400 nm, or about 80 to about 120 nm. Liposomes can also be multilamellar, which generally have a diameter in the range of 0.5 to 10 μm with anywhere from two to hundreds of concentric lipid bilayers alternating with layers of an aqueous phase. In some embodiments, liposomes can include multilamellar vesicles (MLV), large unilamellar vesicles (LUV), and small unilamellar vesicles (SUV). The lipids of the liposome can be cationic, zwitterionic, neutral or anionic, or any mixture thereof.

Any suitable combination of lipids can be used to provide the liposomes and lipid nanoparticles provided herein. The lipid compositions can be tailored to affect characteristics such as leakage rates, stability, particle size (e.g., liposome diameter), zeta potential, protein binding, in vivo circulation, and/or accumulation in tissues or organs. For example, DSPC and/or cholesterol can be used to decrease leakage from liposomes. Negatively or positively lipids, such as DSPG and/or DOTAP, can be included to affect the surface charge of a liposome or lipid nanoparticle. In some embodiments, the lipid compositions can include about ten or fewer types of lipids, or about five or fewer types of lipids, or about three or fewer types of lipids. In some embodiments, the molar percentage (mol %) of a specific type of lipid present typically comprises from about 0% to about 10%, from about 10% to about 30%, from about 30% to about 50%, from about 50% to about 70%, from about 70% to about 90%, from about 90% to 100% of the total lipid present in a liposome or lipid nanoparticle. In some embodiments, the therapeutic liposome comprises 40-80 mol % DSPC, 5-50 mol % cholesterol, 0-30 mol % DSPG, and 0-10 mol % DSPE-PEG (2000). In some embodiments, the attacking liposome comprises 40-70 mol % DPPC, 5-20 mol % cholesterol, 0-20 mol % DOTAP, and 20-40 mol % TPGS.

Depending on the desired application, the particle size (diameter) of the liposome can be regulated. For example, when it is intended to deliver the liposome to cancerous tissue or inflamed tissue by the Enhanced Permeability and Retention (EPR) effect as an injection product or the like, it is preferable that liposome diameter is 20-500 nm, 30-175 nm, or 50-150 nm, or any range therein between. In the case where the intention is to transmit liposome to macrophage, it is preferable that liposome diameter is 30 to 1000 nm, or 80 to 400 nm, or any range therein between. In the case where liposome composition is to be used as an oral preparation or transdermal preparation, the particle size of liposome can be set at several microns. It should be noted that in normal tissue, vascular walls serve as barriers (because the vascular walls are densely constituted by vascular endothelial cells), and microparticles such as supermolecules and liposome of specified size cannot be distributed within the tissue. However, in diseased tissue, vascular walls are loose (because interstices exist between vascular endothelial cells), increasing vascular permeability, and supermolecules and microparticles can be distributed to extravascular tissue (enhanced permeability). Moreover, the lymphatic system is well developed in normal tissue, but it is known that the lymphatic system is not developed in diseased tissue, and that supermolecules or microparticles, once incorporated, are not recycled through the general system, and are retained in the diseased tissue (enhanced retention), which forms the basis of the EPR effect (Wang et al., Ann. Rev. Med. 63:185-198 (2012); Peer et al., Nat. Nanotech. 2:751-760 (2007); Gubernator, Exp. Opin. Drug Deliv. 8:565-580 (2011); Huwyler et al., Int. J. Nanomed. 3:21-29 (2008); Maruyama et al. Adv. Drug Deliv. Rev. 63:161-169 (2011); Musacchio and Torchilin Front. Biosci. 16:1388-1412 (2011); Baryshnikov Vest. Ross. Akad. Med. Nauk. 23-31 (2012); and Torchilin Nat. Rev. Drug Disc. 4:145-160 (2005)). Thus, it is possible to control liposome pharmacokinetics by adjusting liposome particle size (diameter).

The size of the liposomes in the provided liposome compositions may vary from for example, 0.5 nm to 10 um, or 20 nm to 5 um, depending on the phospholipid composition, the method used for their preparation, and the intended therapeutic use of the liposomes. In some embodiments, the median diameter of the liposomes in the provided liposome composition is 20 nm to 500 nm, 50 nm to 200 nm, or 20 nm to 200 nm, or any range therein between. In some embodiments, the liposome the liposome median diameter is 80 nm to 120 nm, or any range therein between (e.g., 85-115 nm, 90-110 nm, 95-110 nm, or 95-105 nm). In some embodiments, the median diameter of the liposomes in the provided liposome composition is 10-250 nm, or any range therein between (e.g., 10-225 nm, 10-200 nm, 10-175 nm, 10-150 nm, 40-150 nm, 50-150 nm, 60-150 nm, 70-150 nm, 80-150 nm, 90-150 nm, 100-150 nm, 10-125 nm, 10-100 nm, 10-75 nm, 10-50 nm, 50-100 nm, 50-90 nm, 50-80 nm, 50-70 nm, 50-60 nm, 60-100 nm, 60-90 nm, 60-80 nm, 60-70 nm, 70-100 nm, 70-90 nm, 70-80 nm, 80-100 nm, 80-90 nm, or 90-100 nm). In some embodiments, the median diameter of the liposomes in the provided liposome composition is 100-250 nm, or any range therein between (e.g., 100-225 nm, 100-200 nm, 100-175 nm, or 100-150 nm). In other embodiments, the median diameter of the liposomes in the provided liposome composition is 10-100 nm, or any range therein between (e.g., from about 10-90 nm, 10-80 nm, 10-70 nm, 10-60 nm, or 10-50 nm). In some embodiments, the median diameter of the liposomes in the provided liposome composition is less than, about 500 nm, 450 nm, 400 nm, 350 nm, 300 nm, 250 nm, 200 nm, 150 nm, 145 nm, 150 nm, 135 nm, 130 nm, 125 nm, 120 nm, 115 nm, 110 nm, 105 nm, 100 nm, 95 nm, 90 nm, 85 nm, 80 nm, 75 nm, 70 nm, 65 nm, 60 nm, 55 nm, or 50 nm, 45 nm, or 40 nm.

Dynamic laser light scattering is a method used to measure the diameter of liposomes that is well known to those skilled in the art. The diameter of the liposomes (DLP) can routinely be determined using any techniques and equipment known in the art including for example, dynamic laser light scattering (Coulter N4 particle size analyzer), the Zetasizer Nano ZSP (Malvern, UK), and an ELS-8000 (Otsuka Electronics Co., Ltd.)).

In some embodiments, the provided liposome compositions have a monodisperse size (diameter) distribution. "Monodisperse" and "homogeneous size distribution," are used interchangeably herein and describe a plurality of liposomal nanoparticles or microparticles where the particles have the same or nearly the same diameter. As used herein, a monodisperse distribution refers to particle distributions in which 75%, 76%, 77%, 78%, 79%, 80%, 81%, 82%, 83%, 84%, 85%, 86%, 86%, 88%, 89%, 90%, 91%, 92%, 93%, 94%, 95% or greater of the particle distribution lies within 85%, 80%, 75%, 70%, 65%, 60%, 55%, 50%, 45%, 40%, 35%, 30%, 25%, 20%, 15%, or 10% of the mass median diameter.

In some embodiments, the liposome population in a provided liposome composition is relatively homogenous. In some embodiments, the liposome population in a provided liposome composition is heterogeneous. A polydispersity index may be used to indicate the homogeneity of a nanoparticle composition, e.g., the particle size (diameter) distribution of the nanoparticle compositions. A small (e.g., less than 0.3) polydispersity index generally indicates a narrow particle size distribution. In some embodiments, the liposome population in a provided liposome composition has a polydispersity index from 0 to 0.25, or 0.01 to 0.1, or any range therein between (e.g., 0.001 to 0.2, 0.005 to 0.1, 0.005 to 0, 0.005 to 0.09, 0.009 to 0.09, 0.01 to 0.08, 0.02 to 0.09, or 0.02 to 0.07, or any range therein between.

In some embodiments, liposomes in the liposome population in a provided liposome composition differ in their lipid composition, molar ratio of lipid components, size, charge (zeta potential), targeting ligands and/or combinations thereof.

The zeta potential of a nanoparticle composition may be used to indicate the electrokinetic potential of the composition. For example, the zeta potential may describe the surface charge of a nanoparticle composition. Nanoparticle compositions with relatively low charges, positive or negative, are generally desirable, as more highly charged species may interact undesirably with cells, tissues, and other elements in the body. In some embodiments, the zeta potential of a nanoparticle composition can be from about −10 mV to about +20 mV, from about −10 mV to about +15 mV, from about −10 mV to about +10 mV, from about −10 mV to about +5 mV, from about −10 mV to about 0 mV, from about −10 mV to about −5 mV, from about −5 mV to about +20 mV, from about −5 mV to about +15 mV, from about −5 mV to about +10 mV, from about −5 mV to about +5 mV, from about −5 mV to about 0 mV, from about 0 mV to about +20 mV, from about 0 mV to about +15 mV, from about 0 mV to about +10 mV, from about 0 mV to about +5 mV, from about +5 mV to about +20 mV, from about +5 mV to about +15 mV, or from about +5 mV to about +10 mV. Liposome zeta potential can routinely be determined using techniques and equipment known in the art including for example, dynamic light scattering (Zetasizer Nano ZSP, Malvern, UK) and laser Doppler electrophoresis.

The encapsulation efficiency of a therapeutic and/or prophylactic such as an ionizable carotenoid (e.g., trans-crocetin), describes the amount of therapeutic and/or prophylactic that is encapsulated or otherwise associated with a nanoparticle composition after preparation, relative to the initial amount provided. The encapsulation efficiency is desirably high (e.g., close to 100%). The encapsulation efficiency may be measured, for example, by comparing the amount of therapeutic and/or prophylactic in a solution containing the nanoparticle composition before and after removing the unencapsulated therapeutic and/or prophylactic drug. For the liposome compositions described herein, the encapsulation efficiency of a ionizable carotenoid (e.g., trans-crocetin), can be at least 50%, for example 60%, 70%, 80%, 85%, 90%, 91%, 92%, 93%, 94%, 95%, 96%, 97%, 98%, or 99%. In some embodiments, the encapsulation efficiency is at least 80%. In certain embodiments, the encapsulation efficiency is at least 90%. In certain embodiments, the encapsulation efficiency is at least 95%. In certain embodiments, the encapsulation efficiency is at least 98%.

In additional embodiments, the provided liposome compositions contain liposomes encapsulating a salt of an ionizable carotenoid. In some embodiments, the ionizable carotenoid (e.g., trans-crocetin)/lipid ratio of the provided liposome composition is 1 to 1000 g/mol, or any range therein between. In some embodiments, the ionizable carotenoid/lipid ratio of the liposome composition is 10 to 200 g/mol, 10 to 150 g/mol, 10 to 100 g/mol, 20 to 200 g/mol, 20 to 150 g/mol, 20 to 100 g/mol, 30 to 200 g/mol, 30 to 150 g/mol, 30 to 100 g/mol, 40 to 200 g/mol, 40 to 150 g/mol, 40 to 100 g/mol, 50 to 200 g/mol, 50 to 150 g/mol, or 50 to 100 g/mol, or any range therein between. In some embodiments, the ionizable carotenoid/lipid ratio is 30 to 90 g/mol, or any range therein between. In some embodiments, the ionizable carotenoid/lipid ratio is 30 to 50 g/mol, 40 to 60 g/mol, 50 to 70 g/mol, 60 to 80 g/mol, or 70 to 90 g/mol, or any range therein between. In some embodiments, the liposome encapsulates an ionizable carotenoid salt of any of [1] to [27]. In some embodiments, the liposome encapsulates an ionizable carotenoid salt presented in any of FIGS. 1A-1D.

In some embodiments, the liposome composition contains liposomes encapsulating a trans-crocetin salt. In some embodiments, the trans-crocetin/lipid ratio of the provided liposome composition is 1 to 1000 g/mol, or any range therein between. In some embodiments, the trans-crocetin/lipid ratio of the liposome composition is 10 to 200 g/mol, 10 to 150 g/mol, 10 to 100 g/mol, 20 to 200 g/mol, 20 to 150 g/mol, 20 to 100 g/mol, 30 to 200 g/mol, 30 to 150 g/mol, 30 to 100 g/mol, 40 to 200 g/mol, 40 to 150 g/mol, 40 to 100 g/mol, 50 to 200 g/mol, 50 to 150 g/mol, or 50 to 100 g/mol, or any range therein between. In some embodiments, the trans-crocetin/lipid ratio is 30 to 90 g/mol, or any range therein between. In some embodiments, the trans-crocetin/lipid ratio is 30 to 50 g/mol, 40 to 60 g/mol, 50 to 70 g/mol, 60 to 80 g/mol, or 70 to 90 g/mol, or any range therein between.

In some embodiments, the liposome composition contains liposomes encapsulating a trans-norbixin salt. In some embodiments, the trans-norbixin/lipid ratio of the provided liposome composition is 1 to 1000 g/mol, or any range therein between. In some embodiments, the trans-norbixin/lipid ratio of the liposome composition is 10 to 200 g/mol, 10 to 150 g/mol, 10 to 100 g/mol, 20 to 200 g/mol, 20 to 150 g/mol, 20 to 100 g/mol, 30 to 200 g/mol, 30 to 150 g/mol, 30 to 100 g/mol, 40 to 200 g/mol, 40 to 150 g/mol, 40 to 100 g/mol, 50 to 200 g/mol, 50 to 150 g/mol, or 50 to 100 g/mol, or any range therein between. In some embodiments, the trans-norbixin/lipid ratio is 30 to 90 g/mol, or any range therein between. In some embodiments, the trans-norbixin/ lipid ratio is 30 to 50 g/mol, 40 to 60 g/mol, 50 to 70 g/mol, 60 to 80 g/mol, or 70 to 90 g/mol, or any range therein between.

In some embodiments, the liposome composition is buffered using a zwitterionic buffer. Suitably, the zwitterionic buffer is an aminoalkanesulfonic acid or suitable salt. Examples of aminoalkanesulfonic buffers include but are not limited to HEPES, HEPPS/EPPS, MOPS, MOBS and PIPES. Preferably, the buffer is a pharmaceutically acceptable buffer, suitable for use in humans, such as in for use in a commercial injection product. Most preferably the buffer is HEPES. The liposome composition may suitable include an AGP.

In some embodiments, the liposome composition is buffered using HEPES. In some embodiments, the liposome composition is buffered using HEPES having a pH of about 7.

In some embodiments, the pharmaceutical composition is a liposome composition comprising a cationic liposome. In some embodiments, the liposome composition comprises a liposome that has a zeta potential that is more than zero. In some embodiments, the liposome has a zeta potential of 0.2 to 150 mV, 1 to 50 mV, 1 to 40 mV, 1 to 30 mV, 1 to 25 mV, 1 to 20 mV, 1 to 15 mV, 1 to 10 mV, 1 to 5 mV, 2 to 10 mV, 3 to 10 mV, 4 to 10 mV, or 5 to 10 mV, or any range therein between. In some embodiments, the liposome has a diameter of 20 nm to 500 nm, 20 nm to 200 nm, 30 nm to 175 nm, 50 nm to 200 nm, or 50 nm to 150 nm, or any range therein between. In some embodiments, the cationic liposome has a diameter of 80 nm to 120 nm, or any range therein between. In some embodiments, the liposome composition comprises at least 1%, 5%, 10%, 15%, 20%, 25%, 30%, 35, 40%, 45%, 50%, 55%, 60%, 65%, 70%, 75%, or more than 75%, w/w of an ionizable carotenoid (e.g., trans-crocetin). In some embodiments, during the process of preparing the liposome composition, at least 1%, 5%, 10%, 15%, 20%, 25%, 30%, 35%, 40%, 45%, 50%, 55%, 60%, 65%, 70%, 75%, 75%, 80%, 85%, 90%, 95%, or 97%, of the an ionizable carotenoid starting material is encapsulated (entrapped) in the liposomes of the liposome composition. In additional embodiments, the ionizable carotenoid (e.g., trans-crocetin) encapsulated by the liposome is in a HEPES buffered solution within the liposome. In further embodiments, the liposome comprises at least one OxPAPC.

In some embodiments, the provided pharmaceutical composition is a liposome composition comprising an anionic or neutral liposome. In some embodiments, the liposome composition comprises a liposome that has a zeta potential that is less than or equal to zero. In some embodiments, the liposome has a zeta potential that is −150 to 0, −50 to 0 mV, −40 to 0 mV, −30 to 0 mV, −25 to 0 mV, −20 to 0 mV, −10 to 0 mV, −9 to 0 mV, −8 to 0 mV, −7 to 0 mV, −6 to 0 mV, −5 to 0 mV, −4 to 0 mV, −3 to 0 mV, −2 to 0 mV, −1 to 0 mV, or −8 to 2 mV, or any range therein between. In some embodiments, the anionic or neutral liposome has a diameter of 20 nm to 500 nm, 20 nm to 200 nm, 30 nm to 175 nm, or 50 nm to 150 nm, or any range therein between. In other embodiments, the anionic or neutral liposome has a diameter of 80 nm to 120 nm, or any range therein between. In some embodiments, the anionic liposome has a diameter of 20 nm to 500 nm, 20 nm to 200 nm, 30 nm to 175 nm, or 50 nm to 150 nm, or any range therein between. In further embodiments, the anionic liposome has a diameter of 80 nm to 120 nm, or any range therein between. In some embodiments, the neutral liposome has a diameter of 20 nm to 500 nm, 20 nm to 200 nm, 30 nm to 175 nm, or 50 nm to 150 nm, or any range therein between. In some embodiments, the neutral liposome has a diameter of 80 nm to 120 nm, or any range therein between. In some embodiments, the pharmaceutical composition comprises at least 1%, 5%, 10%, 15%, 20%, 25%, 30%, 35, 40%, 45%, 50%, 55%, 60%, 65%, 70%, 75%, or more than 75%, w/w ionizable carotenoid (e.g., trans-crocetin). In some embodiments, during the process of preparing the liposome composition, at least 1%, 5%, 10%, 15%, 20%, 25%, 30%, 35%, 40%, 45%, 50%, 55%, 60%, 65%, 70%, 75%, or more than 75%, of the starting material of ionizable carotenoid (e.g., trans-crocetin) is encapsulated (entrapped) in the liposomes. In some embodiments, the liposome composition comprises at least 1%, 5%, 10%, 15%, 20%, 25%, 30%, 35, 40%, 45%, 50%, 55%, 60%, 65%, 70%, 75%, or more than 75%, w/w of the ionizable carotenoid (e.g., trans-crocetin). In some embodiments, the anionic or neutral liposome composition comprises at least 1%, 5%, 10%, 15%, 20%, 25%, 30%, 35, 40%, 45%, 50%, 55%, 60%, 65%, 70%, 75%, or more than 75%, w/w of the ionizable carotenoid (e.g., trans-crocetin). In some embodiments, liposome composition comprises at least 1%, 5%, 10%, 15%, 20%, 25%, 30%, 35, 40%, 45%, 50%, 55%, 60%, 65%, 70%, 75%, or more than 75%, w/w of the ionizable carotenoid (e.g., trans-crocetin). In additional embodiments, the ionizable carotenoid (e.g., trans-crocetin) is encapsulated by the anionic or neutral liposome is in a HEPES buffered solution within the liposome. In further embodiments, the liposome comprises at least one OxPAPC.

In some embodiments, the provided pharmaceutical composition is a liposome composition comprising a liposome that comprises at least one OxPAPC. In some embodiments, the OxPAPC is an oxidized and/or phospholipid containing fragmented oxygenated sn-2 residues. In some embodiments, the OxPAPC is an oxidized phospholipid containing a five-carbon sn-2 residue bearing an omega-aldehyde or omega-carboxyl group. In some embodiments, the OxPAPC is an oxidized phospholipid selected from HOdiA-PC, KOdiA-PC, HOOA-PC and KOOA-PC. In some embodiments, the OxPAPC is a epoxyisoprostane-containing phospholipid. In some embodiments, the OxPAPC is PGPC. In some embodiments, the liposome comprises at least 0.01%, 0.1%, 1%, 5%, 10%, 15%, 20%, 25%, or at least 30%, OxPAPC. In some embodiments, the liposome composition has a cationic liposome that comprises 0.01%-35%, 0.1%-30%, 1%-25%, 3-20%, or 5-15%, OxPAPC, or any range therein between. In some embodiments, the liposome composition comprises a cationic liposome. In some embodiments, the liposome composition comprises a neutral liposome. In some embodiments, the liposome composition comprises an anionic liposome. In additional embodiments, the liposome composition comprises at least one liposome containing an OxPAPC that has a diameter of 20 nm to 500 nm, 20 nm to 200 nm, 30 nm to 175 nm, or 50 nm to 150 nm, or any range therein between. In further embodiments, the liposome composition comprises a at least one liposome containing an OxPAPC that has a diameter of 80 nm to 120 nm, or any range therein between.

In some embodiments, the provided pharmaceutical composition is a liposome composition comprising a cationic liposome that comprises at least 0.01%, 0.1%, 1%, 5%, 10%, 15%, 20%, 25%, or at least 30%, OxPAPC. In some embodiments, the liposome composition has a cationic liposome that comprises 0.01%-35%, 0.1%-30%, 1%-25%, 3-20%, or 5-15%, OxPAPC, or any range therein between. In some embodiments, the liposome comprises at least 0.01%, 0.1%, 1%, 5%, 10%, 15%, 20%, 25%, or at least 30%, OxPAPC. In some embodiments, the liposome composition has a cationic liposome that contains about 10% OxPAPC. In some embodiments, the liposome composition has a cationic liposome that comprises at least 0.01%, 0.1%, 1%, 5%, 10%, 15%, 20%, 25%, or at least 30%, PGPC. In some embodiments, the liposome comprises 0.01%-35%, 0.1%-30%, 1%-25%, 3-20%, or 5-15%, PGPC, or any range therein between. In some embodiments, the liposome composition has a cationic liposome that comprises about 10% PGPC.

In some embodiments, the pharmaceutical composition is a liposome composition comprising an anionic or neutral liposome that comprises at least 0.01%, 0.1%, 1%, 5%, 10%, 15%, 20%, 25%, or at least 30%, OxPAPC. In some embodiments, the liposomal composition has a anionic or neutral liposome that comprises 0.01%-35%, 0.1%-30%, 1%-25%, 3-20%, or 5-15%, OxPAPC, or any range therein between. In some embodiments, the liposome comprises at least 0.01%, 0.1%, 1%, 5%, 10%, 15%, 20%, 25%, or at least 30%, OxPAPC. In some embodiments, the liposomal composition has a anionic or neutral liposome that contains about 10% OxPAPC. In some embodiments, the liposomal composition comprises has a anionic or neutral liposome that comprises at least 0.01%, 0.1%, 1%, 5%, 10%, 15%, 20%, 25%, or at least 30%, PGPC. In some embodiments, the liposome comprises 0.01%-35%, 0.1%-30%, 1%-25%, 3-20%, or 5-15%, PGPC, or any range therein between. In some embodiments, the liposomal composition has a anionic or neutral liposome that contains about 10% PGPC.

In some embodiments, the pharmaceutical composition is a liposomal composition comprising a neutral liposome that comprises at least 0.01%, 0.1%, 1%, 5%, 10%, 15%, 20%, 25%, or at least 30%, OxPAPC. In some embodiments, the neutral OxPAPC containing liposomal composition comprises 0.01%-35%, 0.1%-30%, 1%-25%, 3-20%, or 5-15%, OxPAPC, or any range therein between. In some embodiments, the neutral OxPAPC containing liposomal composition comprises about 10% OxPAPC. In some embodiments, the neutral OxPAPC containing liposomal composition comprises at least 0.01%, 0.1%, 1%, 5%, 10%, 15%, 20%, 25%, or at least 30%, PGPC. In some embodiments, the neutral PGPC containing liposomal composition comprises 0.01%-35%, 0.1%-30%, 1%-25%, 3-20%, or 5-15%, PGPC, or any range therein between. In some embodiments, the neutral OxPAPC containing liposomal composition comprises about 10% PGPC.

In additional embodiments, a liposome in the liposomal composition is pegylated.

In some embodiments, the provided pharmaceutical composition is a non-targeted liposomal composition. That is, the liposomes in the liposomal composition do not have specific affinity towards an epitope (e.g., an epitope on a surface antigen) expressed on the surface of a target cell of interest. In further embodiments, the non-targeted liposomal composition is pegylated.

In some cases, liposome accumulation at a target site may be due to the enhanced permeability and retention characteristics of certain tissues such as cancer tissues. Accumulation in such a manner often results in part because of liposome size and may not require special targeting functionality. In other embodiments, the provided liposomes include a targeting agent. Generally, the targeting agents can associate with any target of interest, such as a target associated with an organ, tissues, cell, extracellular matrix, or intracellular region. In certain embodiments, a target can be associated with a particular disease state, such as a cancerous condition. In some embodiments, the targeting component can be specific to only one target, such as a receptor. Suitable targets can include but are not limited to a nucleic acid, such as a DNA, RNA, or modified derivatives thereof. Suitable targets can also include but are not limited to a protein, such as an extracellular protein, a receptor, a cell surface receptor, a tumor-marker, a transmembrane protein, an enzyme, or an antibody. Suitable targets can include a carbohydrate, such as a monosaccharide, disaccharide, or polysaccharide that can be, for example, present on the surface of a cell.

In certain embodiments, a targeting agent can include a target ligand (e.g., an RGD-containing peptide), a small molecule mimic of a target ligand (e.g., a peptide mimetic ligand), or an antibody or antibody fragment specific for a particular target. In some embodiments, a targeting agent can further include folic acid derivatives, B-12 derivatives, integrin RGD peptides, NGR derivatives, somatostatin derivatives or peptides that bind to the somatostatin receptor, e.g., octreotide and octreotate, and the like. In some embodiments, the targeting agents include an aptamer. Aptamers can be designed to associate with or bind to a target of interest. Aptamers can be comprised of, for example, DNA, RNA, and/or peptides, and certain aspects of aptamers are known in the art. (See, e.g., Klussman, Ed., The Aptamer Handbook, Wiley-VCH (2006); Nissenbaum, Trends in Biotech. 26(8): 442-449 (2008)).

In other embodiments, the liposomal composition comprises a targeted liposome. That is, the liposome contains a targeting moiety that has specific affinity for an epitope (e.g., a surface antigen or other molecule) on a target cell of interest. In some embodiments, the targeting moiety of the liposome is not attached to the liposome through a covalent bond. In other embodiments, the targeting moiety of the liposome is attached to one or both of a PEG and the exterior of the liposome. In further embodiments, the targeted liposome is pegylated. The functions of the targeting moiety of the targeted liposome may include but is not limited to, targeting the liposome to the target cell of interest in vivo or in vitro; interacting with the surface antigen for which the targeting moiety has specific affinity, and delivering the liposome payload (e.g., trans-crocetin) to the location of or into the cell.

Suitable targeting moieties are known in the art and include, but are not limited to, antibodies, antigen-binding antibody fragments, scaffold proteins, polypeptides, and peptides. In some embodiments, the targeting moiety is a polypeptide. In further embodiments, the targeting moiety is a polypeptide that comprises at least 3, 5, 10, 15, 20, 30, 40, 50, or 100, amino acid residues. In some embodiments, the targeting moiety is an antibody or an antigen-binding antibody fragment. In further embodiments, the targeting moiety comprises one or more of an antibody, a humanized antibody, an antigen binding fragment of an antibody, a single chain antibody, a single-domain antibody, a bi-specific antibody, a synthetic antibody, a pegylated antibody, and a multimeric antibody. In some embodiments, the targeting moiety has specific affinity for an epitope that is preferentially expressed on a target cell such as a tumor cell, compared to normal or non-tumor cells. In some embodiments, the targeting moiety has specific affinity for an epitope on a tumor cell surface antigen that is present on a tumor cell but absent or inaccessible on a non-tumor cell. In some embodiments, the targeting moiety binds an epitope of interest with an equilibrium dissociation constant (Kd) in a range of $50 \times 10^{-12}$ to $10 \times 10^{-6}$ as determined using BIA-CORE® analysis. In further embodiments, the Kd is determined using a surface plasmon resonance technique in which an antigen containing the epitope is immobilized, the targeting moiety serves as analyte, and the following conditions are used: 10 mM MES buffer, 0.05% polyoxyethylene sorbitan monolaurate, and 150 mM NaCl at 37° C.

In particular embodiments, the targeting moiety comprises a polypeptide that specifically binds a folate receptor. In some embodiments, the targeting moiety is an antibody or an antigen-binding antibody fragment. In some embodiments, the targeting moiety is a liposome surface-conjugated folate (e.g., a folate-PEG conjugate) or folate derivative. In some embodiments, the folate receptor bound by the targeting moiety is one or more folate receptors selected from: folate receptor alpha (FR-α, FOLR1), folate receptor beta (FR-β, FOLR2), and folate receptor delta (FR-δ, FOLR4). In some embodiments, the folate receptor bound by the targeting moiety is folate receptor alpha (FR-α). In some embodiments, the folate receptor bound by the targeting moiety is folate receptor beta (FR-β). In some embodiments, the targeting moiety specifically binds FR-α and FR-β.

In additional embodiments, the liposome composition comprises one or more of an immunostimulatory agent, a detectable marker, and a maleimide, disposed on at least one of the PEG and the exterior of the liposome. In some embodiments, a liposome of the liposome composition is cationic. In other embodiments, a liposome of the liposome composition is anionic or neutral. In additional embodiments, a liposome of the liposomal composition has a diameter of 20 nm to 500 nm, or any range therein between. In further embodiments, a liposome of the liposomal composition has a diameter of 80 nm to 120 nm, or any range therein between. In some embodiments, a liposome of the liposomal composition is pegylated. In some embodiments, a liposome of the liposomal composition is targeted. In further embodiments, a liposome of the liposomal composition is pegylated and targeted.

In some embodiments, the disclosure provides a pharmaceutical composition comprising an ionizable carotenoid having the formula:

Polyene Carotenoid-Q encapsulated by a liposome,
wherein, the Polyene Carotenoid comprises
(a) 3, 4, 5, 6, 7, 8, 9, 10, 3-5, 6-8, 9-10, or more than 9, conjugated double bonds,
(b) methyl or low alkyl (C2-C3) substitutions, and
(c) 1, 2, 3, or more than 3, ionizable groups; and
Q is a (a) a multivalent counterion or (b) a monovalent cation.

In some embodiments, the Polyene Carotenoid comprises all trans conjugated double bonds. In some embodiments, the Polyene Carotenoid comprises 6-9 conjugated double bonds. In particular embodiments, the Polyene Carotenoid comprises 7 conjugated double bonds. The Polyene Carotenoid can be naturally occurring or synthetic. In some embodiments, the Polyene Carotenoid is naturally occurring. In other embodiments, the Polyene Carotenoid is synthetic. The ionizable group(s) may be anionic and/or cationic. In some embodiments, the Polyene Carotenoid-Q comprises two or more of the same ionizable group. In some embodiments, the Polyene Carotenoid comprises all trans conjugated double bonds. In some embodiments, the Polyene Carotenoid comprises 6-9 conjugated double bonds. In some embodiments, the Polyene Carotenoid comprises two or more different ionizable groups. In some embodiments, the Polyene Carotenoid-Q comprises one or more anionic ionizable groups. In some embodiments, the Polyene Carotenoid comprises at least one ionizable group selected from: a carboxylic group, a sulfonate group, a sulfate group, a phosphonate, or a phosphate group, and a hydroxamate moiety. In other embodiments, the Polyene Carotenoid-Q comprises one or more cationic ionizable groups (e.g., a primary, secondary, or tertiary amine group, a quaternary ammonium group, a choline group, a guanidine group, or an imidazole group). In particular embodiments, the Polyene Carotenoid comprises at least one cationic ionizable group and the pharmaceutical composition is substantially free of nucleic acids.

In some embodiments, Q is a multivalent counterion. In some embodiments, Q is a multivalent cation counterion. In some embodiments, Q is a multivalent metal cation. In some embodiments, Q is a multivalent transition metal cation. In some embodiments, Q is a divalent counterion. In some embodiments, Q is a divalent cation counterion. In some embodiments, Q is a divalent metal cation. In some embodiments, Q is a divalent transition metal cation. In some embodiments, Q is at least one member selected from $Ca^{2+}$, $Mg^{2+}$, $Zn^{2+}$, $Cu^{2+}$, $Co^{2+}$, and $Fe^{2+}$. In some embodiments, Q is $Ca^{2+}$ or $Mg^{2+}$. In some embodiments, Q is $Ca^{2+}$. In further embodiments, the Polyene Carotenoid-Q is calcium trans-crocetinate (CTC). In some embodiments, Q is $Mg^{2+}$. In further embodiments, the Polyene Carotenoid-Q is magnesium trans-crocetinate (MTC). In other embodiments, Q is a trivalent cation counterion such as $Fe^{3+}$. In some embodiments, Q is a multivalent organic counterion. In some embodiments, Q is a divalent organic cation. In some embodiments, Q is a bivalent organic cation such as protonated diamine.

In further embodiments, Q is a monovalent counterion. In some embodiments, Q is a monovalent cation counterion. In some embodiments, Q is a monovalent metal cation. In some embodiments, Q is at least one member selected from $Na^+$, $Li^+$, or $K^+$. In some embodiments, Q is an organic cation. In some embodiments, Q is a divalent organic cation. In some embodiments, Q is a monovalent organic cation such as a protonated amine (e.g., a protonated diamine or a protonated polyamine). In some embodiments, Q is an organic cation such as $NH_4^+$, a protonated diamine or a protonated polyamine.

In some embodiments, the liposome contains less than 6 million, less than 500,000, less than 200,000, less than 100,000, less than 50,000, less than 10,000, or less than 5,000, molecules of ionizable carotenoid. In some embodiments, the liposome contains 10 to 100,000 molecules of ionizable carotenoid, or any range therein between. In some embodiments, the ionizable carotenoid/lipid ratio of the liposomal composition is 1 g/mol and about 1000 g/mol, or any range therein between. In some embodiments, the ionizable carotenoid/lipid ratio is 10-150 g/mol, 10-100 g/mol, 30-200 g/mol, 40-200 g/mol, or 50-200 g/mol, or any range therein between. In some embodiments, the liposome comprises at least 0.1% to 97% trans-crocetin. In some embodiments, the liposome has a diameter of 20 nm to 500 nm, 20 nm to 200 nm, or 80 nm to 120 nm, or any range therein between. In some embodiments, the liposome is formed from liposomal components. In further embodiments, the liposomal components comprise at least one of an anionic lipid and a neutral lipid. In further embodiments, the liposomal components comprise at least one selected from: DSPE; DSPE-PEG; DSPE-PEG-maleimide; HSPC; HSPC-PEG; cholesterol; cholesterol-PEG; and cholesterol-maleimide. In further embodiments, the liposomal components comprise at least one selected from: DSPE; DSPE-PEG; DSPE-PEG-FITC; DSPE-PEG-maleimide; cholesterol; and HSPC. In additional embodiments, the liposome further comprises an oxidized phospholipid such as an OxPAPC. In some embodiments, the liposome comprises an OxPAPC that is an oxidized phospholipid containing fragmented oxygenated sn-2 residues, an oxidized phospholipid containing full length oxygenated sn-2 residues, and/or an oxidized phospholipid containing a five-carbon sn-2 residue bearing omega-aldehyde or omega-carboxyl groups. In some embodiments, the liposome comprises an OxPAPC selected from HOdiA-PC, KOdiA-PC, HOOA-PC and KOOA-PC, or the OxPAPC is an epoxy-isoprostane-containing phospholipid. In some embodiments, the liposome comprises an OxPAPC selected from 1-palmitoyl-2-(5,6-epoxyisoprostane E2)-sn-glycero-3-phosphocholine (5,6 PEIPC), 1-palmitoyl-2-(epoxycyclopenten-one)-sn-glycero-3-phosphorylcholine (PECPC), 1-palmitoyl-2-(epoxyisoprostane E2)-sn-glycero-4-phospho-choline (PEIPC), 1-palmitoyl-2-glutaroyl-sn-glycero-3-phosphocholine (PGPC); 1-palmitoyl-2-(9'oxo-nonanoyl)-sn-glycer-o-3-phosphocholine; 1-palmitoyl-2-arachinodoyl-sn-glycero-3-phosphocholine; 1-palmitoyl-2-myristoyl-sn-glycero-3-phosphocholine; 1-palmitoyl-2-hexadec-yl-sn-glycero-3-phosphocholine; 1-palmitoyl-2-azelaoyl-sn-glycero-3-phosphocholine; and 1-palmitoyl-2-acetoyl-sn-glycero-3-phosphocholine. In some embodiments, the liposome comprises PGPC. In some embodiments, the OxPAPC within the liposome lipid bilayer is 0%-100% of total lipids, or any range therein between. In some embodiments, the liposome comprises a targeting moiety having a specific affinity for a surface antigen or other molecules on a target cell of interest. In some embodiments, the targeting moiety is attached to one or both of a PEG and the exterior of the liposome, optionally wherein the targeting moiety is attached to one or both of the PEG and the exterior of the liposome by a covalent bond. In some embodiments, the targeting moiety is a polypeptide. In further embodiments, the targeting moiety is an antibody or an antigen binding fragment of an antibody. In some embodiments, the liposome contains 1 to 1000, 50 to 750, 100 to 500, or 30 to 200 targeting moieties, or any range therein between. In some embodiments, the liposome further comprises an immunostimulating agent (such as 1,6-beta glucan). In some embodiments, the liposome comprises a steric stabilizer. In some embodiments, the steric stabilizer is polyethylene glycol (i.e., the liposome is pegylated). In some embodiments, the PEG has a number average molecular weight (Mn) of 200 to 5000 Daltons. In additional embodiments, the liposome is anionic or neutral. In some embodiments, the liposome has a zeta potential that is less than or equal to zero. In some embodiments, the liposome has a zeta potential that is −150 to 0, −50 to 0 mV, −40 to 0 mV, −30 to 0 mV, −25 to 0 mV, −20 to 0 mV, −10 to 0 mV, −9 to 0 mV, −8 to 0 mV, −7 to 0 mV, −6 to 0 mV, −5 to 0 mV, −4 to 0 mV, −3 to 0 mV, −2 to 0 mV, −1 to 0 mV, or −8 to 2 mV, or any range therein between. In other embodiments, the liposome is cationic. In some embodiments, the liposomal composition comprises a liposome that has a zeta potential that is more than zero. In some embodiments, the liposome has a zeta potential that is 0.2 to 150 mV, 1 to 50 mV, 1 to 40 mV, 1 to 30 mV, 1 to 25 mV, 1 to 20 mV, 1 to 15 mV, 1 to 10 mV, 1 to 5 mV, 2 to 10 mV, 3 to 10 mV, 4 to 10 mV, or 5 to 10 mV, or any range therein between.

In some embodiments, the disclosure provides a pharmaceutical composition comprising an ionizable carotenoid having the formula:

Q-R1-Polyene Carotenoid-R2-Q, encapsulated by a liposome, wherein, the Polyene Carotenoid comprises
(a) 3, 4, 5, 6, 7, 8, 9, 10, 3-5, 6-8, 9-10, or more than 9, conjugated double bonds,
(b) methyl or low alkyl (C2-C3) substitutions, and
(c) 1, 2, 3, or more than 3, ionizable groups;
$R_1$ and $R_2$ are ionizable groups; and
Q is a (a) multivalent counterion or (b) monovalent cation.
In some embodiments, the Polyene Carotenoid comprises all trans conjugated double bonds. In particular embodiments, the Polyene Carotenoid comprises 6-9 conjugated double bonds. The Polyene Carotenoid can be naturally occurring or synthetic. In some embodiments, the Polyene Carotenoid is naturally occurring. In other embodiments, the Polyene Carotenoid is synthetic. In some embodiments, $R_1$ and $R_2$ are the same ionizable group. In other embodiments, $R_1$ and $R_2$ are different ionizable groups. In some embodiments, $R_1$ and $R_2$ are the same cationic ionizable group. In other embodiments, $R_1$ and $R_2$ are different cationic groups. In some embodiments, $R_1$ and $R_2$ are the same anionic ionizable group. In other embodiments, $R_1$ and $R_2$ are different anionic groups. In some embodiments, $R_1$ is a cationic ionizable group or anionic ionizable group and $R_2$ is an anionic ionizable group or cationic group, respectively. In some embodiments, the Polyene Carotenoid comprises at least one anionic ionizable group. In some embodiments, the Polyene Carotenoid comprises at least one ionizable group selected from: a carboxylic group, a sulfonate group, a sulfate group, a phosphonate, or a phosphate group, and a hydroxamate moiety. In some embodiments, $R_1$ is at least one ionizable group selected from: a carboxylic group, a sulfonate group, a sulfate group, a phosphonate, or a phosphate group, and a hydroxamate moiety. In some embodiments, $R_2$ is at least one ionizable group selected from: a carboxylic group, a sulfonate group, a sulfate group, a phosphonate, or a phosphate group, and a hydroxamate moiety. In other embodiments, the Polyene Carotenoid-Q comprises one or more cationic ionizable groups (e.g., a primary, secondary, or tertiary amine group, a quaternary ammonium group, a choline group, a guanidine group, or an imidazole group). In particular embodiments, the Polyene Carotenoid comprises at least one cationic ionizable group and the pharmaceutical composition is substantially free of nucleic acids.

In some embodiments, Q is a multivalent counterion. In some embodiments, Q is a multivalent cation counterion. In further embodiments, Q is a multivalent metal cation. In some embodiments, Q is a multivalent transition metal counterion. In some embodiments, Q is a divalent counterion. In some embodiments, Q is a divalent cation counterion. In further embodiments, Q is a divalent metal cation. In some embodiments, Q is at least one member selected from $Ca^{2+}$, $Mg^{2+}$, $Zn^{2+}$, $Cu^{2+}$, $Co^{2+}$, and $Fe^{2+}$. In further embodiments, Q is $Ca^{2+}$ or $Mg^{2+}$. In further embodiments, Q is $Ca^{2+}$. In some embodiments, Q is $Mg^{2+}$. In other embodiments, Q is a trivalent cation counterion such as $Fe^{3+}$. In other embodiments, Q is a multivalent organic counterion. In some embodiments, Q is a divalent organic cation. In some embodiments, Q is a bivalent organic cation such as protonated diamine.

In some embodiments, Q is a monovalent cation counterion. In further embodiments, Q is at least one member selected from $Na^+$, or $Li^+$, or $K^+$. In some embodiments, Q is an organic counterion. In some embodiments, Q is a multivalent organic cation. In further embodiments, Q is a divalent organic cation such as a protonated diamine or a protonated polyamine. In other embodiments, Q is a monovalent organic cation such as $NH_4^+$, a protonated diamine or a protonated polyamine.

In some embodiments, the liposome contains less than 6 million, less than 500,000, less than 200,000, less than 100,000, less than 50,000, less than 10,000, or less than 5,000, molecules of ionizable carotenoid. In some embodiments, the liposome contains between 10 to 100,000 molecules of ionizable carotenoid, or any range therein between. In some embodiments, the ionizable carotenoid/lipid ratio of the liposomal composition is 1 g/mol and about 1000 g/mol, or any range therein between. In some embodiments, the ionizable carotenoid/lipid ratio is 10-150 g/mol, 10-100 g/mol, 30-200 g/mol, 40-200 g/mol, or 50-200 g/mol, or any range therein between. In some embodiments, the liposome comprises at least 0.1% to 97% ionizable carotenoid. In some embodiments, the liposome has a diameter of 20 nm to 500 nm, 20 nm to 200 nm, or 80 nm to 120 nm, or any range therein between. In some embodiments, the liposome is formed from liposomal components. In further embodiments, the liposomal components comprise at least one of an anionic lipid and a neutral lipid. In further embodiments, the liposomal components comprise at least one selected from: DSPE; DSPE-PEG; DSPE-PEG-maleimide; HSPC; HSPC-PEG; cholesterol; cholesterol-PEG; and cholesterol-maleimide. In further embodiments, the liposomal components comprise at least one selected from: DSPE; DSPE-PEG; DSPE-PEG-FITC; DSPE-PEG-maleimide; cholesterol; and HSPC. In additional embodiments, the liposome further comprises an oxidized phospholipid such as an OxPAPC. In some embodiments, the liposome comprises an OxPAPC that is an oxidized phospholipid containing fragmented oxygenated sn-2 residues, an oxidized phospholipid containing full length oxygenated sn-2 residues, and/or an oxidized phospholipid containing a five-carbon sn-2 residue bearing omega-aldehyde or omega-carboxyl groups. In some embodiments, the liposome comprises an OxPAPC selected from HOdiA-PC, KOdiA-PC, HOOA-PC and KOOA-PC, or the OxPAPC is an epoxyisoprostane-containing phospholipid. In some embodiments, the liposome comprises an OxPAPC selected from 1-palmitoyl-2-(5,6-epoxyisoprostane E2)-sn-glycero-3-phosphocholine (5,6 PEIPC), 1-palmitoyl-2-(epoxycyclopenten-one)-sn-glycero-3-phosphorylcholine (PECPC), 1-palmitoyl-2-(epoxyisoprostane E2)-sn-glycero-4-phosphocholine (PEIPC), 1-palmitoyl-2-glutaroyl-sn-glycero-3-phosphocholine (PGPC); 1-palmitoyl-2-(9'oxo-nonanoyl)-sn-glyc-ero-3-phosphocholine; 1-palmitoyl-2-arachinodoyl-sn-glycero-3-phosphocholine; 1-palmitoyl-2-myristoyl-sn-glycero-3-phosphocholine; 1-palmitoyl-2-hexadecy 1-sn-glycero-3-phosphocholine; 1-palmitoyl-2-azelaoyl-sn-glycero-3-phosphocholine; and 1-palmitoyl-2-acetoyl-sn-glycero-3-phosphocholine. In some embodiments, the liposome comprises PGPC. In some embodiments, the OxPAPC within the liposome lipid bilayer is 0%-100% of total lipids, or any range therein between. In some embodiments, the liposome comprises a targeting moiety having a specific affinity for a surface antigen on a target cell of interest. In some embodiments, the targeting moiety is attached to one or both of a PEG and the exterior of the liposome, optionally wherein the targeting moiety is attached to one or both of the PEG and the exterior of the liposome by a covalent bond. In some embodiments, the targeting moiety is a polypeptide. In further embodiments, the targeting moiety is an antibody or an antigen binding fragment of an antibody. In some embodiments, the liposome contains 1 to 1000, 50 to 750, 100 to 500, or 30 to 200 targeting moieties, or any range therein between. In further embodiments, the liposome further comprises an immunostimulating agent (such as 1,6-beta glucan). In some embodiments, the liposome comprises a steric stabilizer. In some embodiments, the steric stabilizer is polyethylene glycol (i.e., the liposome is pegylated). In some embodiments, the PEG has a number average molecular weight (Mn) of 200 to 5000 Daltons. In some embodiments, the zeta potential of the liposome is in a range of −150 to 150 mV, or −50 to 50 mV, or any range therein between. In some embodiments, the liposome is cationic. In some embodiments, the liposomal composition comprises a liposome that has a zeta potential that is more than zero. In some embodiments, the liposome has a zeta potential that is 0.2 to 150 mV, 1 to 50 mV, 1 to 40 mV, 1 to 30 mV, 1 to 25 mV, 1 to 20 mV, 1 to 15 mV, 1 to 10 mV, 1 to 5 mV, 2 to 10 mV, 3 to 10 mV, 4 to 10 mV, or 5 to 10 mV, or any range therein between. In some embodiments, the liposome is anionic or neutral. In some embodiments, the liposomal composition comprises a liposome that has a zeta potential that is less than or equal to zero. In some embodiments, the liposome has a zeta potential that is −150 to 0, −50 to 0 mV, −40 to 0 mV, −30 to 0 mV, −25 to 0 mV, −20 to 0 mV, −10 to 0 mV, −9 to 0 mV, −8 to 0 mV, −7 to 0 mV, −6 to 0 mV, −5 to 0 mV, −4 to 0 mV, −3 to 0 mV, −2 to 0 mV, −1 to 0 mV, or −8 to 2 mV, or any range therein between.

In some embodiments, the disclosure provides a pharmaceutical composition comprising an ionizable bis-alpha, omega-carotenoid having the formula:

Q-$R_1$-Polyene Carotenoid-$R_1$-Q, encapsulated by a liposome, wherein, the Polyene Carotenoid comprises (a) 3, 4, 5, 6, 7, 8, 9, 10, 3-5, 6-8, 9-10, or more than 9, conjugated double bonds,
(b) methyl or low alkyl (C2-C3) substitutions, and
(c) 1, 2, 3, or more than 3, ionizable groups; and
$R_1$ is an ionizable group; and
Q is a (a) multivalent counterion or (b) monovalent cation. In some embodiments, $R_1$-Polyene Carotenoid-$R_1$ comprises all trans conjugated double bonds. In some embodiments, the $R_1$-Polyene Carotenoid-$R_1$ comprises 6-9 conjugated double bonds. In particular embodiments, the $R_1$-Polyene Carotenoid-$R_1$ comprises 7 conjugated double bonds. The $R_1$-Polyene Carotenoid-R1 can be naturally occurring or synthetic. In some embodiments, the $R_1$-Polyene Carotenoid-$R_1$ is naturally occurring. In other embodiments, the b $R_1$-Polyene Carotenoid-$R_1$ is synthetic. In some embodiments, $R_1$ is an anionic ionizable group. In some embodiments, the $R_1$-Polyene Carotenoid-$R_1$ comprises an ionizable group selected from: a carboxylic group, a sulfonate group, a sulfate group, a phosphonate, a phosphate group, and a hydroxamate moiety. In other embodiments, $R_1$ is a cationic ionizable group (e.g., a primary, secondary, or tertiary amine group, a quaternary ammonium group, a choline group, a guanidine group, or an imidazole group). In particular embodiments, $R_1$ is a cationic ionizable group and the pharmaceutical composition is substantially free of nucleic acids.

In some embodiments, Q is a multivalent counterion. In some embodiments, Q is a multivalent cation counterion. In further embodiments, Q is a multivalent metal cation. In some embodiments, Q is a multivalent transition metal counterion. In some embodiments, Q is a divalent counterion. In some embodiments, Q is a divalent cation counterion. In further embodiments, Q is a divalent metal cation. In some embodiments, Q is at least one member selected from $Ca^{2+}$, $Mg^{2+}$, $Zn^{2+}$, $Cu^{2+}$, $Co^{2+}$, and $Fe^{2+}$. In further embodiments, Q is $Ca^{2+}$ or $Mg^{2+}$. In further embodiments, Q is $Ca^{2+}$. In some embodiments, Q is $Mg^{2+}$. In other embodiments, Q is a trivalent cation counterion such as $Fe^{3+}$. In other embodiments, Q is a multivalent organic counterion. In some embodiments, Q is a divalent organic cation. In some embodiments, Q is a bivalent organic cation such as protonated diamine.

In some embodiments, Q is a monovalent cation counterion. In further embodiments, Q is at least one member selected from $Na^+$, or $Li^+$, or $K^+$. In some embodiments, Q is an organic counterion. In some embodiments, Q is a multivalent organic cation. In further embodiments, Q is a divalent organic cation such as a protonated diamine or a protonated polyamine. In other embodiments, Q is a monovalent organic cation such as $NH_4^+$, a protonated diamine or a protonated polyamine.

In some embodiments, the liposome contains less than 6 million, less than 500,000, less than 200,000, less than 100,000, less than 50,000, or less than 10,000, molecules of ionizable carotenoid. In some embodiments, the liposome contains 10 to 100,000, 100 to 10,000, or 1,000 to 5,000, molecules of ionizable carotenoid, or any range therein between. In some embodiments, the ionizable carotenoid/lipid ratio of the liposomal composition is 1 g/mol and about 1000 g/mol, or any range therein between. In some embodiments, the ionizable carotenoid/lipid ratio is 10-150 g/mol, 10-100 g/mol, 30-200 g/mol, 40-200 g/mol, or 50-200 g/mol, or any range therein between. In some embodiments, the liposome comprises at least 0.1% to 97% ionizable carotenoid. In some embodiments, the liposomes have a mean diameter of for example, 20 nm to 500 nm (nanometer), or 20 nm to 200 nm, or any range therein between. In some embodiments, the liposomes have a mean diameter of 80 nm to 120 nm, or any range therein between. In some embodiments, the liposome is formed from liposomal components. In further embodiments, the liposomal components comprise at least one of an anionic lipid and a neutral lipid. In further embodiments, the liposomal components comprise at least one selected from: DSPE; DSPE-PEG; DSPE-PEG-maleimide; HSPC; HSPC-PEG; cholesterol; cholesterol-PEG; and cholesterol-maleimide. In further embodiments, the liposomal components comprise at least one selected from: DSPE; DSPE-PEG; DSPE-PEG-FITC; DSPE-PEG-maleimide; cholesterol; and HSPC. In additional embodiments, the liposome further comprises an oxidized phospholipid such as an OxPAPC. In some embodiments, the liposome comprises an OxPAPC that is an oxidized phospholipid containing fragmented oxygenated sn-2 residues, an oxidized phospholipid containing full length oxygenated sn-2 residues, and/or an oxidized phospholipid containing a five-carbon sn-2 residue bearing omega-aldehyde or omega-carboxyl groups. In some embodiments, the liposome comprises an OxPAPC selected from HOdiA-PC, KOdiA-PC, HOOA-PC and KOOA-PC, or the OxPAPC is an epoxyisoprostane-containing phospholipid. In some embodiments, the liposome comprises an OxPAPC selected from 1-palmitoyl-2-(5,6-epoxyisoprostane E2)-sn-glycero-3-phosphocholine (5,6 PEIPC), 1-palmitoyl-2-(epoxy-cyclo-pent-enone)-sn-glycero-3-phosphoryl-choline (PECPC), 1-palmitoyl-2-(epoxy-iso-prostane E2)-sn-glycero-4-phosphocholine (PEIPC), 1-palmitoyl-2-glutaroyl-sn-glycero-3-phospho-choline (PGPC); 1-palmitoyl-2-(9'oxo-nonanoyl)-sn-glycero-3-phospho-choline; 1-palmitoyl-2-arachinodoyl-sn-glycero-3-phospho-choline; 1-palmitoyl-2-myristoyl-sn-glycero-3-phosphocholine; 1-palmitoyl-2-hexa-dec-yl-sn-glycero-3-phosphocholine; 1-palmitoyl-2-azelaoyl-sn-glycero-3-phosphocholine; and 1-palmitoyl-2-acetoyl-sn-glycero-3-phospho-choline. In some embodiments, the liposome comprises PGPC. In some embodiments, the OxPAPC within the liposome lipid bilayer is 0%-100% of total lipids, or any range therein between. In some embodiments, the liposome comprises a targeting moiety having a specific affinity for a surface antigen on a target cell of interest. In some embodiments, the targeting moiety is attached to one or both of a PEG and the exterior of the liposome, optionally wherein the targeting moiety is attached to one or both of the PEG and the exterior of the liposome by a covalent bond. In some embodiments, the targeting moiety is a polypeptide. In further embodiments, the targeting moiety is an antibody or an antigen binding fragment of an antibody. In some embodiments, the liposome contains 1 to 1000, 50 to 750, 100 to 500, or 30 to 200 targeting moieties, or any range therein between. In some embodiments, the liposome further comprises an immunostimulating agent (such as 1,6-beta glucan). In some embodiments, the liposome comprises a steric stabilizer. In some embodiments, the steric stabilizer is polyethylene glycol (i.e., the liposome is pegylated). In some embodiments, the PEG has a number average molecular weight (Mn) of 200 to 5000 Daltons. In additional embodiments, the liposome is anionic or neutral. In some embodiments, the liposome has a zeta potential that is less than or equal to zero. In some embodiments, the liposome has a zeta potential that is −150 to 0, −50 to 0 mV, −40 to 0 mV, −30 to 0 mV, −25 to 0 mV, −20 to 0 mV, −10 to 0 mV, −9 to 0 mV, −8 to 0 mV, −7 to 0 mV, −6 to 0 mV, −5 to 0 mV, −4 to 0 mV, −3 to 0 mV, −2 to 0 mV, −1 to 0 mV, or −8 to 2 mV, or any range therein between. In other embodiments, the liposome is cationic. In some embodiments, the liposomal composition comprises a liposome that has a zeta potential that is more than zero. In some embodiments, the liposome has a zeta potential that is 0.2 to 150 mV, 1 to 50 mV, 1 to 40 mV, 1 to 30 mV, 1 to 25 mV, 1 to 20 mV, 1 to 15 mV, 1 to 10 mV, 1 to 5 mV, 2 to 10 mV, 3 to 10 mV, 4 to 10 mV, or 5 to 10 mV, or any range therein between.

In some embodiments, the disclosure provides a pharmaceutical composition comprising an bis-alpha, omega-carotenoid having the formula:

$R_1$-Polyene Carotenoid-$R_1$, encapsulated by a liposome, wherein, the bis-alpha, omega-carotenoid comprises:
(a) 3, 4, 5, 6, 7, 8, 9, 10, 3-5, 6-8, 9-10, or more than 9, conjugated double bonds, and
(b) 1, 2, 3, or more than 3, ionizable groups; and
the Polyene Carotenoid is optionally substituted with 1 to n methyl or low C1-C3 alkyl substitutions, wherein n=1 to 4; and
$R_1$ is a polar group and/or a monocyclic functional group. In some embodiments, the bis-alpha, omega-carotenoid comprises all trans conjugated double bonds. In some embodiments, the bis-alpha, omega-carotenoid comprises 6-9 conjugated double bonds. In particular embodiments, the bis-alpha, omega-carotenoid comprises 7 conjugated double bonds. The bis-alpha, omega-carotenoid can be naturally occurring or synthetic. In some embodiments, the bis-alpha, omega-carotenoid is naturally occurring. In other embodiments, the bis-alpha, omega-carotenoid is synthetic. In some embodiments, $R_1$ is a polar group. In some embodiments, $R_1$ is a monocyclic functional group. In some embodiments, $R_1$ is a polar group and a monocyclic functional group. In some embodiments, the bis-alpha, omega-carotenoid comprises a monocyclic and/or polar functional group selected from a functional group present in astaxanthin, lutein, xanthophyll and zeaxanthin. In some embodiments, the bis-alpha, omega-carotenoid is selected from astaxanthin, lutein, xanthophyll and zeaxanthin (e.g., as depicted below).

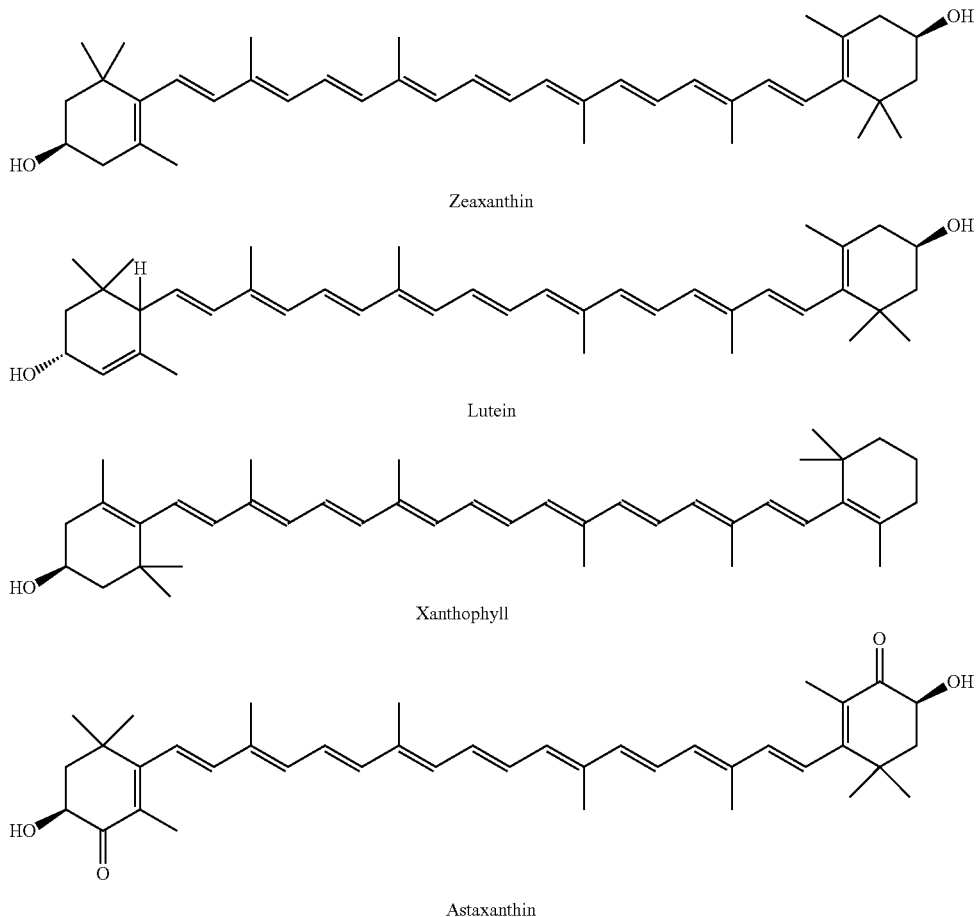

Zeaxanthin

Lutein

Xanthophyll

Astaxanthin

In some embodiments, the liposome contains less than 6 million, less than 500,000, less than 200,000, less than 100,000, less than 50,000, or less than 10,000, molecules of bis-alpha, omega-carotenoid. In some embodiments, the liposome contains 10 to 100,000, 100 to 10,000, or 1,000 to 5,000, molecules of bis-alpha, omega-carotenoid, or any range therein between. In some embodiments, the bis-alpha, omega-carotenoid/lipid ratio of the liposomal composition is 1 g/mol and about 1000 g/mol, or any range therein between. In some embodiments, the bis-alpha, omega-carotenoid/lipid ratio is 10-150 g/mol, 10-100 g/mol, 30-200 g/mol, 40-200 g/mol, or 50-200 g/mol, or any range therein between. In some embodiments, the liposome comprises at least 0.1% to 97% bis-alpha, omega-carotenoid. In some embodiments, the liposome has a diameter of 20 nm to 500 nm, or 20 nm to 200 nm, or any range therein between. In some embodiments, the liposome has a diameter of 80 nm to 120 nm, or any range therein between. In some embodiments, the liposome is formed from liposomal components. In further embodiments, the liposomal components comprise at least one of an anionic lipid and a neutral lipid. In further embodiments, the liposomal components comprise at least one selected from: DSPE; DSPE-PEG; DSPE-PEG-maleimide; HSPC; HSPC-PEG; cholesterol; cholesterol-PEG; and cholesterol-maleimide. In further embodiments, the liposomal components comprise at least one selected from: DSPE; DSPE-PEG; DSPE-PEG-FITC; DSPE-PEG-maleimide; cholesterol; and HSPC. In additional embodiments, the liposome further comprises an oxidized phospholipid such as an OxPAPC. In some embodiments, the liposome comprises an OxPAPC that is an oxidized phospholipid containing fragmented oxygenated sn-2 residues, an oxidized phospholipid containing full length oxygenated sn-2 residues, and/or an oxidized phospholipid containing a five-carbon sn-2 residue bearing omega-aldehyde or omega-carboxyl groups. In some embodiments, the liposome comprises an OxPAPC selected from HOdiA-PC, KOdiA-PC, HOOA-PC and KOOA-PC, or the OxPAPC is an epoxyisoprostane-containing phospholipid. In some embodiments, the liposome comprises an OxPAPC selected from 1-palmitoyl-2-(5,6-epoxyisoprostane E2)-sn-glycero-3-phosphocholine (5,6 PEIPC), 1-palmitoyl-2-(epoxycyclopentenone)-sn-glycero-3-phosphorylcholine (PECPC), 1-palmitoyl-2-(epoxy-isoprostane E2)-sn-glycero-4-phosphocholine (PEIPC), 1-palmitoyl-2-glutaroyl-sn-glycero-3-phosphocholine (PGPC); 1-palmitoyl-2-(9'oxo-nonanoyl)-sn-glycero-3-phos-phocholine; 1-palmitoyl-2-ar-achinodoyl-sn-glycero-3-phosphocholine; 1-palmitoyl-2-myristoyl-sn-glyc-ero-3-phosphocholine; 1-palmitoyl-2-hexadecyl-sn-glycero-3-phosphocholine; 1-palmitoyl-2-azelaoyl-sn-glycero-3-phosphocholine; and 1-palmitoyl-2-acetoyl-sn-glycero-3-phosphocholine. In some embodiments, the liposome comprises PGPC. In some embodiments, the OxPAPC within the liposome lipid bilayer is 0%-100% of total lipids, or any range therein between. In some embodiments, the liposome comprises a targeting moiety having a specific affinity for a surface antigen on a target cell of interest. In some embodiments, the targeting moiety is attached to one or both of a PEG and the exterior of the liposome, optionally wherein the targeting moiety is attached to one or both of the PEG and the exterior of the liposome by a covalent bond. In some embodiments, the targeting moiety is a polypeptide. In further embodiments, the targeting moiety is an antibody or an antigen binding fragment of an antibody. In some embodiments, the liposome contains 1 to 1000, 50 to 750, 100 to 500, or 30 to 200 targeting moieties, or any range therein between. In some embodiments, the liposome further comprises an immunostimulating agent (such as 1,6-beta glucan). In some embodiments, the liposome comprises a steric stabilizer. In some embodiments, the steric stabilizer is polyethylene glycol (i.e., the liposome is pegylated). In some embodiments, the PEG has a number average molecular weight (Mn) of 200 to 5000 Daltons. In additional embodiments, the liposome is anionic or neutral. In some embodiments, the liposome has a zeta potential that is less than or equal to zero. In some embodiments, the liposome has a zeta potential that is −150 to 0, −50 to 0 mV, −40 to 0 mV, −30 to 0 mV, −25 to 0 mV, −20 to 0 mV, −10 to 0 mV, −9 to 0 mV, −8 to 0 mV, −7 to 0 mV, −6 to 0 mV, −5 to 0 mV, −4 to 0 mV, −3 to 0 mV, −2 to 0 mV, −1 to 0 mV, or −8 to 2 mV, or any range therein between. In other embodiments, the liposome is cationic. In some embodiments, the liposomal composition comprises a liposome that has a zeta potential that is more than zero. In some embodiments, the liposome has a zeta potential that is 0.2 to 150 mV, 1 to 50 mV, 1 to 40 mV, 1 to 30 mV, 1 to 25 mV, 1 to 20 mV, 1 to 15 mV, 1 to 10 mV, 1 to 5 mV, 2 to 10 mV, 3 to 10 mV, 4 to 10 mV, or 5 to 10 mV, or any range therein between.

In some embodiments, the pharmaceutical composition comprises a trans-crocetin salt having the formula: Q-trans-crocetin-Q

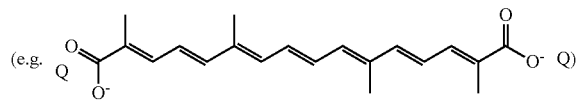

encapsulated by a liposome, wherein,

Q is a (a) multivalent counterion or (b) monovalent cation. In some embodiments, Q is a multivalent cation counterion. In some embodiments, Q is a multivalent metal cation. In further embodiments, Q is a multivalent transition metal cation. In some embodiments, Q is a divalent cation counterion. In further embodiments, Q is a divalent metal cation. In some embodiments, Q is at least one member selected from $Ca^{2+}$, $Mg^{2+}$, $Zn^{2+}$, $Cu^{2+}$, $Co^{2+}$, and $Fe^{2+}$. In further embodiments, Q is $Ca^{2+}$ or $Mg^{2+}$. In some embodiments, Q is $Ca^{2+}$. In some embodiments, Q is $Mg^{2+}$. In some embodiments, Q is a divalent organic counterion. In other embodiments, Q is a trivalent cation counterion such as $Fe^{3+}$. In other embodiments, Q is a multivalent organic counterion. In some embodiments, Q is a divalent organic cation. In some embodiments, Q is a bivalent organic cation such as protonated diamine.

In further embodiments, Q is a monovalent cation counterion. In some embodiments, Q is a monovalent metal cation. In some embodiments, Q is at least one member selected from $Na^+$, $Li^+$, or $K^+$. In some embodiments, Q is an organic cation. In some embodiments, Q is a monovalent organic cation such as a protonated amine (e.g., a protonated diamine or a protonated polyamine). In some embodiments, Q is an organic cation such as $NH_4^+$, a protonated diamine or a protonated polyamine.

In some embodiments, the liposome contains less than 6 million, less than 500,000, less than 200,000, less than 100,000, less than 50,000, or less than 10,000, molecules of trans-crocetin. In some embodiments, the liposome contains 10 to 100,000, 100 to 10,000, or 1,000 to 5,000, molecules of trans-crocetin, or any range therein between. In some embodiments, the trans-crocetin/lipid ratio of the liposomal composition is 1 g/mol and about 1000 g/mol, or any range therein between. In some embodiments, the trans-crocetin/lipid ratio is 10-150 g/mol, 10-100 g/mol, 30-200 g/mol, 40-200 g/mol, or 50-200 g/mol, or any range therein between. In some embodiments, the liposome comprises at least 0.1% to 97% trans-crocetin. In some embodiments, the liposome has a diameter of 20 nm to 500 nm, or 20 nm to 200 nm, or any range therein between. In some embodiments, the liposome has a diameter of 80 nm to 120 nm, or any range therein between. In some embodiments, the liposome is formed from liposomal components. In further embodiments, the liposomal components comprise at least one of an anionic lipid and a neutral lipid. In further embodiments, the liposomal components comprise at least one selected from: DSPE; DSPE-PEG; DSPE-PEG-maleimide; HSPC; HSPC-PEG; cholesterol; cholesterol-PEG; and cholesterol-maleimide. In further embodiments, the liposomal components comprise at least one selected from: DSPE; DSPE-PEG; DSPE-PEG-FITC; DSPE-PEG-maleimide; cholesterol; and HSPC. In additional embodiments, the liposome further comprises an oxidized phospholipid such as an OxPAPC. In some embodiments, the liposome comprises an OxPAPC that is an oxidized phospholipid containing fragmented oxygenated sn-2 residues, an oxidized phospholipid containing full length oxygenated sn-2 residues, and/or an oxidized phospholipid containing a five-carbon sn-2 residue bearing omega-aldehyde or omega-carboxyl groups. In some embodiments, the liposome comprises an OxPAPC selected from HOdiA-PC, KOdiA-PC, HOOA-PC and KOOA-PC, or the OxPAPC is an epoxyisoprostane-containing phospholipid. In some embodiments, the liposome comprises an OxPAPC selected from 1-palmitoyl-2-(5,6-epoxyisoprostane E2)-sn-glycero-3-phosphocholine (5,6 PEIPC), 1-palmitoyl-2-(epoxy-cyclopentenone)-sn-glycero-3-phosphorylcholine (PECPC), 1-palmitoyl-2-(epoxyisoprostane E2)-sn-glycero-4-phosphocholine (PEIPC), 1-palmitoyl-2-glutaroyl-sn-glycero-3-phosphocholine (PGPC); 1-palmitoyl-2-(9'oxo-nonanoyl)-sn-glycer-o-3-phosphocholine; 1-palmitoyl-2-arachinodoyl-sn-glycero-3-phosphocholine; 1-palmitoyl-2-myristoyl-sn-glycero-3-phosphocholine; 1-palmitoyl-2-hexadecyl-sn-glycero-3-phosphocholine; 1-palmitoyl-2-azelaoyl-sn-glycero-3-phosphocholine; and 1-palmitoyl-2-acetoyl-sn-glycero-3-phosphocholine. In some embodiments, the liposome comprises PGPC. In some embodiments, the OxPAPC within the liposome lipid bilayer is 0%-100% of total lipids, or any range therein between. In some embodiments, the liposome comprises a targeting moiety having a specific affinity for a surface antigen on a target cell of interest. In some embodiments, the targeting moiety is attached to one or both of a PEG and the exterior of the liposome, optionally wherein the targeting moiety is attached to one or both of the PEG and the exterior of the liposome by a covalent bond. In some embodiments, the targeting moiety is a polypeptide. In further embodiments, the targeting moiety is an antibody or an antigen binding fragment of an antibody. In some embodiments, the liposome contains 1 to 1000, 50 to 750, 100 to 500, or 30 to 200 targeting moieties, or any range therein between. In some embodiments, the liposome further comprises an immunostimulating agent (such as 1,6-beta glucan). In some embodiments, the liposome comprises a steric stabilizer. In some embodiments, the steric stabilizer is polyethylene glycol (i.e., the liposome is pegylated). In some embodiments, the PEG has a number average molecular weight (Mn) of 200 to 5000 Daltons. In additional embodiments, the liposome is anionic or neutral. In some embodiments, the liposome has a zeta potential that is less than or equal to zero. In some embodiments, the liposome has a zeta potential that is −150 to 0, −50 to 0 mV, −40 to 0 mV, −30 to 0 mV, −25 to 0 mV, −20 to 0 mV, −10 to 0 mV, −9 to 0 mV, −8 to 0 mV, −7 to 0 mV, −6 to 0 mV, −5 to 0 mV, −4 to 0 mV, −3 to 0 mV, −2 to 0 mV, −1 to 0 mV, or −8 to 2 mV, or any range therein between. In other embodiments, the liposome is cationic. In some embodiments, the liposomal composition comprises a liposome that has a zeta potential that is more than zero. In some embodiments, the liposome has a zeta potential that is 0.2 to 150 mV, 1 to 50 mV, 1 to 40 mV, 1 to 30 mV, 1 to 25 mV, 1 to 20 mV, 1 to 15 mV, 1 to 10 mV, 1 to 5 mV, 2 to 10 mV, 3 to 10 mV, 4 to 10 mV, or 5 to 10 mV, or any range therein between.

In some embodiments, the disclosure provides a pharmaceutical composition comprising calcium trans-crocetinate (CTC) encapsulated by a liposome. The CTC can exist in linear and/or cyclic form (shown below).

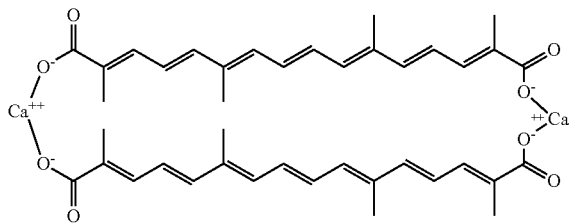

In some embodiments, the liposome contains less than 6 million, less than 500,000, less than 200,000, less than 100,000, less than 50,000, or less than 10,000, molecules of trans-crocetin. In some embodiments, the liposome contains 10 to 100,000, 100 to 10,000, or 1,000 to 5,000, molecules of trans-crocetin, or any range therein between. In some embodiments, the trans-crocetin/lipid ratio of the liposomal composition is 1 g/mol and about 1000 g/mol, or any range therein between. In some embodiments, the trans-crocetin/lipid ratio is 10-150 g/mol, 10-100 g/mol, 30-200 g/mol, 40-200 g/mol, or 50-200 g/mol, or any range therein between. In some embodiments, the liposome comprises at least 0.1% to 97% trans-crocetin. In some embodiments, the liposome has a diameter of 20 nm to 500 nm, or 20 nm to 200 nm, or any range therein between. In some embodiments, the liposome has a diameter of 80 nm to 120 nm, or any range therein between. In some embodiments, the liposome is formed from liposomal components. In further embodiments, the liposomal components comprise at least one of an anionic lipid and a neutral lipid. In further embodiments, the liposomal components comprise at least one selected from: DSPE; DSPE-PEG; DSPE-PEG-maleimide; HSPC; HSPC-PEG; cholesterol; cholesterol-PEG; and cholesterol-maleimide. In further embodiments, the liposomal components comprise at least one selected from: DSPE; DSPE-PEG; DSPE-PEG-FITC; DSPE-PEG-maleimide; cholesterol; and HSPC. In additional embodiments, the liposome further comprises an oxidized phospholipid such as an OxPAPC. In some embodiments, the liposome comprises an OxPAPC that is an oxidized phospholipid containing fragmented oxygenated sn-2 residues, an oxidized phospholipid containing full length oxygenated sn-2 residues, and/or an oxidized phospholipid containing a five-carbon sn-2 residue bearing omega-aldehyde or omega-carboxyl groups. In some embodiments, the liposome comprises an OxPAPC selected from HOdiA-PC, KOdiA-PC, HOOA-PC and KOOA-PC, or the OxPAPC is an epoxyisoprostane-containing phospholipid. In some embodiments, the liposome comprises an OxPAPC selected from 1-palmitoyl-2-(5,6-epoxyisoprostane E2)-sn-glycero-3-phosphocholine (5,6 PEIPC), 1-palmitoyl-2-(epoxy-cyclopentenone)-sn-glycero-3-phosphorylcholine (PECPC), 1-palmitoyl-2-(epoxy-isoprostane E2)-sn-glycero-4-phosphocholine (PEIPC), 1-palmitoyl-2-glutaroyl-sn-glycero-3-phosphocholine (PGPC); 1-palmitoyl-2-(9'oxo-nonanoyl)-sn-glyc-ero-3-phosphocholine; 1-palmitoyl-2-arachinodoyl-sn-glycero-3-phosphocholine; 1-palmitoyl-2-myristoyl-sn-glycer-o-3-phosphocholine; 1-palmitoyl-2-hexadecyl-sn-glycero-3-phosphocholine; 1-palmitoyl-2-azelaoyl-sn-glycero-3-phosphocholine; and 1-palmitoyl-2-acetoyl-sn-glycero-3-phos-phocholine. In some embodiments, the liposome comprises PGPC. In some embodiments, the OxPAPC within the liposome lipid bilayer is 0%-100% of total lipids, or any range therein between. In some embodiments, the liposome comprises a targeting moiety having a specific affinity for a surface antigen on a target cell of interest. In some embodiments, the targeting moiety is attached to one or both of a PEG and the exterior of the liposome, optionally wherein the targeting moiety is attached to one or both of the PEG and the exterior of the liposome by a covalent bond. In some embodiments, the targeting moiety is a polypeptide. In further embodiments, the targeting moiety is an antibody or an antigen binding fragment of an antibody. In some embodiments, the liposome contains 1 to 1000, 50 to 750, 100 to 500, or 30 to 200 targeting moieties, or any range therein between. In some embodiments, the liposome contains less than 500,000 or less than 200,000 molecules of trans-crocetin. In some embodiments, the liposome contains between 10 to 100,000 molecules of trans-crocetin, or any range therein between. In some embodiments, the liposome further comprises an immunostimulating agent (such as 1,6-beta glucan). In some embodiments, the liposome comprises a steric stabilizer. In some embodiments, the steric stabilizer is polyethylene glycol (i.e., the liposome is pegylated). In some embodiments, the PEG has a number average molecular weight (Mn) of 200 to 5000 Daltons. In additional embodiments, the liposome is anionic or neutral. In some embodiments, the liposome has a zeta potential that is less than or equal to zero. In some embodiments, the liposome has a zeta potential that is −150 to 0, −50 to 0 mV, −40 to 0 mV, −30 to 0 mV, −25 to 0 mV, −20 to 0 mV, −10 to 0 mV, −9 to 0 mV, −8 to 0 mV, −7 to 0 mV, −6 to 0 mV, −5 to 0 mV, −4 to 0 mV, −3 to 0 mV, −2 to 0 mV, −1 to 0 mV, or −8 to 2 mV, or any range therein between. In other embodiments, the liposome is cationic. In some embodiments, the liposomal composition comprises a liposome that has a zeta potential that is more than zero. In some embodiments, the liposome has a zeta potential that is 0.2 to 150 mV, 1 to 50 mV, 1 to 40 mV, 1 to 30 mV, 1 to 25 mV, 1 to 20 mV, 1 to 15 mV, 1 to 10 mV, 1 to 5 mV, 2 to 10 mV, 3 to 10 mV, 4 to 10 mV, or 5 to 10 mV, or any range therein between.

In some embodiments, the disclosure provides a pharmaceutical composition comprising magnesium trans-crocetinate (MTC) encapsulated by a liposome. The MTC can exist in linear and/or cyclic form (shown below).

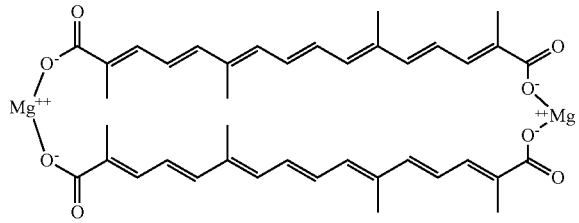

In some embodiments, the liposome contains less than 6 million, less than 500,000, less than 200,000, less than 100,000, less than 50,000, or less than 10,000, molecules of trans-crocetin. In some embodiments, the liposome contains 10 to 100,000, 100 to 10,000, or 500 to 5,000, molecules of trans-crocetin, or any range therein between. In some embodiments, the trans-crocetin/lipid ratio is 10-150 g/mol, 10-100 g/mol, 30-200 g/mol, 40-200 g/mol, or 50-200 g/mol, or any range therein between. In some embodiments, the liposome comprises at least 0.1% to 97% trans-crocetin. In some embodiments, the liposome has a diameter of 20 nm to 500 nm, or 20 nm to 200 nm, or any range therein between. In some embodiments, the liposome has a diameter of 80 nm to 120 nm, or any range therein between. In some embodiments, the liposome is formed from liposomal components. In further embodiments, the liposomal components comprise at least one of an anionic lipid and a neutral lipid. In further embodiments, the liposomal components comprise at least one selected from: DSPE; DSPE-PEG; DSPE-PEG-maleimide; HSPC; HSPC-PEG; cholesterol; cholesterol-PEG; and cholesterol-maleimide. In further embodiments, the liposomal components comprise at least one selected from: DSPE; DSPE-PEG; DSPE-PEG-FITC; DSPE-PEG-maleimide; cholesterol; and HSPC. In additional embodiments, the liposome further comprises an oxidized phospholipid such as an OxPAPC. In some embodiments, the liposome comprises an OxPAPC that is an oxidized phospholipid containing fragmented oxygenated sn-2 residues, an oxidized phospholipid containing full length oxygenated sn-2 residues, and/or an oxidized phospholipid containing a five-carbon sn-2 residue bearing omega-aldehyde or omega-carboxyl groups. In some embodiments, the liposome comprises an OxPAPC selected from HOdiA-PC, KOdiA-PC, HOOA-PC and KOOA-PC, or the OxPAPC is an epoxyisoprostane-containing phospholipid. In some embodiments, the liposome comprises an OxPAPC selected from 1-palmitoyl-2-(5,6-epoxyisoprostane E2)-sn-glycero-3-phosphocholine (5,6 PEIPC), 1-palmitoyl-2-(epoxycyclopenten-one)-sn-glycero-3-phosphorylcholine (PECPC), 1-palmitoyl-2-(epoxy-isoprostane E2)-sn-glycero-4-phosphocholine (PEIPC), 1-palmitoyl-2-glutar-oyl-sn-glycero-3-phosphocholine (PGPC); 1-palmitoyl-2-(9'oxo-nonanoyl)-sn-glycer-o-3-phosphocholine; 1-palmitoyl-2-arachinodoyl-sn-glycero-3-phosphocholine;
1-palmitoyl-2-myristoyl-sn-glycero-3-phospho-choline; 1-palmitoyl-2-hex-adecyl-sn-glycero-3-phosphocholine; 1-palmitoyl-2-azelaoyl-sn-glycero-3-phosphocholine; and 1-palmitoyl-2-acetoyl-sn-glycero-3-phosphocholine. In some embodiments, the liposome comprises PGPC. In some embodiments, the OxPAPC within the liposome lipid bilayer is 0%-100% of total lipids, or any range therein between. In some embodiments, the liposome comprises a targeting moiety having a specific affinity for a surface antigen on a target cell of interest. In some embodiments, the targeting moiety is attached to one or both of a PEG and the exterior of the liposome, optionally wherein the targeting moiety is attached to one or both of the PEG and the exterior of the liposome by a covalent bond. In some embodiments, the targeting moiety is a polypeptide. In further embodiments, the targeting moiety is an antibody or an antigen binding fragment of an antibody. In some embodiments, the liposome contains 1 to 1000, 50 to 750, 100 to 500, or 30 to 200 targeting moieties, or any range therein between. In some embodiments, the liposome further comprises an immunostimulating agent (such as 1,6-beta glucan). In some embodiments, the liposome comprises a steric stabilizer. In some embodiments, the steric stabilizer is polyethylene glycol (i.e., the liposome is pegylated). In some embodiments, the PEG has a number average molecular weight (Mn) of 200 to 5000 Daltons. In additional embodiments, the liposome is anionic or neutral. In some embodiments, the liposome has a zeta potential that is less than or equal to zero. In some embodiments, the liposome has a zeta potential that is −150 to 0, −50 to 0 mV, −40 to 0 mV, −30 to 0 mV, −25 to 0 mV, −20 to 0 mV, −10 to 0 mV, −9 to 0 mV, −8 to 0 mV, −7 to 0 mV, −6 to 0 mV, −5 to 0 mV, −4 to 0 mV, −3 to 0 mV, −2 to 0 mV, −1 to 0 mV, or −8 to 2 mV, or any range therein between. In other embodiments, the liposome is cationic. In some embodiments, the liposomal composition comprises a liposome that has a zeta potential that is more than zero. In some embodiments, the liposome has a zeta potential that is 0.2 to 150 mV, 1 to 50 mV, 1 to 40 mV, 1 to 30 mV, 1 to 25 mV, 1 to 20 mV, 1 to 15 mV, 1 to 10 mV, 1 to 5 mV, 2 to 10 mV, 3 to 10 mV, 4 to 10 mV, or 5 to 10 mV, or any range therein between.

In some embodiments, the disclosure provides a pharmaceutical composition comprising trans-norbixin having the formula: Q-norbixin-Q

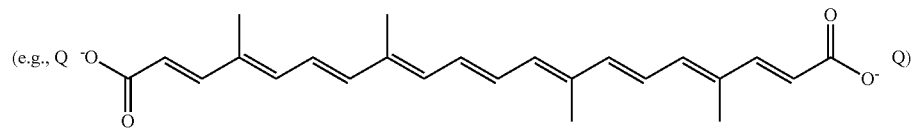

encapsulated by a liposome, wherein,
Q is a multivalent cation counterion.
In some embodiments, Q is a multivalent cation counterion. In some embodiments, Q is a multivalent metal cation. In further embodiments, Q is a multivalent transition metal cation. In some embodiments, Q is a divalent cation counterion. In further embodiments, Q is a divalent metal cation. In some embodiments, Q is at least one member selected from $Ca^{2+}$, $Mg^{2+}$, $Zn^{2+}$, $Cu^{2+}$, $Co^{2+}$, and $Fe^{2+}$. In further embodiments, Q is $Ca^{2+}$ or $Mg^{2+}$. In some embodiments, Q is $Ca^{2+}$. In some embodiments, Q is $Mg^{2+}$. In some embodiments, Q is a divalent organic counterion.
In some embodiments, Q is a monovalent cation counterion. In some embodiments, Q is a monovalent metal cation. In some embodiments, Q is at least one member selected from $Na^+$, $Li^+$, or $K^+$. In some embodiments, Q is an organic cation. In some embodiments, Q is a monovalent organic cation such as a protonated amine (e.g., a protonated diamine or a protonated polyamine). In some embodiments, Q is an organic cation such as $NH_4^+$, a protonated diamine or a protonated polyamine.

In some embodiments, the liposome contains less than 6 million, less than 500,000, less than 200,000, less than 100,000, less than 50,000, or less than 10,000, molecules of trans-norbixin. In some embodiments, the liposome contains 10 to 100,000, 100 to 10,000, or 1,000 to 5,000, molecules of trans-norbixin, or any range therein between. In some embodiments, the trans-norbixin/lipid ratio of the liposomal composition is 1 g/mol and about 1000 g/mol, or any range therein between. In some embodiments, the trans-norbixin/lipid ratio is 10-150 g/mol, 10-100 g/mol, 30-200 g/mol, 40-200 g/mol, or 50-200 g/mol, or any range therein between. In some embodiments, the liposome comprises at least 0.1% to 97% Q-norbixin-Q. In some embodiments, the liposome has a diameter of 20 nm to 500 nm, or 20 nm to 200 nm, or any range therein between. In some embodiments, the liposome has a diameter of 80 nm to 120 nm, or any range therein between. In some embodiments, the liposome is formed from liposomal components. In further embodiments, the liposomal components comprise at least one of an anionic lipid and a neutral lipid. In further embodiments, the liposomal components comprise at least one selected from: DSPE; DSPE-PEG; DSPE-PEG-maleimide; HSPC; HSPC-PEG; cholesterol; cholesterol-PEG; and cholesterol-maleimide. In further embodiments, the liposomal components comprise at least one selected from: DSPE; DSPE-PEG; DSPE-PEG-FITC; DSPE-PEG-maleimide; cholesterol; and HSPC. In additional embodiments, the liposome further comprises an oxidized phospholipid such as an OxPAPC. In some embodiments, the liposome comprises an OxPAPC that is an oxidized phospholipid containing fragmented oxygenated sn-2 residues, an oxidized phospholipid containing full length oxygenated sn-2 residues, and/or an oxidized phospholipid containing a five-carbon sn-2 residue bearing omega-aldehyde or omega-carboxyl groups. In some embodiments, the liposome comprises an OxPAPC selected from HOdiA-PC, KOdiA-PC, HOOA-PC and KOOA-PC, or the OxPAPC is an epoxyisoprostane-containing phospholipid. In some embodiments, the liposome comprises an OxPAPC selected from 1-palmitoyl-2-(5,6-epoxyisoprostane E2)-sn-glycero-3-phosphocholine (5,6 PEIPC), 1-palmitoyl-2-(epoxycyclopentenone)-sn-glycero-3-phosphorylcholine (PECPC), 1-palmitoyl-2-(epoxyisoprostane E2)-sn-glycero-4-phosphocholine (PEIPC), 1-palmitoyl-2-glutar-oyl-sn-glycero-3-phosphocholine (PGPC); 1-palmitoyl-2-(9'oxo-nonanoyl)-sn-glycero-3-phosphocholine; 1-palmitoyl-2-arachinodoyl-sn-glycero-3-phosphocholine; 1-palmitoyl-2-myristoyl-sn-glyc-ero-3-phosphocholine; 1-palmitoyl-2-hexa-decyl-sn-glycero-3-phosphocholine; 1-palmitoyl-2-azelaoyl-sn-glycero-3-phos-phocholine; and 1-palm-itoyl-2-acet-oyl-sn-glycero-3-phosphocholine. In some embodiments, the liposome comprises PGPC. In some embodiments, the OxPAPC within the liposome lipid bilayer is 0%-100% of total lipids, or any range therein between. In some embodiments, the liposome comprises a targeting moiety having a specific affinity for a surface antigen on a target cell of interest. In some embodiments, the targeting moiety is attached to one or both of a PEG and the exterior of the liposome, optionally wherein the targeting moiety is attached to one or both of the PEG and the exterior of the liposome by a covalent bond. In some embodiments, the targeting moiety is a polypeptide. In further embodiments, the targeting moiety is an antibody or an antigen binding fragment of an antibody. In some embodiments, the liposome contains 1 to 1000, 50 to 750, 100 to 500, or 30 to 200 targeting moieties, or any range therein between. In some embodiments, the liposome further comprises an immunostimulating agent (such as 1,6-beta glucan). In some embodiments, the liposome comprises a steric stabilizer. In some embodiments, the steric stabilizer is polyethylene glycol (i.e., the liposome is pegylated). In some embodiments, the PEG has a number average molecular weight (Mn) of 200 to 5000 Daltons. In additional embodiments, the liposome is anionic or neutral. In some embodiments, the liposome has a zeta potential that is less than or equal to zero. In some embodiments, the liposome has a zeta potential that is −150 to 0, −50 to 0 mV, −40 to 0 mV, −30 to 0 mV, −25 to 0 mV, −20 to 0 mV, −10 to 0 mV, −9 to 0 mV, −8 to 0 mV, −7 to 0 mV, −6 to 0 mV, −5 to 0 mV, −4 to 0 mV, −3 to 0 mV, −2 to 0 mV, −1 to 0 mV, or −8 to 2 mV, or any range therein between. In other embodiments, the liposome is cationic. In some embodiments, the liposomal composition comprises a liposome that has a zeta potential that is more than zero. In some embodiments, the liposome has a zeta potential that is 0.2 to 150 mV, 1 to 50 mV, 1 to 40 mV, 1 to 30 mV, 1 to 25 mV, 1 to 20 mV, 1 to 15 mV, 1 to 10 mV, 1 to 5 mV, 2 to 10 mV, 3 to 10 mV, 4 to 10 mV, or 5 to 10 mV, or any range therein between.

In some embodiments, the disclosure provides a pharmaceutical composition comprising calcium trans-norbixin (CTN) encapsulated by a liposome. The CTN can exist in linear and/or cyclic form (shown below).

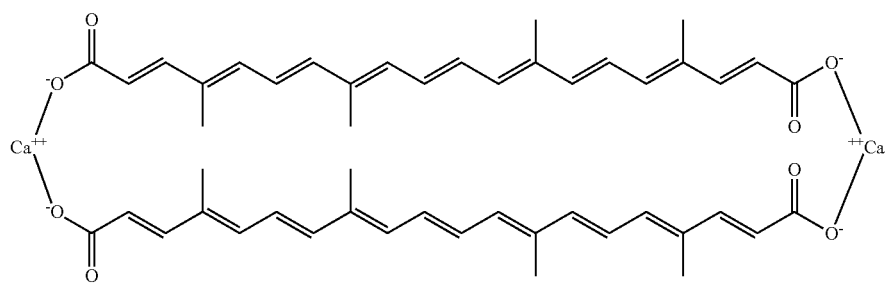

In some embodiments, the liposome contains less than 6 million, less than 500,000, less than 200,000, less than 100,000, less than 50,000, or less than 10,000, molecules of trans-norbixin. In some embodiments, the liposome contains 10 to 100,000, 100 to 10,000, or 1,000 to 5,000, molecules of trans-norbixin, or any range therein between. In some embodiments, the trans-norbixin/lipid ratio of the liposomal composition is 1 g/mol and about 1000 g/mol, or any range therein between. In some embodiments, the trans-norbixin/lipid ratio is 10-150 g/mol, 10-100 g/mol, 30-200 g/mol, 40-200 g/mol, or 50-200 g/mol, or any range therein between. In some embodiments, the liposome comprises at least 0.1% to 97% trans-norbixin. In some embodiments, the liposome has a diameter of 20 nm to 500 nm, or 20 nm to 200 nm, or any range therein between. In some embodiments, the liposome has a diameter of 80 nm to 120 nm, or any range therein between. In some embodiments, the liposome is formed from liposomal components. In further embodiments, the liposomal components comprise at least one of an anionic lipid and a neutral lipid. In further embodiments, the liposomal components comprise at least one selected from: DSPE; DSPE-PEG; DSPE-PEG-maleimide; HSPC; HSPC-PEG; cholesterol; cholesterol-PEG; and cholesterol-maleimide. In further embodiments, the liposomal components comprise at least one selected from: DSPE; DSPE-PEG; DSPE-PEG-FITC; DSPE-PEG-maleimide; cholesterol; and HSPC. In additional embodiments, the liposome further comprises an oxidized phospholipid such as an OxPAPC. In some embodiments, the liposome comprises an OxPAPC that is an oxidized phospholipid containing fragmented oxygenated sn-2 residues, an oxidized phospholipid containing full length oxygenated sn-2 residues, and/or an oxidized phospholipid containing a five-carbon sn-2 residue bearing omega-aldehyde or omega-carboxyl groups. In some embodiments, the liposome comprises an OxPAPC selected from HOdiA-PC, KOdiA-PC, HOOA-PC and KOOA-PC, or the OxPAPC is an epoxyisoprostane-containing phospholipid. In some embodiments, the liposome comprises an OxPAPC selected from 1-palmitoyl-2-(5,6-epoxyisoprostane E2)-sn-glycero-3-phosphocholine (5,6 PEIPC), 1-palmitoyl-2-(epoxycyclopentenone)-sn-glycero-3-phosphorylcholine (PECPC), 1-palmitoyl-2-(epoxyiso-prostane E2)-sn-glycero-4-phosphocholine (PEIPC), 1-palmitoyl-2-glutaroyl-sn-glycero-3-phosphocholine (PGPC); 1-palmitoyl-2-(9'oxo-nonanoyl)-sn-glycero-3-phosphocholine; 1-palmitoyl-2-arachinodoyl-sn-glycero-3-phospho-choline; 1-palmitoyl-2-myristoyl-sn-glycero-3-phosphocholine; 1-palmitoyl-2-hexadecyl-sn-glycero-3-phosphocholine; 1-palmitoyl-2-azelaoyl-sn-glycero-3-phosphocholine; and 1-palmitoyl-2-acetoyl-sn-glycero-3-phosphochol-ine. In some embodiments, the liposome comprises PGPC. In some embodiments, the OxPAPC within the liposome lipid bilayer is 0%-100% of total lipids, or any range therein between. In some embodiments, the liposome comprises a targeting moiety having a specific affinity for a surface antigen on a target cell of interest. In some embodiments, the targeting moiety is attached to one or both of a PEG and the exterior of the liposome, optionally wherein the targeting moiety is attached to one or both of the PEG and the exterior of the liposome by a covalent bond. In some embodiments, the targeting moiety is a polypeptide. In further embodiments, the targeting moiety is an antibody or an antigen binding fragment of an antibody. In some embodiments, the liposome contains 1 to 1000, 50 to 750, 100 to 500, or 30 to 200 targeting moieties, or any range therein between. In some embodiments, the liposome further comprises an immunostimulating agent (such as 1,6-beta glucan). In some embodiments, the liposome comprises a steric stabilizer. In some embodiments, the steric stabilizer is polyethylene glycol (i.e., the liposome is pegylated). In some embodiments, the PEG has a number average molecular weight (Mn) of 200 to 5000 Daltons. In additional embodiments, the liposome is anionic or neutral. In some embodiments, the liposome has a zeta potential that is less than or equal to zero. In some embodiments, the liposome has a zeta potential that is −150 to 0, −50 to 0 mV, −40 to 0 mV, −30 to 0 mV, −25 to 0 mV, −20 to 0 mV, −10 to 0 mV, −9 to 0 mV, −8 to 0 mV, −7 to 0 mV, −6 to 0 mV, −5 to 0 mV, −4 to 0 mV, −3 to 0 mV, −2 to 0 mV, −1 to 0 mV, or −8 to 2 mV, or any range therein between. In other embodiments, the liposome is cationic. In some embodiments, the liposomal composition comprises a liposome that has a zeta potential that is more than zero. In some embodiments, the liposome has a zeta potential that is 0.2 to 150 mV, 1 to 50 mV, 1 to 40 mV, 1 to 30 mV, 1 to 25 mV, 1 to 20 mV, 1 to 15 mV, 1 to 10 mV, 1 to 5 mV, 2 to 10 mV, 3 to 10 mV, 4 to 10 mV, or 5 to 10 mV, or any range therein between.

In some embodiments, the disclosure provides a pharmaceutical composition comprising magnesium trans-norbixin (MTN) encapsulated by a liposome. The MTN can exist in linear and/or cyclic form (shown below).

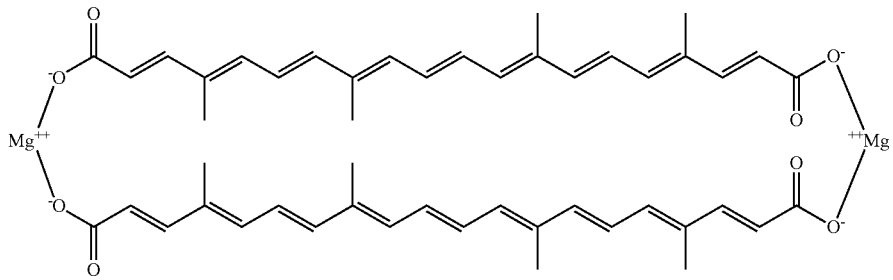

In some embodiments, the liposome contains less than 6 million, less than 500,000, less than 200,000, less than 100,000, less than 50,000, or less than 10,000, molecules of trans-norbixin. In some embodiments, the liposome contains 10 to 100,000, 100 to 10,000, or 1,000 to 5,000, molecules of trans-norbixin, or any range therein between. In some embodiments, the trans-norbixin/lipid ratio of the liposomal composition is 1 g/mol and about 1000 g/mol, or any range therein between. In some embodiments, the trans-norbixin/lipid ratio is 10-150 g/mol, 10-100 g/mol, 30-200 g/mol, 40-200 g/mol, or 50-200 g/mol, or any range therein between. In some embodiments, the liposome comprises at least 0.1% to 97% trans-norbixin. In some embodiments, the liposome has a diameter of 20 nm to 500 nm, or 20 nm to 200 nm, or any range therein between. In some embodiments, the liposome has a diameter of 80 nm to 120 nm, or any range therein between. In some embodiments, the liposome is formed from liposomal components. In further embodiments, the liposomal components comprise at least one of an anionic lipid and a neutral lipid. In further embodiments, the liposomal components comprise at least one selected from: DSPE; DSPE-PEG; DSPE-PEG-maleimide; HSPC; HSPC-PEG; cholesterol; cholesterol-PEG; and cholesterol-maleimide. In further embodiments, the liposomal components comprise at least one selected from: DSPE; DSPE-PEG; DSPE-PEG-FITC; DSPE-PEG-maleimide; cholesterol; and HSPC. In additional embodiments, the liposome further comprises an oxidized phospholipid such as an OxPAPC. In some embodiments, the liposome comprises an OxPAPC that is an oxidized phospholipid containing fragmented oxygenated sn-2 residues, an oxidized phospholipid containing full length oxygenated sn-2 residues, and/or an oxidized phospholipid containing a five-carbon sn-2 residue bearing omega-aldehyde or omega-carboxyl groups. In some embodiments, the liposome comprises an OxPAPC selected from HOdiA-PC, KOdiA-PC, HOOA-PC and KOOA-PC, or the OxPAPC is an epoxyisoprostane-containing phospholipid. In some embodiments, the liposome comprises an OxPAPC selected from 1-palmitoyl-2-(5,6-epoxyisoprostane E2)-sn-glycero-3-phosphocholine (5,6 PEIPC), 1-palmitoyl-2-(epoxycyclopentenone)-sn-glycero-3-phosphoryl-choline (PECPC), 1-palmitoyl-2-(epoxyisoprostane E2)-sn-glycero-4-phospho-choline (PEIPC), 1-palmitoyl-2-glutaroyl-sn-glycero-3-phosphocholine (PGPC); 1-palmitoyl-2-(9'oxo-nonanoyl)-sn-glycer-o-3-phosphocholine; 1-palmitoyl-2-arachinodoyl-sn-glycero-3-phosphocholine; 1-palmitoyl-2-myristoyl-sn-glycero-3-phosphocholine; 1-palmitoyl-2-hexadec-yl-sn-glycero-3-phosphocholine; 1-palmitoyl-2-azelaoyl-sn-glycero-3-phos-phocholine; and 1-palmitoyl-2-acetoyl-sn-glycero-3-phosphocholine. In some embodiments, the liposome comprises PGPC. In some embodiments, the OxPAPC within the liposome lipid bilayer is 0%-100% of total lipids, or any range therein between. In some embodiments, the liposome comprises a targeting moiety having a specific affinity for a surface antigen on a target cell of interest. In some embodiments, the targeting moiety is attached to one or both of a PEG and the exterior of the liposome, optionally wherein the targeting moiety is attached to one or both of the PEG and the exterior of the liposome by a covalent bond. In some embodiments, the targeting moiety is a polypeptide. In further embodiments, the targeting moiety is an antibody or an antigen binding fragment of an antibody. In some embodiments, the liposome contains 1 to 1000, 50 to 750, 100 to 500, or 30 to 200 targeting moieties, or any range therein between. In some embodiments, the liposome contains less than 500,000 or less than 200,000 molecules of trans-norbixin. In some embodiments, the liposome contains between 10 to 100,000 molecules of trans-norbixin, or any range therein between. In some embodiments, the liposome further comprises an immunostimulating agent (such as 1,6-beta glucan). In some embodiments, the liposome comprises a steric stabilizer. In some embodiments, the steric stabilizer is polyethylene glycol (i.e., the liposome is pegylated). In some embodiments, the PEG has a number average molecular weight (Mn) of 200 to 5000 Daltons. In additional embodiments, the liposome is anionic or neutral. In some embodiments, the liposome has a zeta potential that is less than or equal to zero. In some embodiments, the liposome has a zeta potential that is −150 to 0, −50 to 0 mV, −40 to 0 mV, −30 to 0 mV, −25 to 0 mV, −20 to 0 mV, −10 to 0 mV, −9 to 0 mV, −8 to 0 mV, −7 to 0 mV, −6 to 0 mV, −5 to 0 mV, −4 to 0 mV, −3 to 0 mV, −2 to 0 mV, −1 to 0 mV, or −8 to 2 mV, or any range therein between. In other embodiments, the liposome is cationic. In some embodiments, the liposomal composition comprises a liposome that has a zeta potential that is more than zero. In some embodiments, the liposome has a zeta potential that is 0.2 to 150 mV, 1 to 50 mV, 1 to 40 mV, 1 to 30 mV, 1 to 25 mV, 1 to 20 mV, 1 to 15 mV, 1 to 10 mV, 1 to 5 mV, 2 to 10 mV, 3 to 10 mV, 4 to 10 mV, or 5 to 10 mV, or any range therein between.

Formulation and Administration

The provided compositions can be formulated in whole or in part as pharmaceutical compositions. Pharmaceutical compositions may include one or more nanoparticle compositions. For example, a pharmaceutical composition may include one or more nanoparticle compositions including one or more different therapeutic and/or prophylactics. Pharmaceutical compositions may further include one or more pharmaceutically acceptable excipients or accessory ingredients such as those described herein. General guidelines for the formulation and manufacture of pharmaceutical compositions and agents are available, for example, in Remington's The Science and Practice of Pharmacy, 21$^{st}$ Edition, A. R. Gennaro; Lippincott, Williams & Wilkins, Baltimore, Md., 2006. Conventional excipients and accessory ingredients may be used in any pharmaceutical composition, except insofar as any conventional excipient or accessory ingredient may be incompatible with one or more components of a nanoparticle composition. An excipient or accessory ingredient may be incompatible with a component of a nanoparticle composition if its combination with the component may result in any undesirable biological effect or otherwise deleterious effect.

In some embodiments, one or more excipients or accessory ingredients may make up greater than 50% of the total mass or volume of a pharmaceutical composition including a nanoparticle composition. For example, the one or more excipients or accessory ingredients may make up 50%, 60%, 70%, 80%, 90%, or more of a pharmaceutical convention. In some embodiments, a pharmaceutically acceptable excipient is at least 95%, at least 96%, at least 97%, at least 98%, at least 99%, or 100% pure. In some embodiments, an excipient is approved for use in humans and for veterinary use. In some embodiments, an excipient is approved by United States Food and Drug Administration. In some embodiments, an excipient is pharmaceutical grade. In some embodiments, an excipient meets the standards of the United States Pharmacopoeia (USP), the European Pharmacopoeia (EP), the British Pharmacopoeia, and/or the International Pharmacopoeia.

Standard methods for making liposomes include, but are not limited to methods reported in Liposomes: A Practical Approach, V. P. Torchilin, Volkmar Weissig Oxford University Press, 2003 and are well known in the art.

In some embodiments, the disclosure provides a liposome composition and a physiologically (i.e., pharmaceutically) acceptable carrier. As used herein, the term "carrier" refers to a typically inert substance used as a diluent or vehicle for a drug such as a therapeutic agent. The term also encompasses a typically inert substance that imparts cohesive qualities to the composition. Typically, the physiologically acceptable carriers are present in liquid form. Examples of liquid carriers include physiological saline, phosphate buffer, normal buffered saline (135-150 mM NaCl), water, buffered water, 0.4% saline, 0.3% glycine, glycoproteins to provide enhanced stability (e.g., albumin, lipoprotein, globulin, etc.), and the like. Since physiologically acceptable carriers are determined in part by the particular composition being administered as well as by the particular method used to administer the composition, there are a wide variety of suitable formulations of pharmaceutical compositions provided herein (See, e.g., Remington's Pharmaceutical Sciences, $17^{th}$ ed., 1989).

The provided compositions may be sterilized by conventional, known sterilization techniques or may be produced under sterile conditions. Aqueous solutions can be packaged for use or filtered under aseptic conditions and lyophilized, the lyophilized preparation being combined with a sterile aqueous solution prior to administration. The compositions can contain pharmaceutically acceptable auxiliary substances as required to approximate physiological conditions, such as pH adjusting and buffering agents, tonicity adjusting agents, wetting agents, and the like, e.g., sodium acetate, sodium lactate, sodium chloride, potassium chloride, calcium chloride, sorbitan monolaurate, and triethanolamine oleate. Sugars can also be included for stabilizing the compositions, such as a stabilizer for lyophilized liposome compositions. In some embodiments, the pharmaceutical composition comprises a tonicity agent at a concentration of greater than 0.1%, or a concentration of 0.3% to 2.5%, 0.5% to 2.0%, 0.5% to 1.5%, 0.5% to 1.5%, 0.6% to 1.1%, or any range therein between. In some embodiments, the pharmaceutical composition comprises a tonicity agent such as dextrose, mannitol, glycerin, potassium chloride, or sodium chloride. In further embodiments, the pharmaceutical composition comprises dextrose, mannitol, glycerin, potassium chloride, or sodium chloride at a concentration of greater than 0.1%, or a concentration of 0.3% to 2.5%, 0.5% to 2.0%, 0.5% to 1.5%, 0.5% to 1.5%, 0.6% to 1.1%, or any range therein between.

Formulations suitable for parenteral administration, such as, for example, by intraarticular (in the joints), intravenous, intramuscular, intratumoral, intradermal, intraperitoneal, and subcutaneous routes, include aqueous and non-aqueous, isotonic sterile injection solutions, which can contain antioxidants, buffers, bacteriostats, and solutes that render the formulation isotonic with the blood of the intended recipient, and aqueous and non-aqueous sterile suspensions that can include suspending agents, solubilizers, thickening agents, stabilizers, and preservatives. Injection solutions and suspensions can also be prepared from sterile powders, granules, and tablets. In some embodiments, the provided liposomal compositions are administered, for example, by intravenous infusion, topically, intraperitoneally, intravesically, or intrathecally. In particular embodiments, the liposome compositions are parentally or intravenously administered. Preferably, the pharmaceutical liposomal compositions are administered parentally, i.e. intraarticularly, intravenously, subcutaneously, or intramuscularly. In other embodiments, the pharmaceutical preparation may be administered topically.

In some embodiments, the provided pharmaceutical compositions (e.g., liposomal compositions are presented in unit-dose or multi-dose sealed containers, such as ampoules and vials.

In some embodiments, the pharmaceutical preparations are administered in unit dosage form. In such form the preparation is subdivided into unit doses containing appropriate quantities of the active component, e.g., a liposome composition. The unit dosage form can be a packaged preparation, the package containing discrete quantities of preparation. The composition can, if desired, also contain other compatible therapeutic agents (e.g., as described herein).

In some embodiments, the liposome compositions including a therapeutic and/or diagnostic agent utilized in the pharmaceutical compositions provided herein can be administered at the initial dosage of about 0.001 mg/kg to about 1000 mg/kg daily. A daily dose range of about 0.01 mg/kg to about 500 mg/kg, or about 0.1 mg/kg to about 200 mg/kg, or about 1 mg/kg to about 100 mg/kg, or about 10 mg/kg to about 50 mg/kg, can be used. The dosages, however, may be varied depending upon the requirements of the patient, the severity of the condition being treated, and the liposome composition being employed. For example, dosages can be empirically determined considering the type and stage of the disease, disorder or condition diagnosed in a particular patient. The dose administered to a patient, in the context of the provided pharmaceutical compositions (e.g., liposome compositions) should be sufficient to affect a beneficial therapeutic response in the patient over time. The size of the dose will also be determined by the existence, nature, and extent of any adverse side-effects that accompany the administration of a particular liposome composition in a particular patient. Determination of the proper dosage for a particular situation is within the skill of the practitioner. Generally, treatment is initiated with smaller dosages which are less than the optimum dose of the liposome composition. Thereafter, the dosage is increased by small increments until the optimum effect under circumstances is reached. For convenience, the total daily dosage may be divided and administered in portions during the day, if desired.

Liposome Loading

The provided carotenoid compositions can be loaded into liposomes using active or passive loading modalities.

In some embodiments, the disclosure provides a method of preparing a liposomal composition comprising an ionizable crocetin (e.g., of [1]-[97]) the; method comprising:
 (a) forming a mixture comprising: liposomal components in solution;
 (b) homogenizing the mixture to form liposomes in the solution; and
 (c) processing the mixture to form liposomes containing the ionizable carotenoid.

In some embodiments, the processing step includes one or more steps of: thin film hydration, extrusion, in-line mixing, ethanol injection technique, freezing-and-thawing technique, reverse-phase evaporation, dynamic high pressure microfluidization, microfluidic mixing, double emulsion, freeze-dried double emulsion, 3D printing, membrane contactor method, and stirring. In some embodiments, the processing step includes one or more steps of modifying the size of the liposomes by one or more of steps of extrusion, high-pressure microfluidization, and/or sonication.

In some embodiments, the disclosure provides an active loading method to generate a carotenoid salt inside a liposome formulation using a soluble acetate metal salts gradient (calcium acetate or magnesium acetate).

Multivalent counterions used in accordance with the present disclosure can be encapsulated in liposomes according to techniques described herein or otherwise known in the art. This includes the passive encapsulation techniques described below or otherwise known in the art.

In some embodiments, the disclosure provides a method of preparing a pharmaceutical composition comprising:
 (a) preparing a liposomal solution containing liposomes in a weak acid salt of a multivalent metal;

(b) adding an ionizable carotenoid to the liposomal solution; and (c) maintaining the ionizable carotenoid in the liposomal solution for sufficient time to load the carotenoid into liposomes.

In some embodiments, the ionizable carotenoid is an ionizable carotenoid in any of compositions [1]-[28](e.g., trans-crocetin and trans-norbixin). In some embodiments, the carotenoid is a carotenoid disclosed in any of FIG. 1A-FIG. 1D. In some embodiments, the weak acid is selected from acetic acid, gluconic acid, tartaric acid, glutamic acid, citric acid, formic acid, and glycinic acid. In some embodiments, the weak acid salt of a multivalent metal is used at a concentration from 0 mM to 2000 mM, or 50 mM to 500 mM, or any range therein between. In some embodiments, the multivalent metal is selected from $Ca^{2+}$, $Mg^{2+}$, $Zn^{2+}$, $Cu^{2+}$, $Co^{2+}$, $Fe^{2+}$ and $Fe^{3+}$. In some embodiments, the weak acid is acetic acid and the multivalent metal is $Ca^{2+}$ (i.e., the weak acid salt of the multivalent metal is calcium acetate). In some embodiments, the weak acid is acetic acid and the multivalent metal is $Mg^{2+}$ (i.e., the weak acid salt of the multivalent metal is magnesium acetate). Pharmaceutical compositions prepared according to the provided methods are also encompassed by the disclosure. The liposomal solution is preferably a buffered solution. However, it is appreciated that any suitable solvent may be use to prepare and use the provided compositions. A preferred liposome solution has a pH at about physiological pH and comprises a buffer which has a buffering range to include physiological pH. A non-limiting example of a suitable buffer for the liposome solution is HEPES (e.g., 5 mM HEPES buffered saline pH 6.5). Pharmaceutical compositions prepared according to the method are also encompassed by the disclosure.

The multivalent metals used in accordance with the provided methods can be encapsulated in liposomes according to conventional techniques known in the art. These methods include, for example, passive encapsulation techniques described herein or otherwise known in the art. Loading of an ionizable carotenoid such as trans-crocetin may be established by maintaining the ionizable carotenoid in the liposomal solution for a suitable amount of time at a suitable temperature. Depending on the composition of the liposome, and the temperature, pH, and chemical nature of the ionizable carotenoid, loading of the ionizable carotenoid may occur over a time period of minutes or hours. In some embodiments, loading is carried out at temperatures of, for example, 0° C. to 95° C., or 20° C. to 75° C., or any range therein between, preferably from about 40° C. to about 80° C., or any range therein between.

In some embodiments, the disclosure further provides the step of (d) removing unencapsulated ionizable carotenoid from the liposome preparation prepared according to (c). In some embodiment, the removal is carried out by passing the liposome preparation through a gel filtration column equilibrated with a second aqueous buffered solution, centrifugation, or dialysis, or related techniques. After removal of unencapsulated ionizable carotenoid, the extent of ionizable carotenoid loading may be determined by measurement of ionizable carotenoid and lipid levels according to conventional techniques. Lipid and drug concentrations may be determined using any suitable method known in the art, such as scintillation counting, spectrophotometric assays, and high performance liquid chromatography. Replacement of the liposome preparation solution to remove unencapsulated carotenoid and counterion, such as sodium acetate, can be accomplished using any of various techniques, known in the art, including but not limited to chromatography of the liposome preparation through an extensive gel filtration column equilibrated with a second aqueous buffered solution, by centrifugation, extensive or repeated dialysis, exchange of the liposomal preparation, treating the liposomal preparation with chelating agents or by related techniques. Pharmaceutical compositions prepared according to the provided methods are also encompassed by the disclosure.

In some embodiments, the disclosure provides a method of preparing a pharmaceutical composition comprising:

(a) preparing a liposomal solution containing liposomes in a weak acid salt of a multivalent metal;

(b) adding trans-crocetin to the liposomal solution; and (c) maintaining the ionizable carotenoid in the liposomal solution for sufficient time to load the carotenoid into liposomes.

In some embodiments, the weak acid is selected from acetic acid, gluconic acid, tartaric acid, glutamic acid, citric acid, formic acid, and glycinic acid. In some embodiments, the weak acid salt of a multivalent metal is used at a concentration from 0 mM to 2000 mM, or 50 mM to 500 mM, or any range therein between. In some embodiments, the multivalent metal is selected from $Ca^{2+}$, $Mg^{2+}$, $Zn^{2+}$, $Cu^{2+}$, $Co^{2+}$, $Fe^{2+}$, and $Fe^{3+}$. In some embodiments, the weak acid is acetic acid and the multivalent metal is $Ca^{2+}$ (i.e., the weak acid salt of the multivalent metal is calcium acetate). In some embodiments, the weak acid is acetic acid and the multivalent metal is $Mg^{2+}$ (i.e., the weak acid salt of the multivalent metal is magnesium acetate). Pharmaceutical compositions prepared according to the method are also encompassed by the disclosure. The liposomal solution is preferably a buffered solution. However, it is appreciated that any suitable solvent may be utilized to practice the provided compositions and methods. A preferred liposome solution has a pH at about physiological pH and comprises a buffer which has a buffering range to include physiological pH. Non-limiting example of suitable buffers for the liposome solution is 5 mM HEPES buffered saline pH 6.5. Pharmaceutical compositions prepared according to the method are also encompassed by the disclosure.

Loading of trans-crocetin may be established by maintaining the trans-crocetin in the liposomal solution for a suitable amount of time at a suitable temperature. Depending on the composition of the liposome, and the temperature, pH, and chemical nature of trans-crocetin, loading of the trans-crocetin may occur over a time period of minutes or hours. In some embodiments, loading is carried out at temperatures of, for example, 0° C. to 95° C., or 20° C. to 75° C., or any range therein, preferably from about 40° C. to about 80° C.

In some embodiments, the disclosure further provides the step of (d) removing unencapsulated trans-crocetin from the liposome preparation prepared according to (c). In some embodiment, the removal is carried out by passing the liposome preparation through a gel filtration column equilibrated with a second aqueous buffered solution, or by centrifugation, dialysis, or related techniques. After removal of unencapsulated trans-crocetin, the extent of trans-crocetin loading may be determined by measurement of trans-crocetin and lipid levels according to conventional techniques. Lipid and drug concentrations may be determined by employing any suitable method known in the art, such as scintillation counting, spectrophotometric assays, and high performance liquid chromatography. Replacement of the liposome preparation solution to remove unencapsulated trans-crocetin and counterion, such as sodium acetate, can be accomplished using any of various techniques, known in the art, including but not limited to chromatography of the liposome preparation through an extensive gel filtration column equilibrated with a second aqueous buffered solution, centrifugation, extensive or repeated dialysis, exchange of the liposomal preparation, treating the liposomal preparation with chelating agents or by related techniques. Pharmaceutical compositions prepared according to the provided methods are also encompassed by the disclosure.

Pharmaceutical compositions comprising an ionizable carotenoid salt prepared according to the provided methods are also encompassed by the disclosure. In some embodiments, the ionizable carotenoid is an ionizable carotenoid in any of compositions [1]-[28](e.g., trans-crocetin and trans-norbixin). In some embodiments, the ionizable carotenoid is a carotenoid disclosed in any of FIGS. 1A-1D. In some embodiments, the disclosure provides a pharmaceutical composition comprising a liposome encapsulating an ionizable carotenoid, wherein the ionizable carotenoid is loaded into liposomes in the presence of intra-liposomal multivalent counterions (e.g., $Ca^{2+}$, $Mg^{2+}$, $Zn^{2+}$, $Cu^{2+}$, $Co^{2+}$, and $Fe^{2+}$, and $Fe^{3+}$). In some embodiments, the multivalent counterions comprise $Ca^{2+}$. In some embodiments, the multivalent counterions comprise $Mg^{2+}$. In some embodiments, the multivalent counterions comprise $Fe^{3+}$.

In some embodiments, the disclosure provides a pharmaceutical composition comprising a liposome encapsulating a trans-crocetin salt, wherein the trans-crocetin is loaded into liposomes in the presence of intra-liposomal multivalent counterions (e.g., $Ca^{2+}$, $Mg^{2+}$, $Zn^{2+}$, $Cu^{2+}$, $Co^{2+}$, and $Fe^{2+}$, and $Fe^{3+}$). In some embodiments, the multivalent counterions comprise $Ca^{2+}$. In some embodiments, the multivalent counterions comprise $Mg^{2+}$. In some embodiments, the multivalent counterions comprise $Fe^{3+}$.

Methods of Treatment and Use

The provided pharmaceutical compositions such as liposomal compositions, have uses that provide advances over prior treatments of diseases and disorders that include without limitation, infection and infectious diseases such as HIV/AIDS: human immunodeficiency virus-1 (HIV-1), tuberculosis, malaria and its complications such as cerebral malaria, severe anemia, acidosis, acute kidney failure and ARDS, sepsis, inflammation (e.g., chronic inflammatory diseases), ischemia, (including an ischemic condition such as ischemic stroke, coronary artery disease, peripheral vascular disease, cerebral vascular disease, ischemia associated renal pathologies, and ischemia associated with wounds); shock (e.g., hemorrhagic shock), stroke, cardiovascular disease, renal pathologies, wound healing, metabolic disease, hyperproliferative diseases such as cancer, and disorders of the immune system, cardiovascular system, digestive, nervous, respiratory, and endocrine system. In some embodiments, the disclosure provides a method for treating or preventing a disease, disorder or condition in a subject needing such treatment or prevention, the method comprising administering a pharmaceutical composition provided herein (e.g., the pharmaceutical composition of any of [1]-[79]) to the subject. Use of a pharmaceutical composition provided herein (e.g., the pharmaceutical composition of any of [1]-[79]), in the manufacture of a medicament for the treatment of a disease, disorder or condition in a subject is also provided herein. As are, pharmaceutical compositions of any of [1]-[79] for use in a medical medicament.

In some embodiments, the disclosure provides a method for treating or preventing a disease, disorder or condition associated with endotoxemia in a subject needing such treatment or prevention, the method comprising administering a pharmaceutical composition provided herein (e.g., the pharmaceutical composition of any of [1]-[79]) to the subject.

In some embodiments, the disclosure provides a method for treating or preventing a disease, disorder or condition associated with sepsis in a subject needing such treatment or prevention, the method comprising administering a pharmaceutical composition provided herein (e.g., the pharmaceutical composition of any of [1]-[79]) to the subject. In some embodiments, the subject has a low grade endotoxemic disease.

In some embodiments, the disclosure provides a method for treating or preventing a subject at risk of developing sepsis, the method comprising administering a pharmaceutical composition provided herein (e.g., the pharmaceutical composition of any of [1]-[79]) to the subject. In some embodiments, the subject is immunocompromised or immunosuppressed. In some embodiments, the subject is critically ill. In some embodiments, the subject elderly or neonatal. In some embodiments, the subject has febrile neutropenia. In some embodiments, the subject has an infection.

In some embodiments, the disclosure provides a method for treating or preventing a disease, disorder or condition associated with burn injury in a subject that is a burn victim, the method comprising administering a pharmaceutical composition provided herein (e.g., the pharmaceutical composition of any of [1]-[79]) to the subject.

In some embodiments, the disclosure provides a method for treating or preventing a disease, disorder or condition associated with infection in a subject needing such treatment or prevention, the method comprising administering a pharmaceutical composition provided herein (e.g., the pharmaceutical composition of any of [1]-[79]) to the subject. In some embodiments, the infection is a bacterial infection (e.g., a P. aeruginosa infection, an S. aureus infection (e.g., MRSA), Mycobacterium tuberculosis infection, an enterococcal infection (e.g., VRE), or a condition associated therewith. In some embodiments, the infection is a fungal infection (e.g., a candidiasis infection such as invasive candidiasis) or a condition associated therewith. In some embodiments, the infection is a parasitic infection (e.g., Schistosomiasis, and human African trypanosomiasis), or a condition associated therewith. In some embodiments, the infection is malaria or a condition associated therewith, such as cerebral malaria, severe anemia, acidosis, acute kidney failure and ARDS. In some embodiments, the infection is a viral infection (e.g., Ebola, Dengue and Marburg) or a condition associated therewith, such as influenza, measles, and a viral hemorrhagic fever.

In some embodiments, the disclosure provides a method for treating or preventing a disease, disorder or condition associated with ischemia or hypoxia in a subject needing such treatment or prevention, the method comprising administering a pharmaceutical composition provided herein (e.g., the pharmaceutical composition of any of [1]-[79]) to the subject. In some embodiments, the disease or condition associated with ischemia or hypoxia is associated with surgery or traumatic injury. In some embodiments, the disease or condition is ischemic-reperfusion injury, transient cerebral ischemia, cerebral ischemia-reperfusion, ischemic stroke, hemorrhagic stroke, traumatic brain injury, migraine (e.g., a chronic migraine or severe migraine disorder), gastrointestinal ischemia, kidney disease, pulmonary embolism, acute respiratory failure, neonatal respiratory distress syndrome, obstetric emergencies to reduce perinatal comorbidity (such as, pre/eclampsia and conditions that lead to cerebral palsy), myocardial infarction, acute limb or mesenteric ischemia, cardiac cirrhosis, chronic peripheral vascular disease, congestive heart failure, atherosclerotic stenosis, anemia, thrombosis, embolism, macular degeneration, a neurodegenerative disease (e.g., Alzheimer's disease, Parkinson's disease, and Amyotrophic Lateral Sclerosis (ALS)), sleep apnea, and surgery or traumatic injury. In some embodiments, the disease or condition associated with ischemia or hypoxia is myocardial infarction, or congestive heart failure with or without cardiac cirrhosis. In some embodiments, the disease or condition is pulmonary embolism, acute respiratory failure, chronic peripheral vascular disease, atherosclerotic stenosis, anemia, thrombosis, or embolism. In some embodiments, the disease or condition associated with ischemia or hypoxia is macular degeneration or an oncologic condition associated with hypoxia. In some embodiments, the disease or condition is kidney disease. In some embodiments, the disease or condition is lipopolysaccharide medication or toxin induced acute kidney injury (AKI) or end stage kidney disease.

In some embodiments, the disclosure provides a method for treating or preventing a disease, disorder or condition associated with shock in a subject needing such treatment or prevention, the method comprising administering a pharmaceutical composition provided herein (e.g., the pharmaceutical composition of any of [1]-[79]) to the subject. In some embodiments, the disease or condition is associated with cardiogenic shock. In some embodiments, the disease or condition is associated with, hypovolemic shock. In some embodiments, the disease or condition is associated with septic shock or other forms of distributive shock. In some embodiments, the disease or condition is associated with neurogenic shock. In some embodiments, the disease or condition is associated with anaphylactic shock.

In some embodiments, the disclosure provides a method for treating or preventing a disease, disorder or condition associated with nitric oxide deficiency in a subject needing such treatment or prevention, the method comprising administering a pharmaceutical composition provided herein (e.g., the pharmaceutical composition of any of [1]-[79]) to the subject. In some embodiments, the disease or disorder is sickle cell disease, paroxysmal nocturnal hemoglobinuria (PNH), a hemolytic anemia, a thalassemia, another red blood cell disorder, or a condition associated therewith. In some embodiments, the disease or disorder is a purpura such as thrombotic thrombocytic purpura (TTP), hemolytic uremic syndrome (HUS), idiopathic thrombocytopenia (ITP), or and another platelet disorder, or a condition associated therewith. In some embodiment, the disease or disorder is a coagulation abnormality such as disseminated intravascular coagulopathy (DIC), purpura fulminans, heparin induced thrombocytopenia (HIT), hyperleukocytosis, hyper viscosity syndrome, or a condition associated therewith.

In some embodiments, the disclosure provides a method for treating or preventing a disease, disorder or condition associated with inflammation in a subject needing such treatment or prevention, the method comprising administering a pharmaceutical composition provided herein (e.g., the pharmaceutical composition of any of [1]-[79]) to the subject. In some embodiments, the disease or condition associated with inflammation is low-grade inflammation. In some embodiments, the disease or condition associated with inflammation is systemic inflammation. In some embodiments, the disease or condition associated with inflammation is acute inflammation or a chronic inflammatory disease.

In some embodiments, the disclosure provides a method for treating or preventing a disease, disorder or condition associated with a cardiovascular disease or condition in a subject needing such treatment or prevention, the method comprising administering a pharmaceutical composition provided herein (e.g., the pharmaceutical composition of any of [1]-[79]) to the subject. In some embodiments, cardiovascular disease or condition is coronary artery disease. In some embodiments the cardiovascular disease or condition is myocardial infarction, sudden cardiac death, cardiorespiratory arrest, hypertension, pulmonary arterial hypertension, atherosclerosis, occlusive arterial disease, Raynaud's disease, peripheral vascular disease, other vasculopathies such as Buerger's disease, Takayasu's arthritis, and post-cardiac arrest syndrome (PCAS), chronic venous insufficiency, heart disease, congestive heart failure, or a chronic skin ulcer.

In some embodiments, the disclosure provides a method for treating or preventing a disease, disorder or condition associated with a liver disease or condition in a subject needing such treatment or prevention, the method comprising administering a pharmaceutical composition provided herein (e.g., the pharmaceutical composition of any of [1]-[79]) to the subject. In some embodiments, the liver disease or condition is cirrhosis. In some embodiments, the liver disease or condition is nonalcoholic fatty liver disease (NAFLD), non-alcoholic steatohepatitis (NASH). In some embodiments, the liver disease or condition is alcoholic liver disease. In some embodiments, the liver disease or condition is acute liver injury.

In some embodiments, the disclosure provides a method for treating or preventing a disease, disorder or condition associated with a lung disease or condition in a subject needing such treatment or prevention, the method comprising administering a pharmaceutical composition provided herein (e.g., the pharmaceutical composition of any of [1]-[79]) to the subject. In some embodiments, the lung disease or condition is acute respiratory distress syndrome (ARDS). In some embodiments, the lung disease or condition is chronic obstructive pulmonary disease. In some embodiments, the lung disease or condition is pulmonary fibrosis. In some embodiments, the lung disease or condition is pulmonary hemorrhage. In some embodiments, the lung disease or condition is asthma. In some embodiments, the lung disease or condition is lung injury. In some embodiments, the lung disease or condition is lung cancer. In some embodiments, the condition is cystic fibrosis.

In some embodiments, the disclosure provides a method for treating or preventing a disease, disorder or condition associated with a kidney disease or condition in a subject needing such treatment or prevention, the method comprising administering a pharmaceutical composition provided herein (e.g., the pharmaceutical composition of any of [1]-[79]) to the subject. In some embodiments, the kidney disease or condition is lipopolysaccharide-induced acute kidney injury (AKI). In some embodiments, the kidney disease or condition is chronic renal failure with or without end stage kidney disease.

In some embodiments, the disclosure provides a method for treating or preventing a disease, disorder or condition associated with a vascular disease in a subject needing such treatment or prevention, the method comprising administering a pharmaceutical composition provided herein (e.g., the pharmaceutical composition of any of [1]-[79]) to the subject. In some embodiments, the disease or condition is coronary artery disease. In some embodiments, the disease or condition is hypertension. In some embodiments, the disease or condition is atherosclerosis. In some embodiments, the disease or condition is post-cardiac arrest syndrome (PCAS). In some embodiments, the disease or condition is occlusive arterial disease, peripheral vascular disease, chronic venous insufficiency, chronic skin ulcers, or Raynaud's disease. In some embodiments, the disease, disorder or condition associated with a vascular disease is heart disease. In further embodiments, the disease, disorder or condition is congestive heart failure. In some embodiments, the disease, disorder or condition associated with vascular disease is ischemic bowel disease.

In some embodiments, the disclosure provides a method for treating or preventing a disease, disorder or condition associated with a heart attack or stroke in a subject needing such treatment or prevention and/or at risk of having a heart attack or stroke, the method comprising administering a pharmaceutical composition provided herein (e.g., the pharmaceutical composition of any of [1]-[79]) to the subject. In some embodiments, the disease, disorder or condition is ischemic stroke. In some embodiments, the disease, disorder or condition is hemorrhagic stroke.

In some embodiments, the disclosure provides a method for treating or preventing a disease, disorder or condition associated with nervous system in a subject needing such treatment or prevention, the method comprising administering a pharmaceutical composition provided herein (e.g., the pharmaceutical composition of any of [1]-[79]) to the subject. In some embodiments, the disease or condition is pain (e.g., chronic pain). In some embodiments, the disease or condition is a neurodegenerative disease (e.g., Alzheimer's disease or Parkinson's disease). In some embodiments, the disease, disorder or condition associated with nervous system is neural injury.

In some embodiments, the disclosure provides a method for treating or preventing a disease, disorder or condition associated with inflammatory bowel disease in a subject needing such treatment or prevention, the method comprising administering a pharmaceutical composition provided herein (e.g., the pharmaceutical composition of any of [1]-[79]) to the subject. In some embodiments, the disease, disorder or condition is Crohn's disease. In some embodiments, the disease, disorder or condition is ulcerative colitis.

In some embodiments, the disclosure provides a method for treating or preventing a disease, disorder or condition associated with type 2 diabetes or predisposition for diabetes in a subject needing such treatment or prevention, the method comprising administering a pharmaceutical composition provided herein (e.g., the pharmaceutical composition of any of [1]-[79]) to the subject. In some embodiments, the disease, disorder or condition is metabolic disease. In some embodiments, the disease, disorder or condition is insulin resistance. In some embodiments, the disease, disorder or condition is a diabetic vascular disease (e.g., a microvascular disease such as retinopathy and nephropathy). In some embodiments, the disease, disorder or condition is diabetic neuropathy. In some embodiments, the disease, disorder or condition is ulcers, diabetic necrosis, or gangrene.

In some embodiments, the disclosure provides a method for treating or preventing a disease, disorder or condition associated with an autoimmune disorder in a subject needing such treatment or prevention, the method comprising administering a pharmaceutical composition provided herein (e.g., the pharmaceutical composition of any of [1]-[79]) to the subject. In some embodiments, the autoimmune disorder is psoriasis. In some embodiments, the autoimmune disorder is cystic fibrosis. In some embodiments, the autoimmune disorder is rheumatoid arthritis.

In some embodiments, the disclosure provides a method for treating or preventing a disease, disorder or condition associated with sclerosis in a subject needing such treatment or prevention, the method comprising administering a pharmaceutical composition provided herein (e.g., the pharmaceutical composition of any of [1]-[79]) to the subject. In some embodiments, the disease, disorder or condition associated with sclerosis is systemic sclerosis.

In some embodiments, the disclosure provides a method for treating endotoxemia in a subject needing such treatment, the method comprising administering a pharmaceutical composition provided herein (e.g., the pharmaceutical composition of any of [1]-[79]) to the subject. In some embodiments, the endotoxemia is associated with a condition such as periodontal disease (e.g., periodontitis or inflammation of the gums), chronic alcoholism, chronic smoking, transplantation, or neonatal necrotizing enterocolitis, or neonatal ear infection.

In some embodiments, the disclosure provides a method of reducing systemic levels of LPS, endotoxin and/or another trigger of systemic inflammation in a subject in need thereof, the method comprising administering a pharmaceutical composition provided herein (e.g., the pharmaceutical composition of any of [1]-[79]) to the subject.

Combination Therapy

The compositions provided herein can be administered alone or in combination therapy with one or more additional therapeutic agents. In some embodiments, the composition is administered in combination therapy with another therapeutic agent. Combinations may be administered either concomitantly, e.g., combined in the same delivery vehicle (e.g., liposome), as an admixture, separately but simultaneously or concurrently; or sequentially. This includes presentations in which the combined therapeutic agents are administered together as a therapeutic mixture, and also procedures in which the combined agents are administered separately but simultaneously, e.g., as through separate intravenous lines into the same individual. Administration "in combination" further includes the separate administration of one of the therapeutic agents given first, followed by the second. Methods of treatment using the combination therapy are also provided.

In additional embodiments, a composition provided herein is administered in combination with another therapeutic agent. In some embodiments, a composition of any of [1]-[28] is administered in combination with another therapeutic agent. In some embodiments, a composition comprising a salt of a carotenoid provided in any of FIGS. 1A-1D herein, is administered in combination therapy with another therapeutic agent. In some embodiments, a composition comprising a multivalent salt (e.g., a divalent salt or a trivalent salt) of a carotenoid provided in any of FIGS. 1A-1D herein, is administered in combination therapy with another therapeutic agent. In particular embodiments, a composition comprising a multivalent salt of trans-crocetin (e.g., CTC or MTC) is administered in combination therapy with another therapeutic agent. In other particular embodiments, a composition comprising a multivalent salt of trans-norbixin (e.g., CTN or MTN) is administered in combination therapy with another therapeutic agent.

In some embodiments, a pharmaceutical composition comprising a salt of one or more ionizable carotenoids is administered in combination therapy with a carotenoid comprising at least one polar group or monocyclic group. In some embodiments, the salt of the ionizable carotenoid is a multivalent salt (e.g., salt containing divalent, trivalent or tetravalent counterion). In some embodiments the ionizable carotenoid is a carotenoid of any of [1]-[28] and/or FIGS. 1A-1D. In one embodiment, the carotenoid comprising at least one polar group or monocyclic group polar group is symmetric. In another embodiment, a divalent ionizable carotenoid salt composition is administered in combination therapy with at least one carotenoid selected from: zeanthin, astaxanthin, lutein, and xanthophyll. In another embodiment, the divalent ionizable carotenoid salt composition is administered in combination therapy with astaxanthin. In another embodiment, the carotenoid comprising at least one polar group or monocyclic group polar group is asymmetric. In another embodiment, a divalent ionizable carotenoid salt composition disclosed herein is administered in combination abscisic acid (ABA).

In some embodiments, a pharmaceutical composition comprising an ionizable carotenoid salt provided herein is administered in combination therapy with a standard of care treatment for the disease, disorder, or condition to be treated. In some embodiments, the salt of the ionizable carotenoid is a multivalent salt (e.g., divalent, trivalent or tetravalent). In some embodiments the ionizable carotenoid is a carotenoid of any of [1]-[28] and/or FIGS. 1A-1D. In particular embodiments, the ionizable carotenoid is trans-crocetin (e.g., CTC and MTC). In other particular embodiments, the ionizable carotenoid is trans-norbixin (e.g., CTN and MTN).

In some embodiments, a pharmaceutical composition comprising an ionizable carotenoid salt provided herein is administered in combination therapy with an antimicrobial agent. In some embodiments, the antimicrobial agent is an anti-bacterial agent. In some embodiments, the antibacterial agent is selected from, but not limited to, ertapenem, piperacillin-tazobactam, cefepime, aztreonam, metronidazole, meropenem, ceftriaxone, ciprofloxacin, vancomycin, linezolid, tobramycin, levofloxacin, azithromycin, cefazolin, and ampicillin. In some embodiments, the antibacterial agent is selected from, but not limited to, ceftriaxone, levofloxacin, ciprofloxacin, cefazolin, piperacillin-tazobactam, meropenem, metronidazole, vancomycin, and ampicillin. In other embodiments, the antimicrobial agent is an anti-fungal agent. In further embodiments, the anti-fungal agent is caspofungin or another antifungal drug. In other embodiments, the antimicrobial agent is an anti-malarial agent. In further embodiments, the anti-malarial agent is selected from, but not limited to, artemisinin and its analogs, chloroquin and its analogs, atovaquone, a quinine derivative, proguanil or another anti-malarial drug. In some embodiments, the salt of the ionizable carotenoid is a multivalent salt (e.g., divalent, trivalent or tetravalent). In some embodiments the ionizable carotenoid is a carotenoid of any of [1]-[28] and/or FIGS. 1A-1D. In particular embodiments, the ionizable carotenoid is trans-crocetin (e.g., CTC and MTC). In other particular embodiments, the ionizable carotenoid is trans-norbixin (e.g., CTN and MTN).

In some embodiments, a pharmaceutical composition comprising an ionizable carotenoid salt provided herein is administered in combination therapy with activated protein C (e.g., rhAPC), or drotrecogin alfa (activated) (DAA). In some embodiments, the salt of the ionizable carotenoid is a multivalent salt (e.g., divalent, trivalent or tetravalent). In some embodiments the ionizable carotenoid is a carotenoid of any of [1]-[28] and/or FIGS. 1A-1D. In particular embodiments, the ionizable carotenoid is trans-crocetin (e.g., CTC and MTC). In other particular embodiments, the ionizable carotenoid is trans-norbixin (e.g., CTN and MTN).

In some embodiments, a pharmaceutical composition comprising an ionizable carotenoid salt provided herein is administered in combination therapy with a corticosteroid (e.g., a glucocorticoid or mineralocorticoid such as fludrocortisonel). In some embodiments, the corticosteroid is a glucocorticoid. In further embodiments, the glucocorticoid is selected from cortisone, ethamethasoneb, prednisone, prednisolone, triamcinolone, dexamethasone and methylprednisolone. In some embodiments, the salt of the ionizable carotenoid is a multivalent salt (e.g., divalent, trivalent or tetravalent). In some embodiments the ionizable carotenoid is a carotenoid of any of [1]-[28] and/or FIGS. 1A-1D. In particular embodiments, the ionizable carotenoid is trans-crocetin (e.g., CTC and MTC). In other particular embodiments, the ionizable carotenoid is trans-norbixin (e.g., CTN and MTN).

In some embodiments, a pharmaceutical composition comprising an ionizable carotenoid salt provided herein is administered in combination therapy with intravenous administration of a vitamin. In some embodiments, the vitamin is vitamin C (ascorbic acid). In some embodiments, the vitamin is vitamin A. In some embodiments, the salt of the ionizable carotenoid is a multivalent salt (e.g., divalent, trivalent or tetravalent). In some embodiments the ionizable carotenoid is a carotenoid of any of [1]-[28] and/or FIGS. 1A-1D. In particular embodiments, the ionizable carotenoid is trans-crocetin (e.g., CTC and MTC). In other particular embodiments, the ionizable carotenoid is trans-norbixin (e.g., CTN and MTN).

In some embodiments, a pharmaceutical composition comprising an ionizable carotenoid salt provided herein is administered in combination therapy with a glucocorticoid and vitamin C (e.g., intravenous vitamin C administration). In some embodiments, the glucocorticoid is selected from cortisone, ethamethasoneb, prednisone, prednisolone, triamcinolone, dexamethasone and methylprednisolone. In further embodiments, the glucocorticoid is hydrocortisone. In additional embodiments, at least one ionizable carotenoid composition provided herein (e.g., a divalent salt composition comprising an ionizable carotenoid disclosed in FIG. 1A, FIG. 1B, FIG. 1C, and/or FIG. 1D) is administered in combination therapy with a glucocorticoid, vitamin C, and thiamine. In some embodiments, the salt of the ionizable carotenoid is a multivalent salt (e.g., divalent, trivalent or tetravalent). In some embodiments the ionizable carotenoid is a carotenoid of any of [1]-[28] and/or FIGS. 1A-1D. In particular embodiments, the ionizable carotenoid is trans-crocetin (e.g., CTC and MTC). In other particular embodiments, the ionizable carotenoid is trans-norbixin (e.g., CTN and MTN).

In some embodiments, a pharmaceutical composition comprising an ionizable carotenoid salt provided herein is administered in combination therapy with a vasopressor agent. In some embodiments, the vasopressor therapeutic agent is norepinephrine or similar drugs, or angiotensin II (e.g., GIAPREZA™). In some embodiments, the vasopressor therapeutic agent is epinephrine, phenylnephrine, dopamine, or vasopressin. In some embodiments, the vasopressor therapeutic agent is ephedrine, milrinone, isoproterenol, dobutamine, isoproterenol, or dopamine.

In some embodiments, a pharmaceutical composition comprising an ionizable carotenoid salt provided herein is administered in combination therapy with a thrombolytic therapeutic agent. In some embodiments, the thrombolytic therapeutic agent tissue plasminogen activator (tPA). In some embodiments, the salt of the ionizable carotenoid is a multivalent salt (e.g., divalent, trivalent or tetravalent). In some embodiments the ionizable carotenoid is a carotenoid of any of [1]-[28] and/or FIGS. 1A-1D. In particular embodiments, the ionizable carotenoid is trans-crocetin (e.g., CTC and MTC). In other particular embodiments, the ionizable carotenoid is trans-norbixin (e.g., CTN and MTN).

In some embodiments, a pharmaceutical composition comprising an ionizable carotenoid salt provided herein is administered in combination therapy with a therapeutic agent. In some embodiments, a pharmaceutical composition of any of [1]-[28] is administered in combination with a therapeutic agent. In some embodiments, a pharmaceutical composition comprising a multivalent salt of a carotenoid provided in any of FIGS. 1A-1D herein, is administered in combination therapy with a therapeutic agent. In some embodiments, the salt of the ionizable carotenoid is a multivalent salt (e.g., divalent, trivalent or tetravalent). In some embodiments the ionizable carotenoid is a carotenoid of any of [1]-[28] and/or FIGS. 1A-1D. In particular embodiments, the ionizable carotenoid is trans-crocetin (e.g., CTC and MTC). In other particular embodiments, the ionizable carotenoid is trans-norbixin (e.g., CTN and MTN).

In some embodiments, a pharmaceutical composition comprising an ionizable carotenoid salt provided herein is administered in combination therapy with a therapeutic agent selected from: heparin, vasopressin, antidiuretic hormone (ADH), and a 3-Hydroxy-3-methylglutaryl coenzyme A reductase inhibitor (statin). In some embodiments, the salt of the ionizable carotenoid is a multivalent salt (e.g., divalent, trivalent or tetravalent). In some embodiments the ionizable carotenoid is a carotenoid of any of [1]-[28] and/or FIGS. 1A-1D. In particular embodiments, the ionizable carotenoid is trans-crocetin (e.g., CTC and MTC). In other particular embodiments, the ionizable carotenoid is trans-norbixin (e.g., CTN and MTN).

In some embodiments, a pharmaceutical composition comprising an ionizable carotenoid salt provided herein is administered in combination therapy with an anti-inflammatory therapeutic agent. In some embodiments, the salt of the ionizable carotenoid is a multivalent salt (e.g., divalent, trivalent or tetravalent). In some embodiments the ionizable carotenoid is a carotenoid of any of [1]-[28] and/or FIGS. 1A-1D. In particular embodiments, the ionizable carotenoid is trans-crocetin (e.g., CTC and MTC). In other particular embodiments, the ionizable carotenoid is trans-norbixin (e.g., CTN and MTN).

In some embodiments, a pharmaceutical composition comprising an ionizable carotenoid salt provided herein is administered in combination therapy with oxygen and/or intravenous fluids to maintain/increase blood oxygen levels and/or blood pressure or hyperbaric therapy. In some embodiments, the salt of the ionizable carotenoid is a multivalent salt (e.g., divalent, trivalent or tetravalent). In some embodiments the ionizable carotenoid is a carotenoid of any of [1]-[28] and/or FIGS. 1A-1D. In particular embodiments, the ionizable carotenoid is trans-crocetin (e.g., CTC and MTC). In other particular embodiments, the ionizable carotenoid is trans-norbixin (e.g., CTN and MTN).

In some embodiments, a pharmaceutical composition comprising an ionizable carotenoid salt provided herein is administered in combination therapy with a chemotherapeutic agent (e.g., to enhance the effect of chemotherapy on cancer cells and mitigate the effects of chemotherapy-induced myelosuppression and anemia). In some embodiments, the salt of the ionizable carotenoid is a multivalent salt (e.g., divalent, trivalent or tetravalent). In some embodiments the ionizable carotenoid is a carotenoid of any of [1]-[28] and/or FIGS. 1A-1D. In particular embodiments, the ionizable carotenoid is trans-crocetin (e.g., CTC and MTC). In other particular embodiments, the ionizable carotenoid is trans-norbixin (e.g., CTN and MTN).

In some embodiments, a pharmaceutical composition comprising an ionizable carotenoid salt provided herein is administered in combination therapy with immunotherapy. In some embodiments, the salt of the ionizable carotenoid is a multivalent salt (e.g., divalent, trivalent or tetravalent). In some embodiments the ionizable carotenoid is a carotenoid of any of [1]-[28] and/or FIGS. 1A-1D. In particular embodiments, the ionizable carotenoid is trans-crocetin (e.g., CTC and MTC). In other particular embodiments, the ionizable carotenoid is trans-norbixin (e.g., CTN and MTN).

In some embodiments, a pharmaceutical composition comprising an ionizable carotenoid salt provided herein is administered in combination therapy with radiotherapy. In some embodiments, the salt of the ionizable carotenoid is a multivalent salt (e.g., divalent, trivalent or tetravalent). In some embodiments the ionizable carotenoid is a carotenoid of any of [1]-[28] and/or FIGS. 1A-1D. In particular embodiments, the ionizable carotenoid is trans-crocetin (e.g., CTC and MTC). In other particular embodiments, the ionizable carotenoid is trans-norbixin (e.g., CTN and MTN).

Kits for Administration of Active Agents

In another embodiments, the disclosure provides a kit for administering a provided ionizable carotenoid composition to a subject for treating a disease, disorder, or condition. In some embodiments, the disclosure provides a kit for delivering a therapeutic agent to a subject, the kit comprising: (a) a first composition comprising a disclosed ionizable carotenoid composition (e.g., a liposome comprising a multivalent trans-crocetin salt); and a (b) second composition containing for example, reagents, buffers, excipients, or another therapeutic agent that is stored separately prior to administration to the subject. Such kits typically include two or more components necessary for treating a disease state, such as hypoxia or inflammation related condition. In some embodiments, the kits include for example, a provided lipid compositions, reagents, buffers, containers and/or equipment. The liposome compositions and formulations can be in lyophilized form and then reconstituted prior to administration. In some embodiments, the kits include a packaging assembly that include one or more components used for treating the disease state of a patient. For example, a packaging assembly may include separate containers that house the therapeutic liposomes and other excipients or therapeutic agents that can be mixed with the compositions prior to administration to a patient. In some embodiments, a physician may select and match certain components and/or packaging assemblies depending on the treatment or diagnosis needed for a particular patient.

EXAMPLES

Example 1—Production of Calcium Trans-Crocetin Liposomes

Two different variants of trans-crocetin were used to produce trans-crocetin liposomes, namely: trans-crocetin free acid (TC) and its sodium salt, sodium trans-crocetin (STC). Trans-crocetin was encapsulated in liposomes by the following procedures.

Multiple Bilayer (Multilamellar) Vesicle (MLV) Production:

First, the lipid components of the liposome lipid membrane were weighed out and combined as a concentrated solution in ethanol at a temperature of around 65° C. In one preparation, the lipids used were hydrogenated soy phosphatidylcholine, cholesterol, and DSPE-PEG-2000 (1,2-distearoyl-sn-glycero-3-phosphoethan-olamine-N-[methoxy (polyethylene glycol)-2000]). The molar ratio of HSPC:cholesterol:PEG-DSPE was approximately 3:2:0.15. In another preparation, the lipids used were HSPC, cholesterol, PEG-DSPE-2000, and 1-palmitoyl-2-glutaryl-sn-glycero-3-phosphocholine (PGPC). The molar ratio of HSPC:cholesterol:PEG-DSPE:PGPC was approximately 2.7:2:0.15:0.3. Next, calcium acetate was dissolved in an aqueous buffer at a concentration of 125 mM, or 250 mM, with a pH of 7.0. The calcium acetate solution was heated up to 65° C.

The ethanolic lipid solution was added into the calcium acetate solution using a pipet. During this step the solution was well stirred using a magnetic stirrer. The mixing was performed at an elevated temperature (63° C.-72° C.) to ensure that the lipids were in a liquid crystalline state (as opposed to the gel state that they would attain at temperatures below the lipid transition temperature (Tm=51° C.-54° C.)). As a result, the lipids were hydrated and formed multiple bilayer (multilamellar) vesicles (MLVs) containing calcium acetate in the interior space.

Downsizing of MLVs Using Filter Extrusion:

The MLVs were fragmented into unilamellar (single bilayer) vesicles of the desired size by high-pressure extrusion using two passes through stacked (track-etched polycarbonate) membranes. The stacked membranes had two layers with a pore size of 200 nm and six layers with a pore size of 100 nm. During extrusion, the temperature was maintained above the Tm to ensure plasticity of the lipid membranes. As a result of the extrusion, large and heterogeneous in size and lamellarity MLVs were turned into small, homogenous (100-120 nm) unilamellar vesicles (ULVs) that sequestered calcium acetate in their interior space. A Malvern Zetasizer Nano ZS instrument (Southborough, MA) with back scattering detector (90°) was used for measuring the hydrodynamic size (diameter) of the vesicles at 25° C. in a plastic micro cuvette. The samples were diluted 50-fold in formulation matrix before analysis.

After ULVs containing calcium acetate had been produced, the extra-liposomal calcium acetate was removed using SEC (size exclusion chromatography, with PD-10 columns) or TFF (tangential flow diafiltration). Tonicity reagent was added to the liposomes to balance the osmolality (final concentration: 5% dextrose for 125 mM calcium acetate liposomes and 10% dextrose in for 250 mM calcium acetate liposomes). Once the calcium acetate gradient was generated, the trans-crocetin loading procedure is preferably performed within 24 hours. The lipid content of the prepared liposome solution was determined by phosphate assay.

1 mg/mL trans-crocetin solution was prepared in 10% dextrose (for 250 mM calcium acetate liposomes) and pH was adjusted to 8. The trans-crocetin solution was mixed with calcium acetate liposome solution at different Drug/Lipid ratios (100 g/mM, 80 g/mM, 60 g/mM or 40 g/mM). The mixture was then thoroughly stirred and heated to 65° C. for 30 minutes, followed by quick cool down to room temperature using an ice water bath. This step can be replaced by stirring the mixture at room temperature overnight.

The movement of trans-crocetin molecule (charge-free, neutral form) across the liposome lipid bilayer was driven by the gradient generated with calcium acetate (in other words, acetic acid diffused out, trans-crocetin diffused in). Trans-crocetin was then trapped inside of the liposomes by ionizing and then forming a precipitate with calcium (as a calcium salt form (calcium trans-crocetin, CTC)).

Purification of Liposomes:

The extra-liposomal trans-crocetin was removed using SEC (PD-10 columns) or TFF. In this example, the buffer used in SEC was HBS (HEPES buffered saline, pH 6.5). Upon completion of purification, filter sterilization was performed using a 0.22 micron filter. A Malvern Zetasizer Nano ZS instrument (Southborough, MA) with back scattering detector (90°) was used for measuring the hydrodynamic size (diameter) of the vesicles at 25° C. in a plastic micro cuvette. The samples were diluted before analysis.

TABLE 1

Physical characteristics of representative CTC loaded nanoparticles

| | Starting concentration | Encapsulation efficiency | Final concentration | Drug/Lipid Ratio | Diameter | PDI | Zeta potential |
|---|---|---|---|---|---|---|---|
| CTC LPs | 1 mg/ml trans-crocetin disodium | 96.9% | 0.24 mg/ml | 78.6 g/mM lipids | 105.7 nm | 0.056 | −2.88 mV |
| CTC Lps | 0.75 mg/ml trans-crocetin disodium | 98.32% | 3.92 mg/ml | 68.23 g/mM lipids | 103.8 nm | 0.041 | −2.71 mV |
| CTC Lps | 0.75 mg/mL trans-crocetin disodium | 99.47% | 3.90 mg/mL | 66.23 g/mM lipids | 100.8 nm | 0.031 | −3.67 mV |
| CTC Lps | 0.75 mg/ml trans-crocetin disodium | 92.59% | 2.49 mg/mL | 34.74 g/mM lipids | 101.9 nm | 0.038 | −3.83 mV |
| PGPC CTC Lp2 | 0.75 mg/ml trans-crocetin disodium | 98.30% | 5.34 mg/mL | 85.74 g/mM lipids | 95.9 nm | 0.043 | −3.66 mV |

Example 2—Preparation of Calcium Acetate Liposomes with Nanoassemblr®

Calcium acetate loaded liposomes were prepared by the following procedure. First, the lipid components of the liposome lipid membrane were weighed out and combined as a concentrated solution in ethanol at a temperature of around 65° C. In one example, the lipids used were hydrogenated soy phosphatidylcholine, cholesterol, and DSPE-PEG-2000 (1,2-distearoyl-sn-glycero-3-phosphoethanolamine-N-[methoxy-(polyethylene glycol)-2000]).

The molar ratio of HSPC:cholesterol:PEG-DSPE was approximately 3:2:0.15. In another example, the lipids used were HSPC, cholesterol, PEG-DSPE-2000, and 1-palmitoyl-2-glutaryl-sn-glycero-3-phosphocholine (PGPC). The molar ratio of HSPC:cholesterol:PEG-DSPE:PGPC was approximately 2.7:2:0.15:0.3.

Next, calcium acetate was dissolved in an aqueous buffer at a concentration of 125 or 250 mM, with a pH of 7.0. The calcium acetate solution was heated to 65° C. The ethanolic lipid solution and the calcium acetate solution were separately transferred to syringes. Two solutions were injected into microfluidic channel and mixed while flowing through it with Precision NanoSystems' NanoAssemblr® device. The mixing was performed at an elevated temperature (63° C.-72° C.) to ensure that the lipids were in the liquid crystalline state (as opposed to the gel state that they would attain at temperatures below the lipid transition temperature (Tm=51° C.-54° C.)). The size of liposome can be controlled by ratio between lipid solution and aqueous solution, as well as the mixing flow rate.

Example 3—MTC Liposome Generation and Characterization

Production of Trans-Crocetin Liposomes with Magnesium Acetate Gradient:

To produce magnesium trans-crocetin liposomes, two different variants of the molecule can be used namely: trans-crocetin free acid (TC) and its sodium salt, sodium trans-crocetinate (STC).

Liposome with magnesium acetate is prepared by the following procedure. First, the lipid components of the liposome membrane were weighed out and combined as a concentrated solution in ethanol at a temperature of around 65° C. In one example, the lipids used were hydrogenated soy phosphatidylcholine, cholesterol, and DSPE-PEG-2000 (1,2-distearoyl-sn-glycero-3-phosphoethanolamine-N-[methoxy(polyethylene glycol)-2000]). The molar ratio of HSPC:cholesterol:PEG-DSPE was approximately 3:2:0.15. In another example, the lipids used were HSPC, cholesterol, PEG-DSPE-2000, and 1-palmitoyl-2-glutaryl-sn-glycero-3-phosphocholine (PGPC). The molar ratio of HSPC:Cholesterol:PEG-DSPE:PGPC was approximately 2.7:2:0.15:0.3. Next, magnesium acetate was dissolved in an aqueous buffer at a concentration of 125 or 250 mM with a pH of 7.0. The magnesium acetate solution was heated up to 65° C. The ethanolic lipid solution was added into the magnesium acetate solution using a pipette. During this step the solution was well stirred using a magnetic stirrer. The mixing was performed at an elevated temperature (63° C.-72° C.) to ensure that the lipids were in a liquid crystalline state (as opposed to the gel state that they attain at temperatures below the lipid transition temperature Tm=51° C.-54° C.)). As a result, the lipids were hydrated and form multilamellar vesicles (MLVs) containing magnesium acetate in their interior space (internal solution).

Downsizing of MLVs Using Filter Extrusion:

The MLVs are fragmented into unilamellar (single bilayer) vesicles of the desired size by high-pressure extrusion using two passes through stacked (track-etched polycarbonate) membranes. The stacked membranes have two layers with a pore size of 200 nm and six layers with a pore size of 100 nm. During extrusion, the temperature was maintained above the Tm. As a result of the extrusion, large and heterogeneous in size and lamellarity MLVs were turned into small, homogenous (100-120 nm) unilamellar vesicles (ULVs) that sequestered the calcium acetate in their interior space. A Malvern Zetasizer Nano ZS instrument (Southborough, MA) with back scattering detector (90°) was used for measuring the hydrodynamic size (diameter) of the vesicles at 25° C. in a plastic micro cuvette. The samples were diluted 50-fold in formulation matrix before analysis.

Gradient Generation:

After ULVs containing magnesium acetate were produced, the extra-liposomal magnesium acetate was removed using SEC (size exclusion chromatography, with PD-10 columns) or TFF (tangential flow diafiltration). Tonicity reagent solutions (such as 50% dextrose) were added to the liposomes to balance the osmolality (final concentration: 5% dextrose for 125 mM magnesium acetate liposomes and 10% dextrose for 250 mM magnesium acetate liposomes). The lipid content of the prepared liposome solution was determined by phosphate assay.

Trans-Crocetin Loading into Magnesium Acetate Liposomes:

1 mg/mL trans-crocetin or trans-crocetin sodium solution was prepared in 10% dextrose (for 250 mM magnesium acetate liposomes) and pH was adjusted to 8-8.5 with sodium hydroxide. Trans-crocetin sodium solution was mixed with magnesium acetate liposome solution at different Drug/lipid ratio (100 g/mol, 80 g/mol, 60 g/mol or 40 g/mol). The mixture was then thoroughly stirred and heated up to 65° C. for 30 minutes, followed by quick cool down to room temperature using an ice water bath. This step can be replaced by stirring the mixture at room temperature overnight.

Purification of Liposomes:

The extra-liposomal trans-crocetin was removed using SEC (PD-10 columns) or TFF. In this example, the buffer used in SEC was HBS (HEPES buffered saline, pH 6.5). Upon completion of purification, filter sterilization was performed using a 0.2-0.22 micron filter. A Malvern Zetasizer Nano ZS instrument (Southborough, MA) with back scattering detector (90°) was used for measuring the hydrodynamic size (diameter) at 25° C. in a plastic micro cuvette. The samples were diluted before analysis.

TABLE 2

Physical characteristics of representative MTC loaded nanoparticles

|  | Starting concentration | Encapsulation efficiency | Final concentration | Drug/Lipid Ratio | Diameter | PDI | Zeta potential |
|---|---|---|---|---|---|---|---|
| MTC LP (D/L-80) | 0.75 mg/mL Trans-crocetin disodium | 99.98% | 5.03 mg/ml | 77.22 g/mol lipids | 102.1 nm | 0.046 | −2.32 mV |
| MTC LP (D/L-60) | 0.75 mg/mL Trans-crocetin disodium | 98.82% | 4.00 mg/mL | 58.83 g/mol lipids | 103.4 nm | 0.034 | −3.23 mV |
| MTC LP (D/L-40) | 0.75 mg/mL Trans-crocetin disodium | 98.90% | 2.25 mg/mL | 35.13 g/mol lipids | 103.7 nm | 0.039 | −3.23 mV |

TABLE 3

Liposomal CTC and MTC PK result summary

| Test article | $T_{1/2}$ (h) | AUC (mg/ml * h) | $C_{max}$ (mg/ml) | Plasma Exposure (fold increase compared to free drug STC) NCA analysis |
|---|---|---|---|---|
| STC free drug | 0.35 | 0.21 | 0.36 | NA |
| STC free drug | 0.47 | 0.26 | NA | NA |
| CTC-LP-80 | 5.12 | 8.36 | 1.26 | 40 |
| CTC-LP-60 | 4.52 | 6.4 | 1.1 | 35 |
| CTC-LP-40 | 5.8 | 10.75 | 1.44 | 56 |
| MTC-LP-80 | 2.88 | 5.29 | 1.29 | 25 |
| MTC-LP-60 | 2.9 | 6.01 | 1.44 | 29 |
| MTC-LP-40 | 2.67 | 5.25 | 1.37 | 25 |
| Fluorescent Dye Labeled Liposome | 12.2 | NA | NA | NA |

Balb/c mice (3 mice/group) were treated with a single dose of STC free drug, CTC/MTC-LPs (D/L ratio 80, 60, 40), and fluorescent dye labeled liposome via a slow intravenous bolus in order to collect serial blood samples at various time points over a 24 hour period (typically, 5 min, 1 hr., 2 hr., 4 hr., 8 hr., and 24 hr.).

5 µL of each plasma sample was mixed with 395 L methanol containing 1% formic acid. Sample mixtures were well mixed by vortexing. Samples were incubated at −20° C. for 1 hr. and then equilibrated at room temperature for 15 min. Samples were vortexed and then centrifuged at 10000 RPM for 10 min at room temperature. 200 µL of supernatant was removed from each sample without disturbing pellet and analyzed by HPLC. If the amount of plasma permitted, this analysis was duplicated.

The concentration of STC in the plasma samples was quantified by standard curve constructed by analyzing plasma samples containing known amount of STC. PK profiles were analyzed.

TABLE 4

CTC liposome stability

| Test article | Analysis date | Particle size (nm) | PDI | Zeta potential (mV) | Lipid Conc. (mM) | Crocetin Conc. (mg/mL) | Resulting D/L |
|---|---|---|---|---|---|---|---|
| CTC-LP-80 1st | Initial | 101.1 | 0.039 | −3.09 | 63.88 | 5.01 | 78.47 |
| CTC-LP-80 1st | 1 Month | 100.3 | 0.046 | −1.56 | 1.64 | 0.13 | 77.73 |
| CTC-LP-80 1st | 2 Months | 99.33 | 0.049 | −3.44 | 1.25 | 0.10 | 76.46 |
| CTC-LP-80 1st | 5 Months | 99.56 | 0.046 | −2.49 | 2.03 | 0.16 | 78.37 |
| CTC-LP-80 1st | 6 Months | 103.3 | 0.06 | −2.21 | 1.73 | 0.14 | 78.66 |
| CTC-LP-80 2nd | Initial | 97.3 | 0.049 | −3.44 | 71.09 | 5.44 | 76.57 |
| CTC-LP-80 2nd | 3 Months | 99.6 | 0.037 | −2.21 | 2.22 | 0.17 | 78.83 |
| CTC-LP-80 2nd | 4 Months | 99.8 | 0.038 | −3.27 | 2.14 | 0.17 | 79.91 |
| CTC-LP-80 2nd | 5 Months | 99.7 | 0.05 | −4.55 | 1.31 | 0.10 | 78.73 |
| CTC-LP-80 3rd | Initial | 102.3 | 0.042 | −0.80 | 70.57 | 5.48 | 77.64 |
| CTC-LP-80 3rd | 2 Months | 102.9 | 0.038 | −2.11 | 2.04 | 0.16 | 77.72 |
| CTC-LP-80 3rd | 3 Months | 102.3 | 0.042 | −2.74 | 2.01 | 0.15 | 76.22 |
| CTC-LP-80 3rd | 4 Moths | 104.2 | 0.090 | −2.17 | 1.12 | 0.09 | 77.10 |
| CTC-LP-80 4th | Initial | 99.6 | 0.037 | −2.21 | 70.57 | 5.58 | 79.11 |
| CTC-LP-80 4th | 1 Month | 101.6 | 0.054 | −2.00 | 2.52 | 0.20 | 80.76 |
| CTC-LP-80 4th | 2 Months | 100.8 | 0.042 | −3.22 | 2.05 | 0.16 | 77.11 |
| CTC-LP-80 4th | 3 Months | 102.8 | 0.073 | −5.01 | 1.36 | 0.11 | 79.06 |
| CTC-LP-60 | Initial | 100.8 | 0.0 | −3.7 | 58.91 | 3.90 | 66.23 |
| CTC-LP-60 | 4 Months | 104.0 | 0.0 | −1.9 | 2.12 | 0.14 | 68.12 |
| CTC-LP-60 | 5 Months | 103.2 | 0.037 | −2.63 | 1.70 | 0.12 | 68.89 |
| CTC-LP-40 | Initial | 101.9 | 0.0 | −3.8 | 71.54 | 2.49 | 34.74 |
| CTC-LP-40 | 4 Months | 106.1 | 0.0 | −2.1 | 2.54 | 0.09 | 36.58 |
| CTC-LP-40 | 5 Months | 103.1 | 0.038 | −2.28 | 2.21 | 0.08 | 36.41 |

CTC liposome stability was further assessed by characterizing liposome solution after the liposomes were purified from potentially leached our drug by size exclusion column after certain storage duration (up to 6 months). The characterization methods were same as previously described.

The CTC liposomes showed almost the same drug/lipid ratio within error range. Therefore, negligible drug leaching over 6 months at the storage condition (4° C.) was confirmed.

TABLE 5

Evaluation of liposome batch reproducibility and stability

| D/L of BC samples | Mar | Apr | May | Jun | Jul | Aug | Sep | Oct |
|---|---|---|---|---|---|---|---|---|
| CTC-LP-80 (1st) | 76.57 | 76.37 | 75.81 | | | 75.36 | 78.10 | |
| CTC-LP-80 (2nd) | | | 76.57 | | | 76.41 | 82.12 | 77.12 |
| CTC-LP-80 (3rd) | | | | | 77.64 | 78.13 | 77.81 | 76.54 |
| CTC-LP-80 (4th) | | | | | 79.11 | 82.93 | 78.92 | 80.77 |

Liposome batch reproducibility and stability were evaluated by characterizing the D/L.

CTC liposomes showed negligible change in this evaluation. Thus, CTC liposomes showed stability at least 6 months.

TABLE 6

MTC liposome stability

| Test article | Analysis date | Particle size (nm) | PDI | Zeta Potential (mV) | Lipid Conc. (mM) | Drug Conc. (mg/mL) | D/L (g/mol) |
|---|---|---|---|---|---|---|---|
| MTC-LP-80 | Initial | 102.1 | 0.046 | −2.32 | 65.2 | 5.03 | 77.22 |
| MTC-LP-80 | 1 Month | 104.4 | 0.038 | −2.84 | 19.70 | 1.53 | 77.72 |
| MTC-LP-80 | 2 Months | 105.5 | 0.051 | −4.78 | 18.29 | 1.41 | 77.22 |
| MTC-LP-60 | Initial | 103.4 | 0.034 | −3.23 | 57.96 | 3.27 | 56.39 |
| MTC-LP-60 | 10 days | 105.2 | 0.05 | −2.46 | 23.14 | 1.38 | 59.67 |
| MTC-LP-60 | 1 month | 105.4 | 0.056 | −4.45 | 23.31 | 1.39 | 59.85 |
| MTC-LP-40 | Initial | 103.7 | 0.039 | −3.23 | 64.04 | 2.25 | 35.13 |
| MTC-LP-40 | 10 days | 104 | 0.03 | −2 | 24.39 | 0.87 | 35.76 |
| MTC-LP-40 | 1 Month | 106.5 | 0.058 | −5.74 | 23.21 | 0.84 | 36.27 |

Determination procedures were the same as previously described.

MTC liposomes showed almost the same drug/lipid ratio within error range. Therefore, liposome is stable at least 2 months period at storage condition (4° C.) was confirmed

Example 4—Liposomal CTC Efficacy Study Protocol and Results

Animals and Husbandry:

Male and/or female C57BL/6 mice ordered from Envigo Laboratories or the Jackson Lab (Bar Harbor, Maine) were acclimated to housing conditions and handled in accordance with Animal Use Protocol (AUP) number TP-05. The animals were acclimated for approximately 1 week prior to study start. Only animals deemed healthy were included in this study. Animals were fed irradiated Teklad Global Rodent Diet 2918 and water ad libitum. Mice were group housed 5/cage in static cages with irradiated Teklad ⅛" corn cob bedding 7902 inside bioBubble® Clean Rooms that provide H.E.P. A filtered air into the bubble environment at 100 complete air changes per hour. The environment was controlled to a temperature range of 74°±5° F. and a humidity range of 30-70%. Treatment groups were identified by cage card. Individual mice were identified by indelible marker on the base of the tail. All procedures carried out in this experiment were conducted in compliance with the laws, regulations, and guidelines of the National Institutes of Health and with the approval of the TransPharm Animal Care and Use Committee.

Cecal Ligation Puncture and Post-Operative Procedure:

On Day −1, male and/or female mice were anesthetized through use of isoflurane and brought to a surgical plane. The lower quadrants of the abdomen were shaved using an electric trimmer. On Day 0, mice were anesthetized through use of isoflurane and brought to a surgical plane. The shaved area was disinfected with three alternating scrubs of chlorhexidine surgical scrub and 70% isopropanol. An abdominal longitudinal skin midline incision was made with iris scissors, without penetrating the peritoneal cavity. After the initial incision, small scissors were used to extend the incision 1.5-2 cm in order to gain entry to the peritoneal cavity. The midline white fascia of the abdominal musculature was identified and dissected for intermuscular incision and incision of fascia and peritoneal layers. The cecum was exteriorized using blunt anatomical forceps, leaving the remainder of the small and large bowel within the peritoneal cavity and avoiding breach or damage to the mesenteric blood vessels. The cecum was ligated with a sterile 9.5 mm stainless steel surgical clip below the ileocecal valve at the designated position (approximately 70% of the cecum will be ligated). Care was taken not to occlude the bowel. Before cecal perforation, the cecal contents were gently pushed toward the distal cecum. The cecum was then perforated using a 16-gauge needle for severe grade sepsis. A single through-and-through puncture midway between the ligation and the tip of the cecum in a mesenteric-to-antimesenteric direction was performed. After removing the needle, the cecum was relocated into the abdominal cavity without spreading feces from the cecum onto the abdominal wall wound margins, and a small droplet of feces was extruded from both the mesenteric and antimesenteric penetration holes. Droplet size was as consistent as possible. The peritoneum, fasciae, and abdominal musculature were closed by applying simple running sutures (4-0 PDS or chromic gut surgical sutures) and the skin incision was closed with 9 mm autoclips or surgical glue. Immediately following surgery, mice were administered a subcutaneous (SC) injection of 0.5 mL of room temperature 0.9% saline. Animals were then allowed to recover following surgery in a clean cage placed on a warm, re-circulating heating pad, with free access to water and food pellets on the floor. The heating pad remained in place with the cage half on/half off the pad, to allow the animals the opportunity to move to a cooler part of the cage if desired. The mice remained in this environment until fully conscious and mobile. The heating pad was removed once the animal was stable.

Animals were monitored continually post-surgery, at least once every 2-3 minutes for approximately 30 minutes, until the animals had recovered and were able to move about on their own. Thereafter, the animals were observed every hour for at least 6 hours post-surgery. Animals were also closely monitored (every hour from 7 am-6 pm daily) throughout the study period, with additional observations at 10 pm and 2 am on Days 1-3. A Rodent Postoperative Record was maintained (1 record per animal) during the study. Abnormal clinical signs were recorded if observed. Any animal exhibiting signs of impending mortality was humanely euthanized. If an animal was euthanized, the time and date was recorded on the postoperative record.

Formulation and Dosing:

Mice were administered test article via IP injection beginning at 2 hours post-surgery and continuing once daily through Day 4 (5 days total dosing). Mice in Groups 1-3 were dosed with a volume of ~10 µL test article per gram of mouse body weight (per Table 7; these administered doses represent a dose of 50 mg/kg per mouse daily for 5 days). Mice in Group 4 received once daily administration of 0.9% saline via IP injection in a volume of 0.3 mL from Day 0-4. Mice were weighed daily and dose volumes were administered per Table 7.

TABLE 7

Dose values Groups 1, 2 and 3 (10 µL/g dose)

| Body Weight Range | Dose Volume |
| --- | --- |
| 20-23.9 g | 0.2 mL |
| 24-26.9 g | 0.25 mL |
| 27-30.9 g | 0.3 mL |

Endpoint Analysis:

Efficacy of test articles was assessed by enumeration of test animal mortality over 5 days following CLP surgery. Animals which remained surviving on Day 5 were humanely euthanized via C02 overexposure.

Study Results:

Table 8 describes four CLP studies used to test different formulations of liposomal CTC. Studies 1 and 2 examined the CLP model in male mice. Studies 3 and 4 examined the CLP model in female mice. Test articles and results from each study are described below.

TABLE 8

Exemplary CLP studies of the efficacy of liposomal CTC

| | Study 1-TP-936 | Study 2-TP-967 | Study 3-TP-983 |
| --- | --- | --- | --- |
| Type | Efficacy | Efficacy | Efficacy |
| Sex of Mouse | Male | Female | Female |
| Study Size | 30 | 40 | 50 |
| Groups | 3 | 4 | 5 |

Study 1 (TP-936) Results:

All surgical and dosing procedures were performed as detailed in the study protocol (above). Sham animals demonstrated 100% survival. Mice which underwent CLP and were treated with saline and imipenem showed 50% mortality. Animals treated with test article 1 and imipenem or test article 2 and imipenem demonstrated 30% and 10% death, respectively. Five of the nine deaths during the study were a result of euthanasia due to dehydration and lateral recumbency (FIG. 5).

Together, these data demonstrate that cecal ligation and puncture using a 16-gauge needle causes mortality in C57Bl/6J mice. Although both test articles (in combination with imipenem) demonstrated a trending reduction in mortality when compared to the imipenem-treated control group.

Study 2 (TP-967) Results:

Animals treated with saline vehicle and imipenem (Group 4) demonstrated 70% death (FIG. 6). One of the seven deaths was a result of euthanasia. Mice treated with PGPC-LP and imipenem (Group 1) showed 60% mortality, with one of the six deaths attributed to euthanasia. Group 2, which was administered CTC-LP-80 and imipenem, demonstrated 30% death (FIG. 6). Two of the three deaths were due to euthanasia. Mice which received PGPC-CTC-LP-80 and imipenem (Group 3) had 70% mortality (FIG. 6). Two of the seven deaths were due to euthanasia. None of the treatment groups showed a statistically significant difference in mortality when compared to the vehicle control group, but a strong trend of improvement in survival was observed.

Study 3 (TP-986) Results:

Mice treated with CTC-LP-80 (50 mg/kg) and imipenem demonstrated 70% death (FIG. 8). Three of the seven deaths were due to euthanasia. Mice which received CTC-LP-80 (25 mg/kg) and imipenem had 40% mortality (FIG. 7). Two of the four deaths were due to euthanasia. Mice treated with CTC-LP-80 (5 mg/kg) and imipenem had 20% death (FIG. 7). None of the deaths were due to euthanasia. This treatment demonstrated a statistically significant decrease in mortality when compared to the vehicle control group (P=0.0321). Mice which received CTC-LP-80 (1 mg/kg) and imipenem had 60% mortality (FIG. 7). None of the deaths were due to euthanasia. FIG. 7.

Together, these data demonstrate that cecal ligation and puncture using a 16-gauge needle causes mortality in C57Bl/6 mice. Treatment with test article CTC-LP-80 (5 mg/kg) and imipenem demonstrated a statistically significant reduction in mortality when compared to the saline-treated control group.

Example 5—Production STC Liposomes by Passive Loading

Passive Loading of Sodium Trans-Crocetin with Extruder:

Trans-crocetin sodium was dissolved in an aqueous phase at its maximum solubility in the given aqueous media, for example 0.7 mg/ml in 5% dextrose. The ethanolic lipid solution containing HSPC, cholesterol, PEG-DSPE, with/without PGPC was added into the aqueous solution using a pipet. During this step the solution was well stirred using a magnetic stirrer. The mixing was performed at an elevated temperature (63° C.-72° C.) to ensure that the lipids are in the liquid crystalline state (as opposed to the gel state they attain at temperatures below the lipid transition temperature (Tm=51° C.-54° C.). As a result, the lipids are hydrated and formed multiple bilayer (multilamellar) vesicles (MLV) containing trans-crocetin sodium in the aqueous core. The MLVs were then downsized by extrusion as described previously.

Passive Loading of Trans-Crocetin with Nanoassemblr®:

Trans-crocetin sodium was dissolved in an aqueous phase at its maximum solubility in the given aqueous media, for example 0.7 mg/ml in 5% dextrose. The ethanolic lipid solution containing HSPC, cholesterol, PEG-DSPE, with/without PGPC and the trans-crocetin sodium aqueous solution were separately transferred to syringes. Two solutions were injected into a microfluidic channel and mixed while flowing through it with Precision NanoSystems' NanoAssemblr® device. The mixing was performed at an elevated temperature (63° C.-72° C.) to ensure that the lipids were in a liquid crystalline state (as opposed to the gel state that they attain at temperatures below the lipid transition temperature (Tm=51° C.-54° C.). The liposome size can be controlled by varying the ratio between lipid solution and aqueous solution, as well as the mixing flow rate.

Passive Loading of Trans-Crocetin by Ethanol Injection Method:

Trans-crocetin (free acid) was dissolved in ethanolic lipid mixture at its maximum solubility. Then, an ethanolic lipid mixture containing trans-crocetin was either mixed with aqueous solution (e.g., buffers, buffered saline, or dextrose solution) and downsized by extrusion method or mixed with aqueous solution through microfluidic channel by NanoAssemblr® device.

Passive Loading of Trans-Crocetin by Thin Film Rehydration Method:

Trans-crocetin (free acid) was dissolved in a volatile organic solvent (e.g., ethanol, methanol, chloroform, dichloromethane, etc.) along with other lipids:HSPC, cholesterol, PEG-DSPE, with/without PGPC. The organic solvent in trans-crocetin-lipid mixture was completely dried using the rotary evaporator by elevated temperature (e.g., 65° C.) in water bath and vacuum. While drying, the flask was rotated and thin film of dried trans-crocetin-lipid was formed on the wall of round bottom flask. An aqueous solution was added in to the thin film and rotated/agitated at elevated temperature (e.g., 65° C.). Rehydration of the thin film in aqueous solution forms multiple bilayer (multilamellar) vesicles (MLV) containing trans-crocetin in the lipid bilayer of MLVs. MLVs was then downsized by extrusion to desired small unilamellar vesicles (SUVs).

Example 6—Production of Targeted Trans-Crocetin Liposomes: Post Insertion

Antibody or its fragments, such as Fab or scFv, which contains a cysteine residue at the C-terminal will be conjugated and incorporated into the trans-crocetin liposome through a "post insertion" method. Micelles of thiol-reactive lipopolymer (such as DSPE-PEG-maleimide) will be prepared by dissolving in an aqueous solution at 10 mg/ml. Antibody (or its fragment) with a cysteine tail will be dissolved and reduced by a 10-20 mM reducing reagent (such as 2-mercaptoethylamine, cysteine, or dithioerythritol) at pH<7. The excess reducing reagent will be removed thoroughly by SEC (size exclusion chromatography) or dialysis. The purified and reduced antibody (or its fragment) will be then incubated with the micelles of thiol-reactive lipopolymers at a molar ratio of 1:4. At the end of the reaction, the excess maleimide groups will be quenched by a small amount of cysteine (1 mM) or mercaptoethanol. Unconjugated antibody (or its fragment) will be removed by SEC. Purified conjugated micelles will be then incubated with liposome at 37° C. or elevated temperature at different Antibody/Lipid ratios (this ratio is antibody dependent).

While the disclosed methods have been described in connection with what is presently considered to be the most practical and preferred embodiments, it is to be understood that the methods encompassed by the disclosure are not to be limited to the disclosed embodiments, but on the contrary, is intended to cover various modifications and equivalent arrangements included within the spirit and scope of the appended claims.

All publications, patents, patent applications, internet sites, and accession numbers/database sequences including both polynucleotide and polypeptide sequences cited herein are hereby incorporated by reference herein in their entirety for all purposes to the same extent as if each individual publication, patent, patent application, internet site, or accession number/database sequence were specifically and individually indicated to be so incorporated by reference.

What is claimed is:

1. A pharmaceutical composition comprising a pegylated liposome encapsulating a trans-crocetin salt having the formula:

Q-trans-crocetin-Q, wherein Q is a multivalent cation counterion.

2. The pharmaceutical composition of claim 1, wherein the multivalent cation counterion (Q) is a divalent metal cation selected from $Ca^{2+}$, $Mg^{2+}$, $Zn^{2+}$, $Cu^{2+}$, $Co^{2+}$ and $Fe^{2+}$, a divalent organic cation, or a trivalent cation.

3. The pharmaceutical composition of claim 1, wherein the multivalent cation counterion (Q) is selected from $Ca^{2+}$, $Mg^{2+}$, $Zn^{2+}$, $Cu^{2+}$, $Co^{2+}$, and $Fe^{2+}$.

4. The pharmaceutical composition of claim 1, wherein the liposome encapsulates magnesium trans-crocetinate.

5. The pharmaceutical composition of claim 1, wherein the liposome encapsulates calcium trans-crocetinate.

6. The pharmaceutical composition of claim 1, wherein the trans-crocetin lipid ratio is 30 to 150 g/M.

7. The pharmaceutical composition of claim 1, wherein the liposome has a diameter of 20 nm to 200 nm.

8. The pharmaceutical composition of claim 1, wherein the liposome is formed from liposomal components comprising: at least one of a cationic lipid, an anionic lipid and a neutral lipid; or at least one selected from: DSPE; DSPE-PEG; DSPE-PEG-maleimide; HSPC; HSPC-PEG; cholesterol; cholesterol-PEG; and cholesterol-maleimide.

9. The pharmaceutical composition of claim 1, wherein the liposome comprises an oxidized phospholipid.

10. The pharmaceutical composition of claim 8, wherein the one or more liposomal components further comprises at least one steric stabilizer selected from monosialoganglioside (GM1); poly(vinyl pyrrolidone) (PVP); poly(acrylamide) (PAA); poly(2-methyl-2-oxazoline); poly(2-ethyl-2-oxazoline); phosphatidyl polyglycerol; poly[N-(2-hydroxypropyl) methacrylamide]; amphiphilic poly-N-vinylpyrrolidones; L-amino-acid-based polymer; oligoglycerol, copolymer containing polyethylene glycol and polypropylene oxide, Poloxamer 188, and polyvinyl alcohol.

11. The pharmaceutical composition of claim 1, wherein the liposome has a zeta potential that is less than or equal to zero.

12. The pharmaceutical composition of claim 1, which further comprises a pharmaceutically acceptable carrier.

13. The pharmaceutical composition of claim 12, wherein the pharmaceutically acceptable carrier comprises a tonicity agent at a concentration of 0.3% to 2.5% or a buffer at a concentration of 1 to 200 mM and a pH of 2 to 8.

14. The pharmaceutical composition of claim 1, which has a pH of 5-8.

15. The pharmaceutical composition of claim 1, wherein the liposome comprises between 10 to 100,000 molecules of trans-crocetin.

16. The pharmaceutical composition of claim 1, wherein the liposome further comprises a targeting moiety and wherein the targeting moiety has a specific affinity for a surface antigen on a target cell of interest.

17. The pharmaceutical composition of claim 16, wherein the targeting moiety is attached to one or both of a PEG and the exterior of the liposome by a covalent bond.

18. The pharmaceutical composition of claim 16, wherein the targeting moiety is a polypeptide, an antibody, a humanized antibody, an antigen binding fragment of an antibody, a single chain antibody, a single-domain antibody, a bispecific antibody, a synthetic antibody, a pegylated antibody, or a multimeric antibody, optionally wherein the targeting moiety binds the surface antigen with an equilibrium dissociation constant (Kd) in a range of $50 \times 10^{-12}$ to $10 \times 10^{-6}$ as determined using surface plasmon resonance analysis.

19. The pharmaceutical composition of claim 16, wherein the liposome comprises 1 to 1000 targeting moieties.

20. The pharmaceutical composition of claim 1, further comprising at least one cryoprotectant selected from the group consisting of mannitol, trehalose, sorbitol, and sucrose.

21. A method for treating or preventing a disease in a subject needing such treatment or prevention, the method comprising administering an effective amount of the pharmaceutical composition of claim 1 to the subject.

22. The method of claim 21, wherein the disease or condition is associated with endotoxemia, sepsis, or a lung disease or condition.

23. The method of claim 21, wherein the pharmaceutical composition is administered with another therapeutic agent.

24. A method of preparing pharmaceutical composition comprising a liposome encapsulating trans-crocetin, the method comprising:
(a) preparing a liposomal solution comprising liposomes and a solution containing a weak acid salt of a multivalent metal;
(b) adding trans-crocetin to the liposomal solution; and
(c) maintaining the trans-crocetin in the liposomal solution for sufficient time to load trans-crocetin into liposomes.

25. The method of claim 21, wherein the disease or condition is characterized by ischemia or hypoxia, or nitric oxide deficiency.

26. The method of claim 21, wherein the disease or condition is cardiovascular disease; heart attack or stroke; or shock.

27. The method of claim 21, wherein the disease or condition is: an infection; inflammation; liver disease; kidney disease; an autoimmune disorder; a neurodegenerative disease; sclerosis: metabolic disease; insulin resistance; or diabetes.

28. The method of claim 24, wherein the weak acid is an organic acid and wherein the multivalent metal is a divalent metal.

29. The method of claim 28, wherein the organic acid is selected from acetic acid, gluconic acid, tartaric acid, glutamic acid, citric acid, formic acid, and glycinic acid.

30. The method of claim 28, wherein the divalent metal is selected from $Ca^{2+}$, $Mg^{2+}$, $Zn^{2+}$, $Cu^{2+}$, $Co^{2+}$, and $Fe^{2+}$.

31. The method of claim 28, wherein the organic acid is selected from acetic acid, gluconic acid, tartaric acid, glutamic acid, citric acid, formic acid, and glycinic acid, and the divalent metal is selected from $Ca^{2+}$, $Mg^{2+}$, $Zn^{2+}$, $Cu^{2+}$, $Co^{2+}$, and $Fe^{2+}$.

32. The method of claim 28, wherein the organic acid is acetic acid and the divalent metal is $Ca^{2+}$.

33. The pharmaceutical composition of claim 7, wherein the liposome has a diameter of 80 nm to 120 nm.

34. The pharmaceutical composition of claim 11, wherein the liposome has a zeta potential of −50 to 0 mV.

35. The pharmaceutical composition of claim 8, wherein the liposome is formed from DSPE-PEG.

36. The pharmaceutical composition of claim 15, wherein the liposome comprises between 100 to 10,000 molecules of trans-crocetin.

37. The pharmaceutical composition of claim 1, wherein the trans-crocetin/lipid ratio is 20 g/M to 150 g/M.

38. The method of claim 22, wherein the lung disease or condition is selected from acute respiratory distress syndrome (ARDS), pulmonary fibrosis, pulmonary hemorrhage, lung injury, lung cancer, and chronic obstructive pulmonary disease (COPD).

39. A pharmaceutical composition comprising a pegylated liposome encapsulating a calcium trans-crocetin salt,
wherein the liposome comprises DSPE-PEG, and has a zeta potential of −50 to 0 mV and a diameter of 80 to 120 nM,
wherein the trans-crocetin/lipid ratio of the pegylated liposome encapsulated trans-crocetin salt is 20 g/M to 150 g/M, and
wherein the composition has a pH of 5-8.

* * * * *